US012743549B2

(12) United States Patent
Bhat et al.

(10) Patent No.: US 12,743,549 B2
(45) Date of Patent: Sep. 22, 2026

(54) POST-GENERATION INPUT STREAM MODIFICATION FOR INFERRED NETWORK-BASED SIMULATED DATA

(71) Applicant: Citibank, N.A., New York, NY (US)

(72) Inventors: Ganesh Prasad Bhat, New Jersey, NJ (US); James Myers, Clearwater, FL (US); John E. Ortega, New York, NY (US)

(73) Assignee: CITIBANK, N.A.

( * ) Notice: Subject to any disclaimer, the term of this patent is extended or adjusted under 35 U.S.C. 154(b) by 0 days.

(21) Appl. No.: 19/369,206

(22) Filed: Oct. 25, 2025

(65) Prior Publication Data

US 2026/0244785 A1 Aug. 20, 2026

Related U.S. Application Data

(63) Continuation-in-part of application No. 19/334,772, filed on Sep. 19, 2025, which is a continuation-in-part of application No. 19/050,102, filed on Feb. 10, 2025.

(51) Int. Cl.
*G06F 21/62* (2013.01)
*G06N 5/04* (2023.01)

(52) U.S. Cl.
CPC ........... *G06F 21/6245* (2013.01); *G06N 5/04* (2013.01)

(58) Field of Classification Search
CPC .............................. G06F 21/6245; G06N 5/04
See application file for complete search history.

(56) References Cited

U.S. PATENT DOCUMENTS

2020/0272432 A1 8/2020 Shaikh et al.
2021/0019440 A1 1/2021 Abad et al.
(Continued)

FOREIGN PATENT DOCUMENTS

CN 119995886 A * 5/2025
WO WO-2023131674 A1 * 7/2023 .......... H04W 12/041

OTHER PUBLICATIONS

Dankar et al. “Fake It Till You Make It: Guidelines for Effective Synthetic Data Generation,” Generative Models in Artificial Intelligence and Their Applications, Feb. 28, 2021, pp. 1-18. (Year: 2021).
(Continued)

*Primary Examiner* — Kyung H Shin
(74) *Attorney, Agent, or Firm* — Perkins Coie LLP

(57) ABSTRACT

Systems and methods for post-generation input stream modification for inferred network-based simulated data are disclosed herein. The system can receive modification requests for simulated datasets that include updated privacy parameter sets associated with entities contributing to the underlying data. The system can retrieve inferred entity-relationship networks that capture structural, semantic, and statistical properties of the simulated dataset to determine which data records are affected by privacy parameter changes. The system can generate updated subsets of data records consistent with the modified privacy parameters and selectively regenerate only affected portions of the simulated dataset while maintaining consistency with unchanged data. The system can transmit updated simulated datasets to targeted components of data transformation pipelines and maintain cryptographic activity logs on distributed ledgers to ensure immutable records of all modifications for technical standard compliance.

20 Claims, 23 Drawing Sheets

(56) References Cited

U.S. PATENT DOCUMENTS

| | | | | |
|---|---|---|---|---|
| 2021/0383261 | A1 | 12/2021 | Hanna et al. | |
| 2023/0015412 | A1 | 1/2023 | Mendoza et al. | |
| 2023/0401336 | A1 | 12/2023 | Lafever et al. | |
| 2024/0020415 | A1 | 1/2024 | Zhang | |
| 2024/0095427 | A1 | 3/2024 | Kim et al. | |
| 2025/0181909 | A1* | 6/2025 | Trepte | G06N 3/08 |
| 2025/0240284 | A1* | 7/2025 | Namer | H04L 63/083 |
| 2025/0328652 | A1* | 10/2025 | Vaezi | G06F 21/577 |
| 2026/0087558 | A1* | 3/2026 | DeRew | G06Q 40/08 |

OTHER PUBLICATIONS

Venugopal et al. “Synthetic Data Generation: A Comparative Study,” Ideas ’22, Aug. 22-24, 2022, Budapest, Hungary, pp. 94-102. (Year: 2022).

* cited by examiner

REPLACEMENT SHEET

REPLACEMENT SHEET

| Privacy Parameter Set 1702 | |
|---|---|
| Parameter 1704 | Value 1706 |
| Entity Identifier | Entity A |
| PII Sharing Tag | False |
| Account Balance Sharing Tag | True |
| Forbidden Datasets | Dataset A, Dataset C, Dataset D |
| Expiration Date | 2025-10-03T12:00:00Z |
| Allowed Uses | Purpose A, Purpose B, Purpose D |
| Forbidden Uses | Purpose C, Purpose B if Dataset C, Purpose E |

POST-GENERATION INPUT STREAM MODIFICATION FOR INFERRED NETWORK-BASED SIMULATED DATA

CROSS-REFERENCE TO RELATED APPLICATIONS

This application is a continuation-in-part of U.S. patent application Ser. No. 19/334,772 entitled "ARTIFICIAL INTELLIGENCE-BASED, GRAPH-DRIVEN SYNTHETIC DATA GENERATION WITH STATISTICAL DISTRIBUTION AND TEMPORAL PATTERN PRESERVATION" and filed Sep. 19, 2025, which is a continuation-in-part of U.S. patent application Ser. No. 19/050,102 entitled "APPLICATION DOMAIN-BASED GENERATION AND CALIBRATION OF SYNTHETIC DATASETS USING ARTIFICIAL INTELLIGENCE MODELS" and filed Feb. 10, 2025. The content of the foregoing application is incorporated herein by reference in its entirety.

BACKGROUND

Synthetic data refers to artificially generated information that mirrors the statistical properties, patterns, and characteristics of real-world data. Organizations across various industries increasingly rely on synthetic data for testing, development, and analysis purposes, particularly when working with sensitive information such as personal information, financial records, or healthcare data. The generation and use of synthetic data enables organizations to perform data analysis, testing, and development activities while maintaining compliance with privacy regulations and data protection requirements. Synthetic data provides a viable alternative that allows organizations to conduct necessary operations without compromising individual privacy or violating data protection regulations. However, generating synthetic data that maintains both the characteristics of the actual dataset and a verifiable degree of anonymization presents significant technical challenges, particularly in ensuring that the synthetic data accurately reflects real-world conditions while preventing reverse engineering to identify the original data sources.

DETAILED DESCRIPTION

Figure 1:
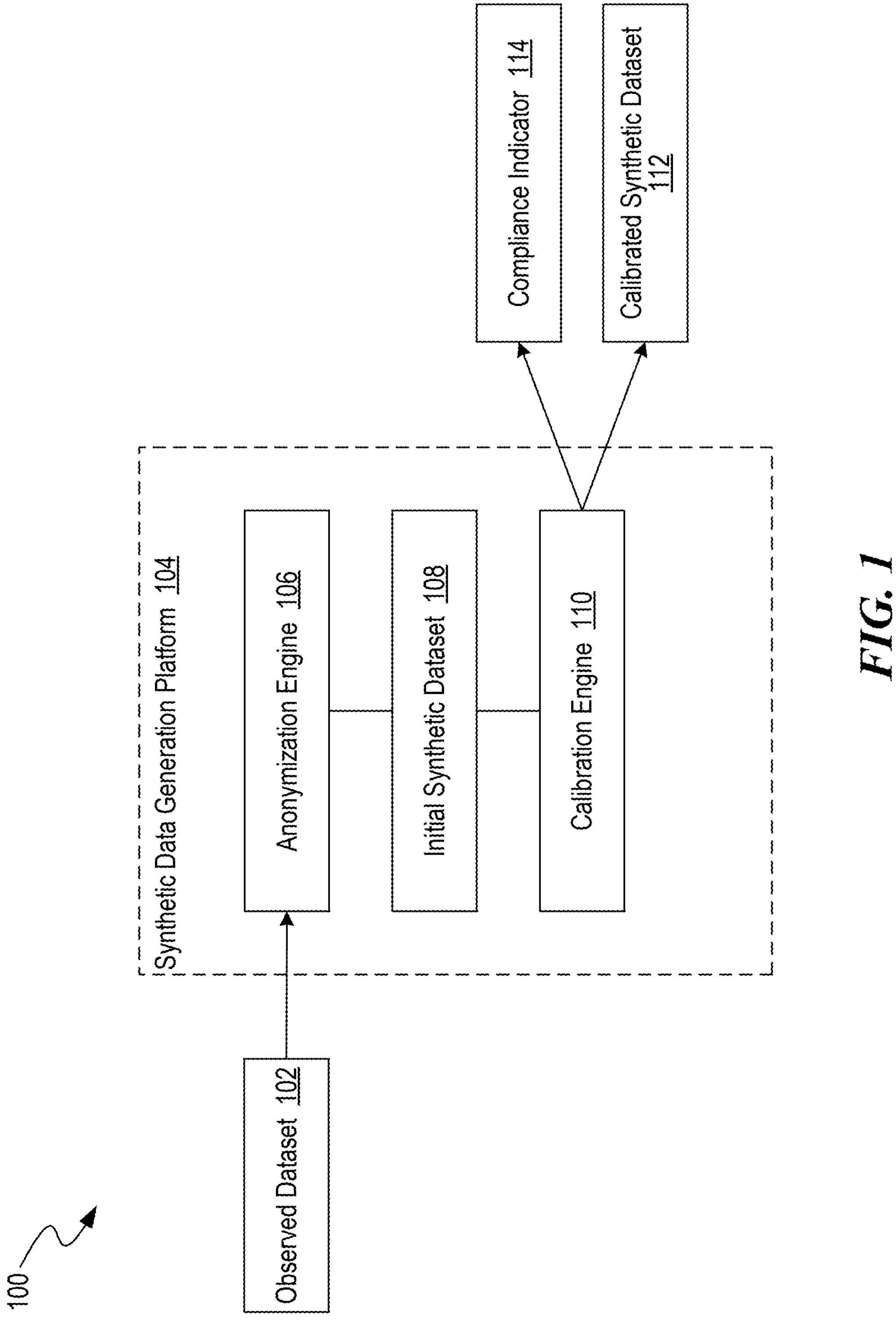
FIG. 1 illustrates an example environment of a synthetic data generation platform for generating synthetic data.

The inventors have devised a technology that enables generation of synthetic data based on input data from heterogeneous data stores in a secure manner. For example, the disclosed data generation platform can obtain heterogeneous representations of model updates from various models associated with different databases or entities. The heterogeneous representations of the model updates can be generated based on private or sensitive data or features, such as personal identifiable information (PII) or security parameters associated with the underlying systems. As such, the disclosed data generation platform can receive various update parameters of various formats from the entities or databases that obscure specific information associated with individual data entries associated with underlying, real-world data. Based on the update parameters, the data generation platform can leverage aggregation model weight values corresponding to the received update parameters to configure a global artificial intelligence model to generate synthetic data using the received update parameters, thereby enabling generation of synthetic data that is consistent with the statistical, semantic, and/or structural properties of the underlying, real-world data.

Moreover, the data generation platform can input the simulated dataset into a data characterization model to generate characterization datasets associated with different portions, hierarchy levels, or elements of the generated synthetic (e.g., simulated data). For example, the data generation platform generates a first natural language characterization of data associated with a first source entity or database and a different, second natural language characterization of data associated with a second source entity or database. The data generation platform can generate the natural language characterizations for display on the user interface, thereby enabling user input (e.g., user authorization) of the synthetic data prior to deployment to the associated testing and validation of downstream data processing systems.

To illustrate, the generated and validated synthetic data enables testing of distributed networks or systems, such as distributed microservices architectures, cloud infrastructure, database networks, or other similar architectures (e.g., that enable complex data processing, classification, or analytics processes). For example, the synthetic data enables testing of distributed microservices architectures by generating synthetic user account profiles, simulated API call patterns, resource requests, system performance metric values, and/or other suitable synthetic data. The disclosed technology can execute one or more validation tests based on simulating the processing and/or distribution of the synthetic data, thereby enabling detailed analytics, software and hardware testing, and/or other suitable diagnostics associated with the downstream systems. Additionally or alternatively, the synthetic data generated by the data generation platform enables testing of machine-learning model deployment pipelines, feature engineering systems, and/or model monitoring frameworks. For example, the synthetic data, which can preserve the statistical, semantic, and/or structural properties of the underlying real-world data that originates from different systems, can be used to reconfigure hardware or software components of complex machine-learning pipelines based on real-world usage or processing characteristics, while ensuring that the real-world data remains siloed and secure within the source systems, databases, or entities.

Pre-existing systems associated with the automated generation of synthetic data can fail to account for synthetic data originating in distinct databases or systems, where the data is secure and protected from exposure to external devices, systems, or users. For example, conventional systems can selectively modifying or randomizing portions of a given secure dataset that are sensitive (e.g., personal identifiable information, user account information, or geographical location information) while preserving other, non-secure information (e.g., user account permissions information, resource allocations associated with particular user accounts, or other suitable data) in its original form to enable subsequent testing of the system (e.g., within a machine-learning model pipeline framework). However, by only redacting certain information, conventional systems can be susceptible to reverse-engineering attacks that reveal details about the local training data, such as patterns that enable deduction of sensitive information.

Moreover, conventional systems that randomize elements of the synthetic data to simulate sensitive, real-world data for subsequent testing can fail to accurately capture statistical or structural attributes of the real-world data within the synthetic data, as the synthetic data generation model does not have direct access to the sensitive information underlying the real-world data. To solve these technical issues associated with the generation of synthetic data based on simulated datasets, the disclosed data generation platform leverages federated learning-based synthetic data generation to aggregate model parameters from various sources, while protecting the underlying sensitive data stored within or associated with the sources. For example, the data generation platform can transmit representations of local model parameters to a centralized, global model responsible for generation of synthetic data, thereby facilitating generation of synthetic data based on sensitive, secure data of heterogeneous sources without sharing the underlying real-world data.

However, conventional federated learning systems can lack robust mechanisms to handle malicious or faulty data originating from the different sources or entities. Conventional federated learning systems may not exhibit sophisticated mechanisms to detect and mitigate Byzantine attacks or data poisoning attempts. To illustrate, malicious systems (and/or erroneous data sources) can bias model weights associated with local models, where the model weights are applied to the global model upon aggregation within the framework of the federated learning system. As such, outliers or corruptions in source data can deleteriously influence the global model, thereby representing a security risk and injecting inaccuracies into the synthetic data. As such, conventional federated learning systems present the risk of skewing or destroying the statistical or structural integrity of generated synthetic data, thereby leading to downstream effects in testing, validating, and/or debugging complex data processing pipelines.

Moreover, pre-existing federated learning systems generally leverage a set of local artificial intelligence models that share the model architecture of the global model. However, constraining the model architecture of the local models (e.g., to be compatible with the global model topology) can limit the flexibility and reliability of handling different types of input data. To illustrate, various types of data stored within local devices or entities (e.g., user account data, communication data, and/or security data) can be compatible with and/or optimized for processing, characterization, or classification by different types of machine learning models or algorithms. When the various types of data are stored on different entity devices that are subject to security or transmission constraints, conventional federated learning systems can require each of the entity devices to conform to the same model architecture type, even if the data stored within the different entity devices can benefit from improved reliability, efficiency, or accuracy with another model architecture type. As such, pre-existing federated systems can struggle with local model performance, thereby increasing the computational requirements for generating synthetic data. Furthermore, due to the constraints imposed by the global model's architecture, the conventional federated learning systems can generate less accurate data than would otherwise be possible with tailored local models, thereby reducing the fidelity of the generated synthetic data.

Conventional automated synthetic data generation architectures can also exhibit a lack of explainability or analytical capability associated with the generated synthetic data, particularly where the generated synthetic data is associated with a federated learning-type environment. For example, because synthetic data is generated at the global model based on representations of model parameters shared from local models, the underlying real-world data is not available for direct analysis. Model parameters (or the corresponding representations) may not be easily mapped to input features and resulting synthetic data outputs.

As such, conventional synthetic generation techniques that are automated can operate as a black box, precluding supervision and/or modification by administrator systems or associated users. To illustrate, issues with generated synthetic data likely can only be handled following deployment—where synthetic data is generated in an automated manner, there are limited opportunities for an administrator system to intervene prior to generation and deployment of the sensitive data into testing nodes, systems, or pipelines.

To solve these issues associated with conventional synthetic data generation systems, the disclosed technology leverages Byzantine-robust federated aggregation of model update-related data from various entities associated with models of different model types, thereby enabling aggregation of heterogeneous real-world data and model parameters to configure a global synthetic data generation model. By the systems and methods disclosed herein, real-world, sensitive data associated with (and/or siloed within) various entities can be protected during generation of associated synthetic data, while preserving the statistical, structural, and/or semantic properties of the real-world data within the synthetic data.

In some aspects, the data generation platform can obtain a first update parameter set from a first machine learning model and a second update parameter set from a second machine learning model. To illustrate, the data generation platform can receive secure (e.g., encrypted or concealed) representations of model parameters that are associated with different local models associated with different servers or entities, each of which has access to different real-world data training sets (e.g., associated with different data types, domains, or formats). The representations of model parameters (e.g., the update parameter set) can include encrypted parameters, aggregated gradients, compressed updates, or other suitable data associated with the local models. By receiving the update parameter sets from the local models, the data generation platform enables subsequent aggregation of information originating from the different sources while preventing exposure of sensitive information accessible to the sources, where the sensitive information can be subject to security or privacy constraints to enable generation of synthetic data. The secure parameter aggregation approach presented herein enables the platform to generate high-quality synthetic data that reflects the statistical properties of multiple data sources without compromising the privacy of any individual datasets.

In some implementations, the local models can include a generative adversarial model (GAN), a variational autoencoding model, a diffusion model, an artificial neural network, or any other suitable machine-learning model. As such, different local models can leverage different approaches to modeling (e.g., predicting, characterizing, or generating) underlying data. As an illustrative example, a first local GAN model (e.g., associated with a first server) can have access to user transmission or communication metadata (e.g., as associated with a distributed microservices network). The first local GAN model can be trained to generate simulated communications between different microservices or users within a particular pipeline, as an illustrative example. As such, the data generation platform disclosed herein can receive a representation of parameters from the GAN model (e.g., encrypted parameters) for subsequent incorporation and aggregation into a global model for generation of synthetic data.

In contrast, a second model associated with a second server can have access to user account data associated with the different microservices. The second server, having access to user account data, can leverage the data to train a local variational autoencoder model to generate user account data. As such, the data generation platform disclosed herein can receive a representation of the parameters from the variational autoencoder model (e.g., aggregated gradients associated with a recent model update). Based on the aggregated gradients, the data generation platform can update the global model for generation of synthetic data accordingly. By receiving different representations of parameters associated with local model updates from different models and/or associated servers, the data generation platform can leverage model specializations that improve efficiency, reliability, or accuracy of characterization of data of different formats, types, or characteristic features, thereby improving the accuracy of the resulting global synthetic data generation model.

In some aspects, the disclosed data generation platform can determine aggregation model weight values corresponding to the received update parameter sets respectively. In response, the data generation platform can apply the model weight values to the corresponding update parameter sets (e.g., via an inner product, an outer product, or a matrix operation) to generate an associated model weight set for a global artificial intelligence model based on the local models. For example, the data generation platform determines a weight vector and/or tensor that transforms the received parameters into an aggregable value, which can be integrated into the global model accordingly. By doing so, the data generation platform can account for differences in data quality, model performance, and contribution reliability across the heterogeneous local models. To illustrate, the aggregation model weight values can be determined based on factors such as the statistical fidelity of each local model's outputs, the size and representativeness of the local training dataset, the computational resources available at each server and/or entity, and historical performance metrics of previous parameter updates from each source. The weight values can enable the platform to prioritize contributions from high-performing local models while reducing the influence of potentially corrupted or low-quality parameter updates, thereby implementing a form of Byzantine fault tolerance that protects the global model from malicious or erroneous inputs.

Based on the weight values and generated model weight set, the disclosed data generation platform can generate, configure, and/or modify the global artificial intelligence model. For example, the data generation platform generates a set of model weights for the global model that are based on the received update parameter sets, thereby enabling generation of synthetic data on the basis of the local models. For example, in response to configuring the global artificial intelligence model, the data generation platform generates a simulated dataset using the configured global artificial intelligence model. To illustrate, in the context of testing or validation of a distributed microservices system, the synthetic data can include a data structure indicating communications or transmissions between various microservices, as well as associated user accounts or component properties and relative security or risk levels associated with the different communications or components. By doing so, the data generation platform can create synthetic data that preserves the statistical distributions, the structural relationships, and semantic properties of the original datasets (e.g., real-world datasets) from multiple heterogeneous sources without requiring direct access to the underlying sensitive data.

In some aspects, the data generation platform can generate characterization datasets that characterize one or more aspects or features of the generated synthetic data. For example, the data generation platform generates one or more characterization datasets that include natural language characterizations of different aspects of data (e.g., associated with data types of the different local models). A first natural language characterization can include a human-readable description of patterns, trends, and/or regulatory compliance information associated with communications between different microservices within a pipeline (e.g., representing data within the first server). A second natural language characterization can include a human-readable description of patterns, trends, and/or regulatory compliance information associated with user accounts of the distributed microservices network (e.g., representing data within the second server. By doing so, the data generation platform enables administrator devices and technical users to understand and validate the characteristics of the synthetic data before deployment, providing transparency into what types of patterns and relationships have been preserved from the original heterogeneous data sources. The explainability framework allows users to make informed decisions about the suitability of the synthetic data for specific testing or validation applications while mitigating the risk that generated datasets are inaccurate, illogical, or inconsistent with reality or a user's defined validation or testing task.

To improve user control of the synthetic data generation process, the data generation platform can generate a graphical representation of the characterization datasets, thereby enabling user supervision and control over particular features, aspects, or attributes of the generated synthetic data. For example, the data generation platform creates visual interface elements that present natural language characterizations of synthetic data as graphical components on a user device. For example, the data generation platform can display a characterization of one or more transactions (e.g., communications), such as those associated with a distributed microservices network. The characterization can include one or more natural language sentences that relate to or describe a particular type of data pattern that corresponds to a particular server or entity associated with a local model. For example, the characterization is associated with communications data associated with the first server device and includes a natural language sentence characterizing communication data within the synthetic data. In some implementations, the data generation platform enables a user to interact with the graphical user interface and modify, reject, and/or accept the synthetic data in response to the generated characterization. By doing so, the data generation platform leverages human-computer interaction to improve practical, efficient, and dynamic decision-making workflows in complex, distributed computing environments. As such, the disclosed data generation platform enables characterization of and modification of otherwise obscure artificial intelligence model outputs that are based on protected, unexposed sensitive data.

To illustrate, the data generation platform can receive a data authorization indicator for the simulated dataset from a user of the graphical user interface to indicate user approval, rejection, or modification of the synthetic dataset prior to deployment to test or validation systems (e.g., to production systems). For example, the data generation platform processes authorization indicators as specific digital commands that trigger automated deployment workflows, enabling control of system operations. As an illustrative example, a system administrator can review the natural characterizations of one or more components of the synthetic data and can interact with the graphical user interface to indicate that the generated synthetic data is suitable for the associated task (e.g., validation, evaluation, or testing-related task).

In response to the indication of the user's data authorization indicator, the data generation platform can deploy the simulated dataset to one or more nodes of the system to be tested or validated (e.g., associated with a particular microservice of a distributed microservices network) to enable validation of the system based on the simulated dataset. For example, the platform executes deployment protocols that distribute the synthetic data to target nodes and configures those nodes to process the data for system validation purposes. As an illustrative example, the platform receives an authorization signal from a system administrator, thereby triggering the deployment of the simulated communication data to one or more suitable nodes of the system (e.g., a distributed microservices network) to be tested. The platform can configure the nodes to execute testing or validation protocols, including performance benchmarking, load testing, fault tolerance validation, and/or other suitable metrics. By doing so, the data generation platform can execute an automated deployment mechanism enabling practical testing and validation of complex distributed computing systems using synthetic data (e.g., simulated data) that is consistent with the structural, semantic, and/or statistical properties of the underlying real-world data (e.g., sensitive and/or stored or siloed within various databases, servers, or entities).

The inventors have also devised a technology enabling post-generation evaluation, control, and validation of generated simulated data, providing federated control over input streams used in the generation and maintenance of the simulated data within a data transformation pipeline. For example, the systems and methods described herein enable generation of updated simulated data and selective deployment of the data for use in a data transformation pipeline according to an inferred entity-relationship network that specifies relationships between entities, source data, associated privacy parameters, and components of the resulting simulated dataset.

Simulated data associated with validation or testing of a data transformation pipeline can originate from one or more contributing entities. To illustrate, a data transformation pipeline can include a task for validating a distributed microservices network associated with a set of interacting microservices. The simulated data can be based on real-world data that arises from different entities (e.g., each controlling data, such as activity logs, that are associated with one or more components of the distributed network). The entities can each include a particular set of privacy rules or protocols, due to associated regulatory or policy constraints for instance. When such privacy rules or protocols change (e.g., reflecting more restrictive privacy protocols associated with particular entities), the modified protocols can require that the simulated data based thereon is to be modified accordingly (e.g., to remove the influence of data that is to be protected according to the modified privacy policy). In conventional simulated data generation platforms, simulated data, once generated and deployed, cannot be easily modified, as the simulated data can be generated on the basis of patterns or statistical inferences across various, covarying system components (e.g., interdependent microservices associated with entities with different privacy requirements).

Moreover, once real-world data is used to generate simulated data, contributions from data of different sources to the generated simulated data can be convoluted, mixed, or intertwined, such as based on structural, semantic, and/or statistical properties that are shared or otherwise mixed between different input signals within the real-world data. As such, when the source data or associated permissions change such that the structural, semantic, and/or statistical properties of the underlying real-world data are changed, conventional systems struggle to isolate the resulting effect on the simulated dataset due to underlying interactions between the different sources of data.

As an illustrative example, a data generation platform can generate simulated data associated with a distributed microservices network, where the underlying real-world data of the distributed microservices network includes information relating to user activity logs associated with various microservices, as well as processing requests received at various modules from the microservices within the network. In response, the data generation platform (e.g., the platform described herein) can generate simulated data that reflects structural, semantic, and/or statistical properties associated with the real-world activity log data and received request data within the distributed microservices network. To illustrate, the simulated dataset includes a set of simulated user activity logs associated with set of simulated microservices, as well as corresponding simulated requests received as simulated modules within a simulated distributed microservices network, such that the simulated activity logs, microservices, requests, and modules reflect statistical properties of the observed activity logs, microservices, requests, and/or modules of the real-world data.

However, in some cases, privacy permissions relating to user activity logs associated with a particular microservice within the network can change (e.g., in response to a security level change), thereby rendering the real-world data associated with the particular microservices unable to be used within the simulated data. For example, a system policy is such that data (as well as related requests, activities, or actions) from the particular microservice is not to be reflected in the simulated dataset anymore. Conventional data generation platforms can handle the privacy changes by regenerating the simulated data by excluding data associated with the particular microservice to be hidden. As such, conventional platforms can implicate burdensome computational resource requirements in response to changes in the underlying real-world data including privacy permissions). Furthermore, in situations where portions of the simulated data are distributed selectively to multiple components of a data transformation pipeline (e.g., with a pipeline for validating the distributed microservices network), all portions of the regenerated simulated data in conventional systems may need to be transmitted to the pipeline components, as conventional systems lack information mapping the contributions of individual real-world data records or entities to corresponding portions of the generated simulated data due to the mixed or intertwined nature of the contributions. As such, conventional systems can require significant data transmission and bandwidth-related resources, leading to inefficiencies and latency issues in updating synthetic data based on changes to privacy settings associated with the underlying data.

In some cases, the simulated data is generated to reflect real-world data arising from various sources, each of which can have a particular security protocol, set of privacy permissions or consent policies, or suitable controls, as described above. Upon a change in security protocols or permissions, conventional systems can perform new Byzantine-robust, federated aggregation protocols of hidden data arising from the various federated sources, causing increased complexity with respect to privacy changes. For example, a change in a privacy policy associated with a first federated data source can require execution of complex, modified data homogenization or aggregation protocols whose weights and conversion protocols are dependent on the input data source and must be recalculated (e.g., based on a change in the authorization of use of one or more federated data sources). As such, in order to generate an updated simulated dataset reflecting changes in consent associated with one or more federated entities, pre-existing systems can require re-configuration of the aggregation protocol, in addition to changes to preprocessing of the real-world data and handling associated encryption algorithms or operations, thereby increasing the computational complexity of simulated data generation.

Moreover, conventional systems may not dynamically generate, maintain, or retrieve data modification logs relating to changes in deployed simulated data. Even pre-existing data simulation systems that do log high-level modifications to real-world data, permissions, or associated simulated data can struggle to log the data in an immutable, secure manner. For example, in distributed systems where multiple entities can provide real-world data contributing to the simulated dataset and, accordingly, can modify (e.g., revoke or authorize) user permissions, the entities may be responsible for reporting such modifications to an activity logger. However, because of the decentralized nature of the user permissions or privacy modifications, centralized logging or auditing can be subject to spoofing or fraudulent attacks (e.g., by systems impersonating the relevant entities). As such, conventional, privacy-sensitive systems for generation of simulated data based on federated or decentralized entities can be vulnerable to significant security vulnerabilities with respect to monitoring and auditing of privacy-related (or, generally, entity-related) changes to real-world data underlying the generated simulated data.

The data generation platform generated herein enables granular, targeted modification and deployment of simulated data in response to entity-controlled changes to privacy or security requirements relating to the underlying real-world data used to generate the simulated data. For example, the data generation platform leverages an inferred entity-relationship network that provides information relating to statistical, structural, and/or semantic relationships between components of a particular network. By doing so, the data generation platform can respond to received modification requests that indicate changes or modifications in privacy parameters including parameters that control privacy or security protocols associated with real-world data, such as from a particular entity, that is used to generate the associated simulated data for network validation or testing purposes. For example, the data generation platform provides the inferred entity-relationship network and the updated privacy parameter set to a data generation model to determine a subset of data records, of the original simulated data, to be updated based on the modification to privacy parameters. As such, the data generation platform can selectively update data records that are affected by the modified entity privacy parameters, while leaving unaffected data records intact. Moreover, the data generation platform can selectively transmit the updated simulated dataset to portions or components of the data validation platform that are affected (as opposed to portions or components that are unaffected by the changes). In some implementations, the data generation platform generates indications the modified privacy permissions and/or associated updates to the simulated dataset on a distributed ledger, enabling immutable, accurate, and secure validation and auditing of changes to the simulated data.

As described above, the inventors have also devised systems and methods for modifying simulated data based on changing permissions, consent, or privacy constraints associated with the underlying real-world data. In some aspects, the disclosed data generation platform receives a modification request for a simulated dataset that includes updated privacy parameters characterizing permissions or consent for underlying real-world data used to generate the simulated dataset. For example, the data generation platform receives modification requests through containerized applications that enable one or more entities to dynamically update privacy parameters for previously generated synthetic datasets. An entity can include an administrator system (e.g., corresponding to a subsystem or subnetwork within the larger network) that owns or controls particular real-world data that is used to generate the synthetic dataset. For example, the administrator system includes a microservice entity provider that provides information relating to activity logs of the particular microservice. Additionally or alternatively, the entity associated with the modification request includes a financial institution or other data owner subject to various privacy constraints associated with data shared therefrom. The modification request can include updated consent levels for types or components of data shared with the data generation platform (e.g., for generation of simulated data), including constraints or descriptors of types of personally identifiable information (PII) associated with privacy controls. By doing so, the data generation platform enables post-deployment governance and consent-based control of synthetic data based on owners or controllers of the real-world data upon which the synthetic data is based.

In some aspects, the disclosed data generation platform retrieves an inferred entity-relationship network that is associated with the simulated dataset. For example, the inferred entity-relationship network includes an indication of relationships between nodes (e.g., entities, components, modules, etc.) of a network (e.g., a data transformation pipeline). In some implementations, the inferred entity-relationship network includes information relating to the statistical, structural, and/or semantic properties of the real-world data describing the operation of the network. By retrieving a mapping between components of the data transformation pipeline (e.g., a distributed microservices network), the data generation platform can track interactions between data associated with different entities for information relating to how changes in privacy or consent that applies to particular data within the network influences the generated synthetic data. By doing so, the data generation platform can maintain precise, accurate mappings between entity contributions and synthetic data outputs. As such, the platform enables targeted updates to specific portions of deployed synthetic datasets in response to changing privacy or consent characteristics of the underlying real-world data. Accordingly, the platform can improve the efficiency and resource utilization for data governance operations relating to security or privacy protocols within a network to be validated or upon which testing is performed.

In some aspects, the data generation platform determines a subset of the data records associated with the simulated data that are to be updated in response to the modification request. For example, using the inferred entity-relationship network, the updated privacy parameter set (e.g., associated with the modification request by the entity with changing privacy or consent constraints), and the set of data records corresponding to the simulated dataset, the data generation platform can determine which data records are to be affected by the changes in data governance policies associated with an entity that has provided real-world data for generation of the simulated dataset. To illustrate, in the context of a distributed microservices system, the data generation platform can determine that a particular entity (e.g., an owner of a particular microservice within the microservices network) has changed privacy protocols so as to protect activity logs associated with the particular microservice. Based on the inferred entity-relationship network, the data generation platform can determine that the absence of activity associated with the particular microservice is correlated with an absence of requests (e.g., by the particular microservice) transmitted to a second microservice within the network. Based on the determination, the data generation platform can identify particular data records within the simulated dataset that correspond to requests transmitted to a simulated microservice that is equivalent to the second microservice, thereby enabling targeting of particular parts of simulated data that are affected by privacy constraints within the real-world dataset associated with generation of the simulated dataset.

As such, the data generation platform can update the particular portion of the dataset that is affected by the updated privacy parameters associated with the first entity, according to the relationships or correlations described by the inferred entity-relationship network. For example, the data generation platform determines data records that describe requests transmitted to a simulated microservice within the simulated dataset. The simulated microservice can correspond to a real-world microservice that receives requests from other microservices controlled by an entity that has increased its privacy protection levels (or reduced its data-sharing consent). Based on the determination of the data records, the data generation platform can modify the determined data records to remove the contribution of the entity's real-world data as applied to the simulated dataset. For example, the data generation platform can generate updated data records that reflect a reduction in the number of requests received at the simulated microservice based on a determination that the data should not reflect requests made by microservices controlled by the entity, as the entity's real-world data contributions are now restricted under the entity's updated privacy parameters. By doing so, the data generation platform enables targeted updates to simulated data generated by the platform in response to changes in privacy constraints associated with real-world data (e.g., or associated data owners, such as entities or administrator systems), eliminating the need to regenerate the entire simulated dataset using an updated real-world dataset.

As such, the data generation platform can generate the updated simulated dataset reflecting the updated data records (e.g., in lieu of the original data records based on the original privacy parameters associated with the entity). For example, the data generation platform retrieves the original simulated dataset from a data store, determines the data records affected by the updated privacy parameters, and replaces the affected data records with the updated data records that reflect the updated privacy parameters. By doing so, the data generation platform can selectively update parts of the simulated dataset that are associated with the changes while retaining the other information, thereby providing significant computational efficiency improvements compared to conventional systems that require complete regeneration and recalculation of statistical, structural, or semantic properties across entire datasets.

In some implementations, the data generation platform transmits the updated dataset to a second user device of the underlying network or system (e.g., a distributed microservices network or system). For example, the data generation platform determines a particular portion of the distributed microservices network (e.g., a network component, device, module, or containerized microservice) to apply the updated simulated dataset. In some implementations, only particular network components are selected for updating with updated data records (e.g., particular network components that are affected by the simulated data). As such, the data generation platform enables targeted deployment of the updated synthetic data to specific network components that require the modified datasets, rather than broadcasting updates across the entire system infrastructure. By doing so, the data generation platform minimizes network bandwidth consumption and reduces system disruption by delivering updated synthetic data only to the components of the distributed system that process data records affected by privacy parameter changes, providing improvements in deployment efficiency and operational continuity for validation and testing workflows.

In some implementations, the data generation platform creates immutable cryptographic records on a distributed ledger that document modification requests and/or modifications to the simulated datasets, enabling tamper-resistant audit trails for privacy parameter changes. For example, the data generation platform generates a cryptographic data structure that includes hash-based or encryption-based verification mechanisms that prevent unauthorized alterations to the modification history and provide cryptographic proof of compliance with data governance requirements (e.g., as defined within an entity's privacy parameter set). For example, the data generation platform generates a cryptographic block that includes hash values of the updated dataset, timestamps of the privacy parameter modifications, and/or digital signatures from the requesting entity (e.g., requesting modification to consent or privacy parameters). The distributed ledger can store the cryptographic evidence across multiple nodes, thereby creating an immutable record for auditing or regulatory purposes. By doing so, the data generation platform enables maintenance of verifiable compliance records in distributed computing environments where synthetic data governance benefits from cryptographic proof of proper privacy protocol handling.

Synthetic data can be deployed to validate mathematical models and to train machine learning models such as large language models (LLMs) or other generative AI (GenAI, GAI) models. Synthetic data is used in a variety of fields as a filter for information that would otherwise compromise the confidentiality of particular aspects of the data. In many sensitive applications, datasets theoretically exist but cannot be released to the general public. Further, synthetic data addresses the challenge of data scarcity, which is common when implementing modern approaches to training LLMs or other generative AI models. Data scarcity occurs when there is an insufficient amount of real-world data available for analysis, training AI models, and other operations.

However, continuously using inaccurate synthetic data to, for example, train artificial intelligence (AI) models, increases the risk of model degradation. Inaccurate synthetic data includes data that, for example, has been generated/developed with incorrect assumptions, lacks variability, or contains errors and biases that are absent from original data (e.g., actual data, copies of the actual data, anonymized data, depersonalized data, and so forth). If an AI model continuously intakes inaccurate synthetic data, the AI model's performance and accuracy can degrade due to the over-reliance on artificial data that may not capture the nuances of real-world data. Over-reliance can lead to biased or inaccurate predictions and decisions. Another challenge is obtaining cross-border approval for the use of actual data. Different countries have varying regulations and standards for data privacy and protection, and synthetic data must comply with different regulations to be used legally. Navigating the regulatory landscapes can be complex and time-consuming, potentially delaying the deployment of AI models.

Attempting to create synthetic data that accurately reflects real-world conditions while ensuring compliance with privacy regulations presents significant technical challenges. Creating such data requires addressing several limitations in conventional approaches to data generation, such as the difficulty in maintaining the statistical properties of the original data while ensuring anonymization. Unlike traditional data anonymization methods that may simply remove or mask personal identifiers, synthetic data generation creates entirely new data points that mimic the original data's characteristics and cannot be reengineered to trace back to, for example, customers or other personally identifiable information (PII) or personal information (PI). Conventional methods often struggle to balance the need for data utility with the requirement for privacy, leading to either overly generalized data that lacks detail or insufficiently anonymized data that poses privacy risks.

To address these technical challenges, multiple design approaches were evaluated. For example, evaluations and analysis included generating synthetic data to reflect the statistical properties and patterns of the original data. However, a significant challenge remained: there was no measure of how good the synthetic data was, nor was there a method to track the differences between the original and synthetic data. Without a reliable measure of the quality of synthetic data, it was challenging to ensure that the generated data captured the nuances of the original data.

As such, the inventors have also developed a system for generating calibrated synthetic data using an AI model (e.g., generative model, large language model, machine-learning model) (hereinafter the "synthetic data generation platform," "data simulation platform" or "data generation platform"). The synthetic data generation platform can use a dataset, which includes actual data comprising a set of attributes and/or a set of observed values for these attributes, to identify a subset of the attributes to be anonymized and/or depersonalized within the dataset (e.g., user identifiers such as name, address, etc., passwords, and so forth). Once the subset of attributes to be anonymized and/or depersonalized is identified, the synthetic data generation platform can generate a set of synthetic values for the attributes. Synthetic values can be generated directly from the actual data, with built-in provisions to anonymize and/or depersonalize the data during the creation process. The synthetic data generation platform can ensure that the synthetic data maintains the statistical properties and patterns of the original dataset while maintaining individual privacy.

In some implementations, synthetic data generation platform can first anonymize and/or depersonalize the actual data by, for example, removing any personal information. Once the data is anonymized and/or depersonalized, synthetic values are created from the depersonalized dataset. The two-step approach ensures that the synthetic data is derived from a dataset that has already been stripped of sensitive information, thereby lowering the risk of re-identification via reengineering. Additionally or alternatively, the synthetic data generation platform can create a reusable mask for depersonalizing the observed values. The mask can be saved and subsequently applied to other data (e.g., data that is similar to the original data, the original data itself, different data, and so forth). By creating and saving a depersonalization mask, the synthetic data generation platform can consistently anonymize/depersonalize across multiple datasets.

One of the advantages of the synthetic data generated off of depersonalized/anonymized data is that the synthetic data cannot be reverse-engineered. Unlike depersonalized or anonymized data, which can potentially be re-identified when combined with other databases or sources, by first depersonalizing or anonymizing the actual data and then creating synthetic data from it, the synthetic data generation platform ensures that the synthetic data cannot be traced back to the PII of the original customers. Thus, the synthetic data generation platform alleviates significant privacy regulatory concerns, as it prevents the possibility of re-engineering the synthetic data to uncover sensitive information of the clients.

However, for situations where the underlying real-world data includes complex relationships or interdependencies, even synthetic data informed by statistical patterns can fail, particularly in situations where entities within the data and relationships thereof are dynamic. For example, where entities are added or removed, the underlying data does not include indications of how such entities behave or influence other parts of the system. Conventional approaches to synthetic data generation can generate synthetic data that appears statistically valid at the individual entity level but can fail at capturing the intricate web of interdependencies between entities in more complex systems. This limitation can become particularly pronounced in dynamic environments where the relationship structure evolves over time, as the synthetic data generation process may not account for emergent relationships or changing entity hierarchies that were not present in the original training data.

Moreover, conventionally generated synthetic data can lose temporal coherence as such systems may not consider time-resolved or time-series information. Traditional synthetic data generation approaches often treat data points as independent observations without accounting for temporal dependencies and sequential relationships. As such, conventional synthetic data generation systems can fail to preserve the natural progression of events, seasonal patterns, or causal sequences present in real-world data, even when they account for static statistical distributions satisfactorily. The loss of temporal coherence can significantly impact the utility of synthetic data for applications that rely on understanding time-based behaviors, trends, or predictive patterns.

Furthermore, conventional systems for the generation of synthetic data are often not scalable, as complex relationships across increasingly large systems can be difficult to capture and/or track. Such conventional systems require training data (e.g., the underlying real-world data) to capture all relationships, such that accuracy can be limited by model complexity. As the number of entities and their latent or explicit interconnections grow, traditional approaches can struggle to maintain computational efficiency while preserving the full spectrum of relationships. The scalability challenge can be compounded by the exponential growth in relationship complexity as system size increases, leading to oversimplified synthetic data that lacks important relationships or to computationally prohibitive generation processes that cannot handle large-scale datasets.

Even conventional systems that account for interdependencies or relationships between entities (e.g., different data sources, datasets, or associated values) often handle the relationships as distinct from statistical relationships and patterns within the data. For example, synthetic data generated based on explicitly defined relationships between components of the real-world data can fail to capture latent structural relationships between entities. As such, the separation between structural and statistical modeling in conventional approaches can result in synthetic data that preserves the structural integrity or the statistical properties of the real-world data asymmetrically and inconsistently (e.g., by missing or relaxing strong, latent relationships between entities), thereby leading to synthetic datasets that appear structurally sound but exhibit statistical anomalies or, conversely, maintain statistical fidelity while violating suitable structural constraints.

Furthermore, conventional systems that model structural relationships between values, entities, or nodes within the data to be simulated often do not represent such relationships in a sufficiently flexible manner (e.g., for more complex relationship types). For example, conventional approaches can be limited to binary connections or predefined relationship categories, failing to capture nuanced, multi-dimensional, and context-dependent relationships that exist in real-world data. The inflexibility of such systems can result in synthetic data that oversimplifies complex relationship dynamics, leading to missing more complex patterns, including non-linear or conditional dependencies, hierarchical relationships, or relationships that vary based on temporal or contextual factors.

To address these further technical challenges, the inventors have also developed systems and methods for generating synthetic data based on ontological structures, such as knowledge networks, to account for complex relationships or interdependencies within the underlying data. For example, the disclosed data simulation platform leverages bidirectional integration of structural and statistical modelling to detect and enhance knowledge of relationships between entities, data structures, values, or other suitable data associated with the system. As such, the disclosed technology enables generation of more accurate synthetic data for validation and testing of computational models, such as artificial intelligence models, in situations where testing or training data is not available (e.g., due to security or privacy constraints) and where relationships between various components of the underlying data are complex and/or non-linear.

In some aspects, the data simulation platform can receive a node dataset that includes information relating to the structure of the underlying data to be simulated (e.g., a set of personal identifying information (PII)). The node dataset can include one or more datasets, data objects, structures, or other suitable data (e.g., entities or nodes), as well as one or more relationships characterizing relationships between such entities, represented in the form of a knowledge network. As an illustrative example, a large distributed software system can include a network of microservices (e.g., containerized entities or applications in a containerized architecture, such as in a Kubernetes system), each representing a node or entity in a distributed architecture. Each microservice (e.g., a type of node) can be associated with a service type, version, deployment region, and/or associated resource usage statistics. The relationships (e.g., edges) between microservices can represent API calls, data flows, dependency links and can be associated with relationship attributes, including call frequency, latency, and/or authentication requirements. By receiving the node dataset information, the data simulation platform enables simulation of complex data structures and relationships thereof, thereby improving the flexibility of the data generation platform in its ability to handle different types of data, objects, and complex interdependencies.

Subsequently, the data simulation platform can analyze the node dataset (e.g., the received knowledge network) to extract statistical information (e.g., statistical metrics) associated with the relationships, values, and/or other attributes of the node dataset. For example, the data simulation platform can provide the node dataset representing relationships between microservices of the distributed system to a statistical inference model to generate inferred statistics (e.g., predicted values characterizing statistical metrics, such as average call latency, the distribution of service dependencies, API call volumes associated with particular microservices, and/or other suitable information). In some implementations, the inferred statistical dataset includes values that characterize relationships or interdependencies between multiple values, objects, or entities of the node dataset (e.g., within a particular node of the node dataset and/or between different nodes of the node dataset). To illustrate, the inferred statistical dataset includes a correlation coefficient that characterizes a similarity between API call latency values between two adjacent (and/or non-adjacent) microservices within the distributed system. Additionally or alternatively, the inferred statistical dataset includes an average value, variance value, and/or other suitable metrics associated with one or more attributes of particular microservices and/or relationships thereof.

In some implementations, the data simulation platform can model temporal patterns associated with a time series of the node dataset, knowledge network, or components thereof. For example, the data simulation platform leverages multiscale attention, hierarchical encodings, neural Hawkes processes, and/or temporal point processes to model sequences, enabling generation of temporal dependency graphs. By doing so, the data simulation platform enables both static and dynamic retention of complex interrelationships and patterns, thereby improving the resilience of the data simulation platform in generating synthetic data in complex and dynamic situations and environments.

The data simulation platform disclosed herein can leverage the inferred statistical dataset to update, improve, and/or infer a knowledge network that represents attributes or relationships within the associated system. For example, in the context of a distributed software system, the data simulation platform can identify previously unknown dependencies between microservices, detect latent communication patterns between system components, or discover implicit hierarchical relationships within data structures based on statistical correlations and usage patterns. The bidirectional enhancement between statistical analysis and knowledge network construction enables the generation of synthetic data that preserves both explicit structural relationships and implicit statistical dependencies that may not be apparent from examining either the graph structure or the associated statistical properties in isolation.

Based on the inferred entity-relationship network, the data simulation platform can generate a set of constraints to impose on subsequent generation of synthetic data. For example, the data simulation platform can determine, categorize, or evaluate relationships and values associated with the inferred entity-relationship network and generate a data structure that characterizes constraints to be imposed on the generation of data. In the context of a distributed software system, the data simulation platform can determine that data associated with particular microservices is to be correlated within a particular threshold or tolerance based on the nature of the inferred entity-relationship network (and/or associated inferred statistical data). By generating and subsequently imposing the set of constraints, the data simulation platform can ensure that synthetic data maintains structural integrity and statistical fidelity with respect to the real-world system, while preventing the generation of unrealistic or invalid data combinations that would violate the underlying system architecture and/or operational dependencies.

As such, the data simulation platform can generate the simulated node dataset such that it is consistent with the set of constraints and the inferred entity-relationship network (e.g., using one or more data generation models, as in a generative model suite). As an illustrative example, the data simulation platform generates synthetic data (e.g., simulated usage data associated with API calls between different microservices of the distributed system), where the associated attributes and relationships follow the determined constraints. For example, the synthetic data generated by the data simulation platform is such that API calls originating from one microservice are correlated with API calls received at another microservice within a particular tolerance, as determined based on the inferred statistical dataset. By doing so, the data simulation platform enables realistic testing and validation of distributed systems without exposing sensitive production data, while maintaining complex interdependencies and behavioral patterns that are valuable for accurate performance modeling and system optimization.

In some aspects, the data simulation platform can transmit the synthetic data to a suitable device for training or testing (e.g., of an artificial intelligence model). For example, the data simulation platform provides the simulated node dataset to development environments for load testing of distributed systems. The data simulation platform can convert or transmit the synthetic data in formats compatible with the target systems, such as structured datasets for database testing, API call logs for performance analysis, or streaming data for real-time system validation, thereby enabling comprehensive testing and model training without compromising the security or privacy of actual production data.

As such, the disclosed data simulation platform addresses limitations of conventional systems that fail to capture complex relationships and interdependencies by implementing a bidirectional integration approach between statistical and structural modeling. Unlike traditional methods that treat structural relationships and statistical properties as separate concerns, the disclosed platform can leverage knowledge networks to represent entity relationships, while simultaneously using statistical inference models to discover latent patterns and dependencies. The integrated approach described herein enables the system to identify previously unknown relationships between entities (e.g., microservices in a distributed system) and to generate synthetic data that preserves both explicit structural connections and implicit statistical correlations that emerge from underlying data patterns.

The data simulation platform can mitigate temporal coherence limitations associated with conventional approaches as the platform can employ specialized generative models that enable decomposition of data generation based on the knowledge network structure, enabling different specialized models (e.g., as part of a model suite) to process particular portions of data while maintaining overall consistency with the knowledge network. The approach enables the platform to scale efficiently as system complexity grows by leveraging hierarchical and modular data generation. As an illustrative example, the data simulation platform can use a flexible, rich, modular constraint and/or relationship embedding mechanism, enabling representation of multi-dimensional relationships within the inferred entity-relationship network. As such, the data simulation platform can handle complex relationship types within the real-world data beyond binary connections by encoding relationship attributes, conditional dependencies, and contextual factors directly within the knowledge network structure. The constraint generation process can thus handle hierarchical relationships, multi-hop dependencies, and context-dependent connections, enabling the synthetic data to capture nuanced relationship dynamics that vary based on operational (and/or temporal) factors. The flexibility improves the richness and accuracy of the synthetic data, thereby enabling testing and validation of systems where manipulation or transmission of sensitive data is limited.

Moreover, to assess the accuracy and fidelity of the synthetic data, the synthetic data generation platform can generate a tracking relationship value (e.g., a tracking difference, a tracking error, a tracking differentiator, tracking overlap percentage, or the like) between the original data (e.g., actual data, anonymized data, depersonalized data, and so forth) and the synthetic data. The tracking relationship value is a quantifiable metric comparing the synthetic data against the actual data across various scopes (e.g., at a variable level, at a segment—or group of variables—level, at an overall dataset level, and so forth). For example, if a user requests Kansas City credit card data from the last 48 hours, the synthetic data generation platform can not only generate synthetic data but also output that the synthetic data is within, for example, 1% of the actual data overall. Furthermore, the synthetic data generation platform can provide specific tracking relationship values for individual characteristics, such as, for example, a 0.1% tracking error for the "age" characteristic and/or a 2% tracking error for the "income" characteristic. This level of detailed comparison ensures that the synthetic data closely mirrors the actual data, making the synthetic data commercially scalable and highly reliable for various applications.

The tracking relationship value can be calculated by comparing the observed values of the identified subset of attributes with the corresponding synthetic values. The comparison can be performed against one or more benchmarks (e.g., certain variables to compare), providing a quantifiable metric that indicates how closely the synthetic data mirrors the real-world data. The benchmarks can be determined using an associated scenario (e.g., application domain) of the dataset. For example, in a financial field, the variables gender, income, geographical location, and so forth can be included in the benchmarks. If the tracking relationship value exceeds a certain threshold (e.g., specified by the user, specified by a guideline, dynamically generated), the synthetic data generation platform can regenerate the synthetic values using, for example, different parameters or weights. The threshold can be a threshold value, a threshold condition, a range of threshold values, and so forth.

By comparing the synthetic values with the observed values against established benchmarks, the synthetic data generation platform can quantify how closely the synthetic data mirrors the real-world data. Additionally, regenerating synthetic values if the tracking relationship value exceeds a certain threshold mitigates the risk of over-reliance on synthetic data. Furthermore, the synthetic data generation platform can ensure compliance with varying guidelines by providing a quantifiable method for assessing and validating synthetic data, thus simplifying the process of obtaining cross-border approval and accelerating the deployment of models trained on synthetic data.

While the current description provides examples related to LLMs, one of skill in the art would understand that the disclosed techniques can apply to other forms of machine learning or algorithms, including unsupervised, semi-supervised, supervised, and/or reinforcement learning techniques. For example, the disclosed intent-based data generation platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of the Synthetic Data Generation Platform

FIG. 1 illustrates an example environment 100 of a synthetic data generation platform 104 for generating synthetic data. The environment 100 includes an observed dataset 102 (e.g., data associated with actual data), the synthetic data generation platform 104, calibrated synthetic dataset 112, and compliance indicator 114. The synthetic data generation platform 104 can include anonymization engine 106, which can output initial synthetic dataset 108, and calibration engine 110. The synthetic data generation platform 104 is implemented using components of the example computer system 500 illustrated and described in more detail with reference to FIG. 5. Implementations of the environment 100 can include different and/or additional components or can be connected in different ways.

The observed dataset 102 refers to data associated with the original data and/or actual data collected from real-world sources (e.g., the original/actual data, copies of the original/actual data, data generating using the original/actual data, and so forth), which may contain sensitive information such as personal information. The observed dataset 102 serves as the input for the synthetic data generation platform 104. In some implementations, the observed dataset 102 can be multimodal, text, computer data, code, audio, image, video, and so forth. The synthetic data generation platform 104 is a computer system (e.g., computer system 500) that generates synthetic datasets to mimic and/or replicate one or more properties or representations (e.g., statistical properties) of the observed dataset 102 while ensuring that the synthetic data cannot be traced back to the original data. Thus, the synthetic data generation platform 104 is enabled to ensure compliance with guidelines and/or regulatory frameworks that define how personal data is to be handled, stored, shared, and so forth (e.g., guidelines that restrict the transfer of personal data across borders unless certain conditions are met). By generating synthetic data that mimics the statistical properties of the observed dataset, the synthetic data generation platform 104 can anonymize and/or depersonalize information based on the guidelines for different geographical locations or entities. In some implementations, the synthetic data generation platform 104 can be integrated with cloud-based services and/or be executed from local server.

The anonymization engine 106 within the synthetic data generation platform 104 transforms data within the observed dataset 102 into synthetic data values of the initial synthetic dataset 108 by anonymizing and/or depersonalizing the data. The anonymization engine 106 can apply one or more anonymization methods to ensure that the synthetic data does not contain any personal information. The initial synthetic dataset 108 refers to the output generated by the anonymization engine 106. Anonymization and depersonalization refer to transforming data such that one or more entities to whom the data pertains cannot be identified, either directly or indirectly (e.g., a certain user identifier, an Internet Protocol address, and so forth). Anonymization and depersonalization can include data masking (i.e., where sensitive information is replaced with random characters or symbols), pseudonymization (i.e., where identifiers are replaced with pseudonyms), and generalization (i.e., where detailed data is replaced with broader categories), and so forth.

For text data, the synthetic data generation platform 104 can anonymize and/or depersonalize sensitive information in documents, emails, and other textual content/sources while preserving the context and/or structure of the text. For audio data, the synthetic data generation platform 104 can generate synthetic audio files that maintain the acoustic properties (e.g., pitch, tone, rhythm) of the original recordings. With image data, the synthetic data generation platform 104 can create synthetic images that replicate the visual characteristics (e.g., color distribution, texture, spatial relationships) of the original images. Similarly, for video data, the platform can generate synthetic videos that retain the temporal and spatial properties (e.g., same motion patterns, lighting conditions) of the original footage. Further examples of generated synthetic data are discussed with reference to FIG. 3.

In some implementations, the initial synthetic dataset 108 can be evaluated against one or more calibration (e.g., validation) checks to ensure that the initial synthetic dataset 108 satisfies one or more criteria (e.g., benchmarks such as statistical similarity to the observed dataset, preservation of data distributions, compliance with guidelines, and so forth) before being output from the synthetic data generation platform 104. For example, the calibration engine 110 can validate that the initial synthetic dataset 108 has a tracking relationship value below a certain threshold using methods discussed with reference to FIG. 2. The calibration engine 110 refines the initial synthetic dataset 108 to produce a calibrated synthetic dataset 112. In some implementations, the calibration engine 110 can use machine learning algorithms to iteratively adjust the initial synthetic dataset 108.

The synthetic data generation platform 104 can generate a compliance indicator 114 (e.g., an audit, a compliance report, and so forth) of observed dataset 102, which can be an artifact (e.g., text document, image, video, audio) generated by the synthetic data generation platform 104 that indicates the synthetic data's compliance with one or more guidelines (e.g., privacy regulations). The compliance indicator 114 can include metrics such as a tracking relationship value determined using methods discussed with reference to FIG. 2 and FIG. 3.

Figure 2:
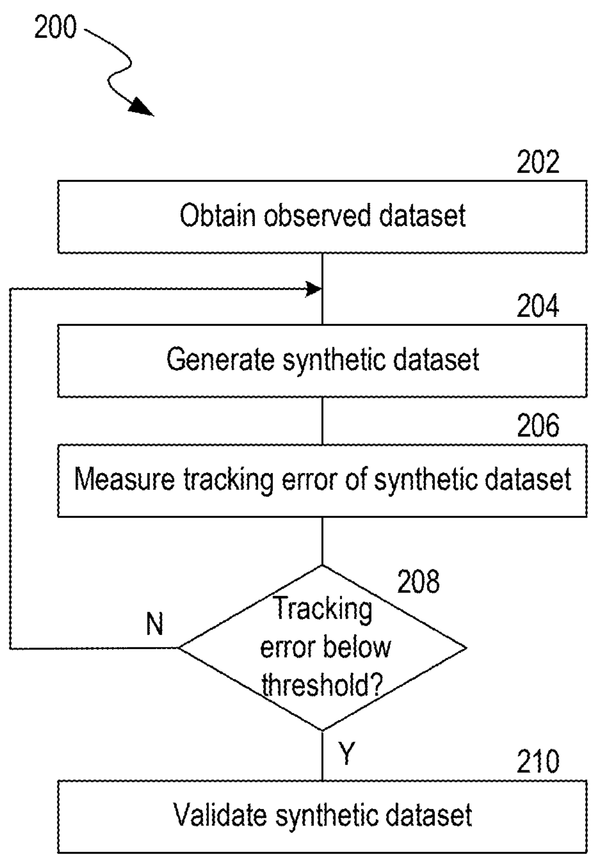
FIG. 2 illustrates an example environment of a calibration engine of the synthetic data generation platform of FIG. 1 for generating a measurable tracking relationship value of the generated synthetic data.

FIG. 2 is a block diagram illustrating an example process 200 performed by the calibration engine of the synthetic data generation platform 104 of FIG. 1 for generating a measurable tracking relationship value of the generated synthetic data. The calibration engine can be implemented on a terminal device, a server, or on a telecommunications network core. Implementations can include different and/or additional blocks or can perform the operations of the blocks in different orders.

In block 202, the synthetic data generation platform 104 can obtain an observed dataset (e.g., observed dataset 102 in FIG. 1). Users can input the observed dataset directly into the synthetic data generation platform 104 (e.g., by uploading files in formats such as CSV, JSON, Excel, and so forth). In some implementations, the synthetic data generation platform 104 can schedule regular data imports from specified sources at specified intervals (e.g., daily, weekly). Additionally, the synthetic data generation platform 104 can integrate with external systems and databases through Application Programming Interface (API) calls, allowing the synthetic data generation platform 104 to obtain data programmatically.

In block 204, the synthetic data generation platform 104 can generate a synthetic dataset (e.g., initial synthetic dataset 108 in FIG. 1). The synthetic dataset is an artificially generated dataset that mirrors the statistical properties, patterns, and characteristics of the observed dataset. For example, the synthetic data generation platform 104 can use one or more non-generative or generative models to generate the synthetic dataset. In some implementations, the synthetic dataset can be generated using machine learning models that are trained on the observed dataset. The models can learn the underlying patterns and relationships in the data and use the underlying patterns and relationships to generate new, synthetic data points that maintain similar statistical properties as the observed dataset. Further methods of generating the synthetic dataset are discussed with reference to FIG. 3.

In block 206, the synthetic data generation platform 104 can measure a tracking relationship value of one or more portions of the synthetic dataset (e.g., a specific characteristic, a group of characteristics, the entire dataset, and so forth). The tracking relationship value is a quantifiable metric. The tracking relationship value may be used to assess the fidelity and/or reliability of the synthetic dataset. The tracking relationship value can measure the difference between the synthetic dataset and the observed dataset to evaluate how accurately the synthetic data reflects the real-world conditions represented by the original data. In some implementations, the tracking relationship value can be calculated using statistical methods such as mean squared error or other distance metrics. For example, the synthetic data generation platform 104 can compare the distributions of the observed and synthetic datasets to determine a degree of similarity between them. Further methods of measuring the tracking relationship value are discussed with reference to FIG. 3.

In block 208, the synthetic data generation platform 104 determines whether the tracking relationship value is below a threshold (e.g., a predefined error value). The threshold is a predefined value that serves as a benchmark for, for example, the acceptable level of tracking error. If the tracking error of the synthetic dataset is below the threshold, it indicates that the synthetic data is sufficiently accurate. In some implementations, the threshold can be dynamically adjusted based on the specific context of the application or the sensitivity of the data.

If the tracking relationship value is below the threshold, the synthetic data generation platform 104 validates the synthetic dataset in block 210. If the tracking relationship value is below the threshold, the synthetic data generation platform 104 regenerates the synthetic dataset by proceeding back to block 204. In some implementations, the synthetic data generation platform 104 can use different algorithms or parameters to generate the synthetic dataset. Additionally, the synthetic data generation platform 104 can adjust hyper-parameters, such as learning rates or batch sizes, to improve the performance of the generative models. The synthetic data generation platform 104 can iteratively generate new synthetic datasets, measure their tracking relationship values, and refine the data until the tracking relationship value falls below the acceptable threshold.

In some implementations, the synthetic data generation platform 104 can be used to obtain cross-border approval for actual data using the generated synthetic dataset. For example, the synthetic dataset can be used to demonstrate compliance in one or more scenarios (e.g., an application domain, a target application, a particular location, a particular use case, a particular regulation, such as the European Union's General Data Protection Regulation (GDPR)). To ensure the synthetic data is a reliable proxy for the actual data and complies with applicable regulations associated with cross-border approval, the synthetic data generation platform 104 can compute the deviation between the actual and synthetic data (e.g., block 208). The synthetic data generation platform 104 can measure the statistical differences between the two datasets, such as mean, variance, and distribution, and so forth. In some implementations, the synthetic data generation platform 104 can evaluate the generated synthetic dataset against one or more benchmarks (e.g., criteria in privacy regulations). If the deviation between the actual and synthetic data exceeds a certain threshold, which may indicate a risk of re-identification the synthetic data generation platform 104 can adjust the synthetic dataset to comply with local regulations.

Figure 3:
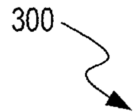
FIG. 3 is a flow diagram illustrating an example process of generating calibrated synthetic data using the synthetic data generation platform of FIG. 1.

FIG. 3 is a flow diagram illustrating an example process of generating calibrated synthetic data using the synthetic data generation platform 104 of FIG. 1. The synthetic data generation platform 104 can be implemented on a terminal device, a server, or on a telecommunications network core. Implementations can include different and/or additional operations or can perform the operations in different orders.

In operation 302, the synthetic data generation platform 104 can obtain (e.g., from a computing device), an observed dataset (e.g., actual data) including 1) a set of attributes and/or 2) a set of observed values of the set of attributes. In some implementations, the synthetic data generation platform 104 can obtain the observed dataset directly from a computing device, such as a user's local machine, a server, or a cloud storage service. Further examples of observed datasets and methods of obtaining the observed dataset are discussed with reference to FIG. 2.

In operation 304, the synthetic data generation platform 104 can associate (e.g., link, map) one or more scenarios (e.g., application domains, applications, use cases, contexts, conditions, operational domains) with the observed dataset in which the dataset is configured to be applied in. The scenarios refer to specific contexts or use cases in which the observed dataset is intended to be used. In some implementations, scenarios can indicate a degree of sensitivity (e.g., highly confidential), operational domain (e.g., finance, healthcare), guideline (e.g., privacy regulation), and so forth. For example, users can classify the dataset based on its sensitivity level, such as public, internal, confidential, or highly confidential, to specify the level of data anonymization used when generating the synthetic data.

In operation 306, the synthetic data generation platform 104 can identify (e.g., associate, link, map) a subset of the set of attributes to be anonymized and/or depersonalized within the observed dataset (e.g., using the scenarios). The subset of attributes refers to specific data fields within the observed dataset that are selected for anonymization. In some implementations, the users can manually select the attributes to be anonymized and/or depersonalized.

In some implementations, the synthetic data generation platform 104 can automatically identify the subset of attributes to be anonymized and/or depersonalized based on predefined rules or machine learning models. For example, the rules can be derived from privacy regulations, organizational policies, or other guidelines that specify one or more data types to be anonymized and/or depersonalized. In some implementations, one or more machine learning (ML) models can be trained to recognize sensitive attributes by identify patterns in the data and identifying fields that are likely to contain personal information. For example, the ML models can use the format of the data (e.g., patterns of digits and letters), the presence of special characters (e.g., "@" in email addresses), the length of the data, the context in which the data appears (e.g., column names or surrounding text), and so forth to identify the patterns.

The subset of attributes can be, for example, a single variable/characteristic, a segment (e.g., a group of variables), and/or all attributes of the set of attributes. Each attribute of the segment can share a common attribute identifier. The attribute identifier can be, for example, an application domain (e.g., finance, health), an operational context (e.g., verification, audit), a user role (e.g., customer, administrator), and so forth. In some implementations, the identified subset of attributes is specified by a user of a computing device. The user can instruct the synthetic data generation platform 104 to generate a set of synthetic data for a particular combination of attributes. For instance, the synthetic data generation platform 104 can implement a graphical user interface (GUI) with checkboxes, dropdown menus, and search functionalities that enables the user to navigate through the available attributes and select one or more.

In operation 308, the synthetic data generation platform 104 can generate (e.g., using a first set of AI models) a set of synthetic values of the identified subset of attributes using the observed dataset, the identified subset of attributes, and/or corresponding observed values of the identified subset of attributes. The synthetic values are artificially generated data points that replace the original values in the identified subset of attributes.

In some implementations, the synthetic values are generated directly from the actual data, with built-in provisions to anonymize and/or depersonalize the data during the creation process. The synthetic values can be, for example, a number, a sequence of numbers, or digital data satisfying one or more statistical tests for randomness (e.g., Kolmogorov-Smirnov test, entropy, and so forth) but produced by a definite mathematical procedure (e.g., data masking, pseudonymization, generalization). For example, the synthetic data generation platform 104 can replace sensitive data elements (i.e., observed values of the identified subset of attributes) with random characters or symbols, replace identifiers with pseudonyms, and/or replace detailed data with broader categories (e.g., replacing specific ages with age ranges).

In some implementations, the synthetic data generation platform 104 can first anonymize and/or depersonalize the actual data by, for example, removing any personal information. Once the data is anonymized and/or depersonalized, synthetic values can be created from the depersonalized dataset. In this manner, the synthetic values generated are unable to be reverse-engineered and are more likely to comply with various data privacy regulations.

Additionally, the synthetic data generation platform 104 can create a mask for anonymizing and/or depersonalizing the observed values. The mask can be saved and subsequently applied to other data (e.g., data that is similar to the original data, the original data itself, different data, and so forth). For example, the synthetic data generation platform 104 can define a set of transformation rules applicable across datasets. For example, a rule for names can specify that all values in the column "Names" are replaced with random strings of characters, names from a predefined list, and so forth. Once the transformation rules are defined, the transformation rules can be saved as part of the anonymization/depersonalization mask. The mask can be versioned to keep track of changes or updates to the transformation rules. The saved mask can be applied to other datasets. For example, if a new dataset is collected that contains similar types of data, the anonymization/depersonalization mask can be applied to transform the identified attributes according to the predefined rules.

In some implementations, the synthetic data generation platform 104 can identify the distribution and characteristics of the observed data and generate synthetic values that follow the same or similar patterns. For example, if the original dataset contains ages that are normally distributed, the synthetic data generation platform 104 can generate synthetic ages that follow a similar normal distribution with a similar variance and/or mean. Additionally or alternatively, the synthetic data generation platform 104 can identify the relationships between different attributes in the observed dataset and generate synthetic values that maintain the relationships. To preserve correlations between variables in the synthetic data, the synthetic data generation platform 104 can calculate the correlation coefficient between the attributes in the observed dataset. For example, if the synthetic data generation platform 104 determines that age and income have a correlation coefficient of 0.7, the synthetic data generation platform 104 can generate synthetic values for age and income so that the synthetic data exhibits a similar correlation coefficient. In some implementations, synthetic values can be generated using machine models such as generative adversarial networks (GANs). GANs consist of two neural networks, a generator and a discriminator, that can be trained together in an adversarial manner. The generator can create synthetic data, while the discriminator can evaluate the quality of the synthetic data by comparing it to the original data.

In operation 310, the synthetic data generation platform 104 can generate (e.g., via a second set of AI models that are the same as or different from the first set of AI models) a tracking relationship value between the set of synthetic data and the observed dataset for one or more benchmarks by comparing the observed values of the identified subset of attributes and the set of synthetic values of the identified subset of attributes. In some implementations, the synthetic data generation platform 104 can calculate the tracking relationship value by determining whether the correlation between attributes in the synthetic data is within a certain threshold of the correlation in the observed data.

Additionally, the tracking relationship value can be generated by comparing the synthetic data against particular guidelines (e.g., a particular country's privacy regulations) or benchmarks (e.g., statistical properties of certain variables such as gender, income, geographic location, zip codes, and so forth). The synthetic data generation platform 104 can evaluate whether the distribution of synthetic values matches the distribution of observed values. For example, benchmarks can include gender, where the platform ensures that the distribution of gender in the synthetic data matches the observed data to preserve the proportion of male and female individuals. The synthetic data generation platform 104 can use statistical tests (e.g., mean absolute error, mean squared error, and so forth) to determine if the differences between the observed and synthetic data are beyond a certain threshold. In some implementations, the synthetic data generation platform 104 can evaluate the preservation of higher-order relationships, such as interactions between multiple attributes, to ensure that the synthetic data captures the complexity of the original dataset.

In some implementations, the synthetic data generation platform 104 can aggregate all benchmarks and calculate a weighted average. The synthetic data generation platform 104 can assign different weights to each benchmark based on their importance or relevance to the specific scenario (e.g., the associated scenario defines a set of weights for the set of benchmarks). For instance, in a healthcare dataset, benchmarks related to patient demographics can be given higher weights compared to other attributes. By calculating a weighted average of the tracking relationship values for each benchmark, the synthetic data generation platform 104 can measure the difference between the weighted average and a predefined threshold to generate the tracking relationship value.

In some implementations, the synthetic data generation platform 104 can group benchmarks together based on the benchmarks' characteristics and/or the relationships between the benchmarks. For example, benchmarks related to demographic attributes such as age, gender, and ethnicity can be grouped together, while benchmarks related to financial attributes such as income, expenditure, and credit score can form another group. By grouping benchmarks, the In some implementations, the synthetic data generation platform 104 can evaluate the synthetic data's quality within each group separately. For instance, if the tracking relationship value for the demographic group is high, the platform can apply programmatic workflows to adjust the synthetic values of demographic attributes while keeping the financial attributes unchanged.

The threshold can be dynamically adjusted based on scenario or set by the user. In some implementations, the synthetic data generation platform 104 dynamically adjusts the thresholds based on the associated scenario. For example, in a scenario where high accuracy is desired, such as in medical research, the thresholds can be set higher to ensure that the synthetic data more closely matches the observed data.

In some implementations, the tracking relationship value generated by the synthetic data generation platform 104 can indicate a degree of anonymization in the synthetic data. To measure and mitigate the risk of re-identification, the synthetic data generation platform 104 can validate that each record in the dataset is indistinguishable from at least other records with respect to certain identifying attributes. For example, the synthetic data generation platform 104 can identify quasi-identifiers-attributes that, when combined, can potentially identify individuals (e.g., age, gender, and zip code). The synthetic data generation platform 104 can group records that share the same values for these quasi-identifiers, ensuring that each group contains at least a certain number of records so that it is difficult to single out any individual record based on these attributes.

In operation 312, the synthetic data generation platform 104 can, using the generated tracking relationship value, automatically execute one or more programmatic workflows to modify one or more synthetic values of the set of synthetic values of the identified subset of attributes. The programmatic workflows can modify the synthetic values using methods such as re-sampling, re-weighting, or applying transformation functions to better align certain characteristics of the synthetic data (e.g., correlation, distribution, and so forth) with the observed data. The synthetic data generation platform 104 can iteratively adjusting one or more of: 1) weights, 2) biases, or 3) activation functions of the AI models used to generate the synthetic values to reduce the tracking relationship value. In some implementations, the programmatic workflows are rule-based adjustments, where the synthetic data generation platform 104 applies predefined rules to modify the synthetic values based on the tracking relationship value. For instance, if the tracking relationship value indicates that the synthetic data has a higher variance than the observed data, the synthetic data generation platform 104 can apply a particular rule to scale down the synthetic values to reduce the variance.

In some implementations, the synthetic data generation platform 104 can determine whether the tracking relationship value satisfies a predetermined threshold of the one or more benchmarks. In response to the tracking relationship value failing to satisfy the predetermined threshold, the synthetic data generation platform 104 can regenerate the set of synthetic data. In response to the tracking relationship value satisfying the predetermined threshold, the synthetic data generation platform 104 can cause display of the set of synthetic data on the computing device. Further methods of regenerating the synthetic data are discussed with reference to FIG. 2.

Figure 4:
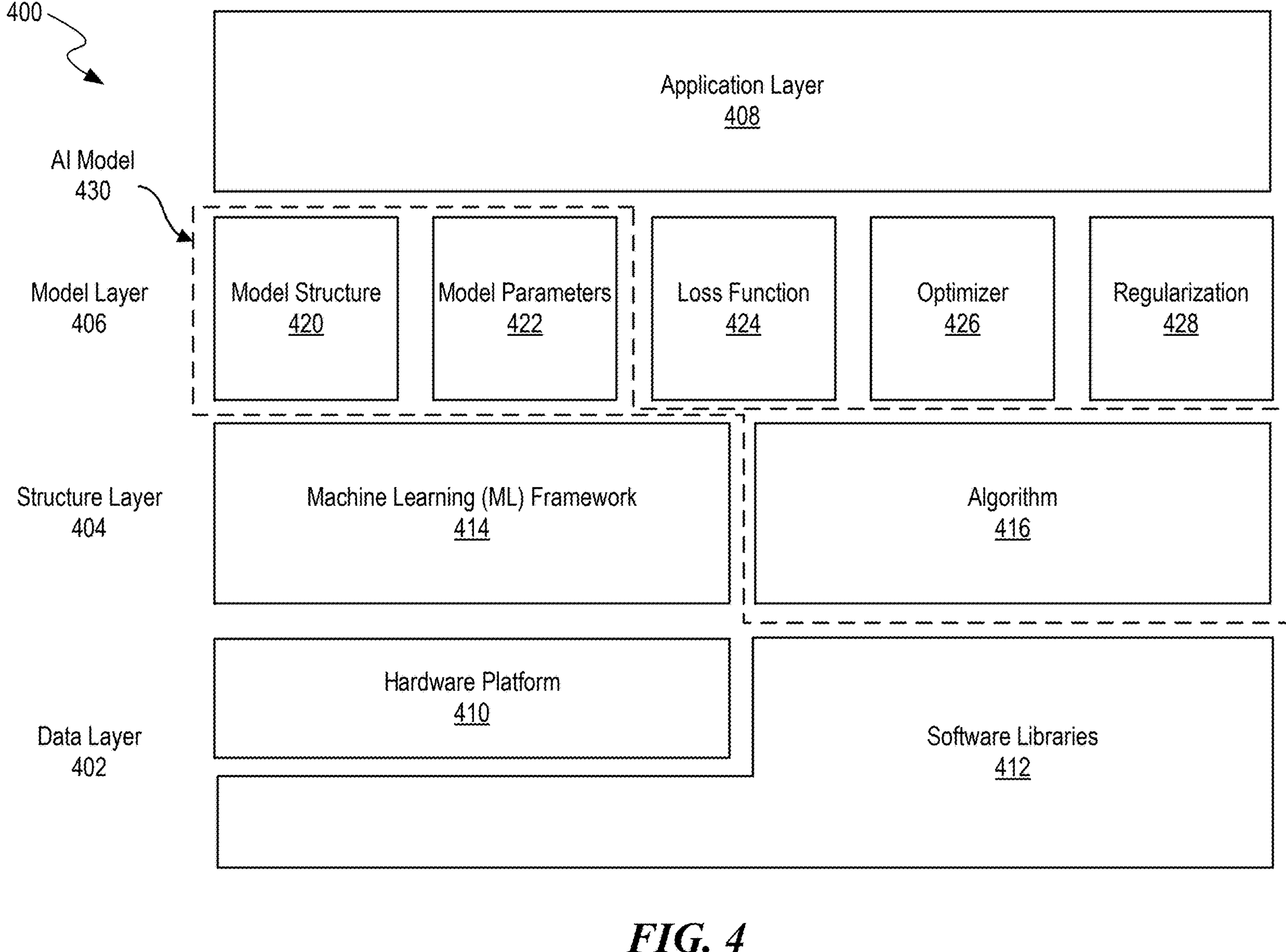
FIG. 4 illustrates a layered architecture of an artificial intelligence (AI) model system that can implement the machine learning models of the synthetic data generation platform of FIG. 1.

Example Implementation of the Models of the Synthetic Data Generation Platform FIG. 4 illustrates a layered architecture of an AI system 400 that can implement the ML models of the synthetic data generation platform 104 of FIG. 1. Example ML models can include the models executed by the synthetic data generation platform 104, such as remediation models, anomaly detection models, and so forth. Accordingly, the AI models of the synthetic data generation platform can include one or more components of the AI system 400.

As shown, the AI system 400 can include a set of layers, which conceptually organize elements within an example network topology for the AI system's architecture to implement a particular AI model. Generally, an AI model is a computer-executable program implemented by the AI system 400 that analyses data to make predictions. Information can pass through each layer of the AI system 400 to generate outputs for the AI model. The layers can include a data layer 402, a structure layer 404, a model layer 406, and an application layer 408. The algorithm 416 of the structure layer 404 and the model structure 420 and model parameters 422 of the model layer 406 together form an example AI model. The optimizer 426, loss function engine 424, and regularization engine 428 work to refine and optimize the AI model, and the data layer 402 provides resources and support for application of the AI model by the application layer 408.

The data layer 402 acts as the foundation of the AI system 400 by preparing data for the AI model. As shown, the data layer 402 can include two sub-layers: a hardware platform 410 and one or more software libraries 412. The hardware platform 410 can be designed to perform operations for the AI model and include computing resources for storage, memory, logic and networking, such as the resources described in relation to FIG. 5. The hardware platform 410 can process amounts of data using one or more servers. The servers can perform backend operations such as matrix calculations, parallel calculations, machine learning (ML) training, and the like. Examples of servers used by the hardware platform 410 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 410 can include computing resources, (e.g., servers, memory, etc.) offered by a cloud services provider. The hardware platform 410 can also include computer memory for storing data about the AI model, application of the AI model, and training data for the AI model. The computer memory can be a form of random-access memory (RAM), such as dynamic RAM, static RAM, and non-volatile RAM.

The software libraries 412 can be thought of suites of data and programming code, including executables, used to control the computing resources of the hardware platform 410. The programming code can include low-level primitives (e.g., fundamental language elements) that form the foundation of one or more low-level programming languages, such that servers of the hardware platform 410 can use the low-level primitives to carry out specific operations. The low-level programming languages do not require much, if any, abstraction from a computing resource's instruction set architecture, enabling them to run quickly with a small memory footprint. Examples of software libraries 412 that can be included in the AI system 400 include INTEL Math Kernel Library, NVIDIA cuDNN, EIGEN, and OpenBLAS.

The structure layer 404 can include an ML framework 414 and an algorithm 416. The ML framework 414 can be thought of as an interface, library, or tool that enables users to build and deploy the AI model. The ML framework 414 can include an open-source library, an API, a gradient-boosting library, an ensemble method, and/or a deep learning toolkit that work with the layers of the AI system facilitate development of the AI model. For example, the ML framework 414 can distribute processes for application or training of the AI model across multiple resources in the hardware platform 410. The ML framework 414 can also include a set of pre-built components that have the functionality to implement and train the AI model and enable users to use pre-built functions and classes to construct and train the AI model. Thus, the ML framework 414 can be used to facilitate data engineering, development, hyperparameter tuning, testing, and training for the AI model. Examples of ML frameworks 414 that can be used in the AI system 400 include TENSORFLOW, PYTORCH, SCIKIT-LEARN, KERAS, LightGBM, RANDOM FOREST, and AMAZON WEB SERVICES.

The algorithm 416 can be an organized set of computer-executable operations used to generate output data from a set of input data and can be described using pseudocode. The algorithm 416 can include complex code that enables the computing resources to learn from new input data and create new/modified outputs based on what was learned. In some implementations, the algorithm 416 can build the AI model through being trained while running computing resources of the hardware platform 410. This training enables the algorithm 416 to make predictions or decisions without being explicitly programmed to do so. Once trained, the algorithm 416 can run at the computing resources as part of the AI model to make predictions or decisions, improve computing resource performance, or perform tasks. The algorithm 416 can be trained using supervised learning, unsupervised learning, semi-supervised learning, and/or reinforcement learning.

Using supervised learning, the algorithm 416 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of dataset 102 in FIG. 1) from various source computing systems described in relation to FIG. 1. Furthermore, training data can include pre-processed data generated by various engines of the synthetic data generation platform 104 described in relation to FIG. 1. The user may label the training data based on one or more classes and trains the AI model by inputting the training data to the algorithm 416. The algorithm determines how to label the new data based on the labeled training data. The user can facilitate collection, labeling, and/or input via the ML framework 414. In some instances, the user may convert the training data to a set of feature vectors for input to the algorithm 416. Once trained, the user can test the algorithm 416 on new data to determine if the algorithm 416 is predicting accurate labels for the new data. For example, the user can use cross-validation methods to test the accuracy of the algorithm 416 and retrain the algorithm 416 on new training data if the results of the cross-validation are below an accuracy threshold.

Supervised learning can include classification and/or regression. Classification techniques include teaching the algorithm 416 to identify a category of new observations based on training data and are used when input data for the algorithm 416 is discrete. Said differently, when learning through classification techniques, the algorithm 416 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 416 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 416 is continuous. Regression techniques can be used to train the algorithm 416 to predict or forecast relationships between variables. To train the algorithm 416 using regression techniques, a user can select a regression method for estimating the parameters of the model. The user collects and labels training data that is input to the algorithm 416 such that the algorithm 416 is trained to understand the relationship between data features and the dependent variable(s). Once trained, the algorithm 416 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 416 learns patterns from unlabeled training data. In particular, the algorithm 416 is trained to learn hidden patterns and insights of input data, which can be used for data exploration or for generating new data. Here, the algorithm 416 does not have a predefined output, unlike the labels output when the algorithm 416 is trained using supervised learning. Said another way, unsupervised learning is used to train the algorithm 416 to find an underlying structure of a set of data, group the data according to similarities, and represent that set of data in a compressed format. The synthetic data generation platform 104 can use unsupervised learning to identify patterns in claim history (e.g., to identify particular event sequences) and so forth. In some implementations, performance of the AI models of the data management platform that can use unsupervised learning is improved because the incoming dataset 102 is pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 416 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 416 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 416 include factor analysis, item response theory, latent profile analysis, and latent class analysis.

The model layer 406 implements the AI model using data from the data layer and the algorithm 416 and ML framework 414 from the structure layer 404, thus enabling decision-making capabilities of the AI system 400. The model layer 406 includes a model structure 420, model parameters 422, a loss function engine 424, an optimizer 426, and a regularization engine 428.

The model structure 420 describes the architecture of the AI model of the AI system 400. The model structure 420 defines the complexity of the pattern/relationship that the AI model expresses. Examples of structures that can be used as the model structure 420 include decision trees, support vector machines, regression analyses, Bayesian networks, Gaussian processes, genetic algorithms, and artificial neural networks (or, simply, neural networks). The model structure 420 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 420 may include one or more hidden layers of nodes between the input and output layers. The model structure 420 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 422 represent the relationships learned during training and can be used to make predictions and decisions based on input data. The model parameters 422 can weight and bias the nodes and connections of the model structure 420. For instance, when the model structure 420 is a neural network, the model parameters 422 can weight and bias the nodes in each layer of the neural networks, such that the weights determine the strength of the nodes and the biases determine the thresholds for the activation functions of each node. The model parameters 422, in conjunction with the activation functions of the nodes, determine how input data is transformed into desired outputs. The model parameters 422 can be determined and/or altered during training of the algorithm 416.

The loss function engine 424 can determine a loss function, which is a metric used to evaluate the AI model's performance during training. For instance, the loss function engine 424 can measure the difference between a predicted output of the AI model and the actual output of the AI model and is used to guide optimization of the AI model during training to minimize the loss function. The loss function may be presented via the ML framework 414, such that a user can determine whether to retrain or otherwise alter the algorithm 416 if the loss function is over a threshold. In some instances, the algorithm 416 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 426 adjusts the model parameters 422 to minimize the loss function during training of the algorithm 416. In other words, the optimizer 426 uses the loss function generated by the loss function engine 424 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 426 used may be determined based on the type of model structure 420 and the size of data and the computing resources available in the data layer 402.

The regularization engine 428 executes regularization operations. Regularization is a technique that prevents over- and under-fitting of the AI model. Overfitting occurs when the algorithm 416 is overly complex and too adapted to the training data, which can result in poor performance of the AI model. Underfitting occurs when the algorithm 416 is unable to recognize even basic patterns from the training data such that it cannot perform well on training data or on validation data. The optimizer 426 can apply one or more regularization techniques to fit the algorithm 416 to the training data properly, which helps constraint the resulting AI model and improves its ability for generalized application. Examples of regularization techniques include lasso (L1) regularization, ridge (L2) regularization, and elastic (L1 and L2 regularization).

The application layer 408 describes how the AI system 400 is used to solve problem or perform tasks. In an example implementation, the application layer 408 can include a front-end user interface of the synthetic data generation platform 104.

Example Computing Environment of the Data Management Platform

Figure 5:
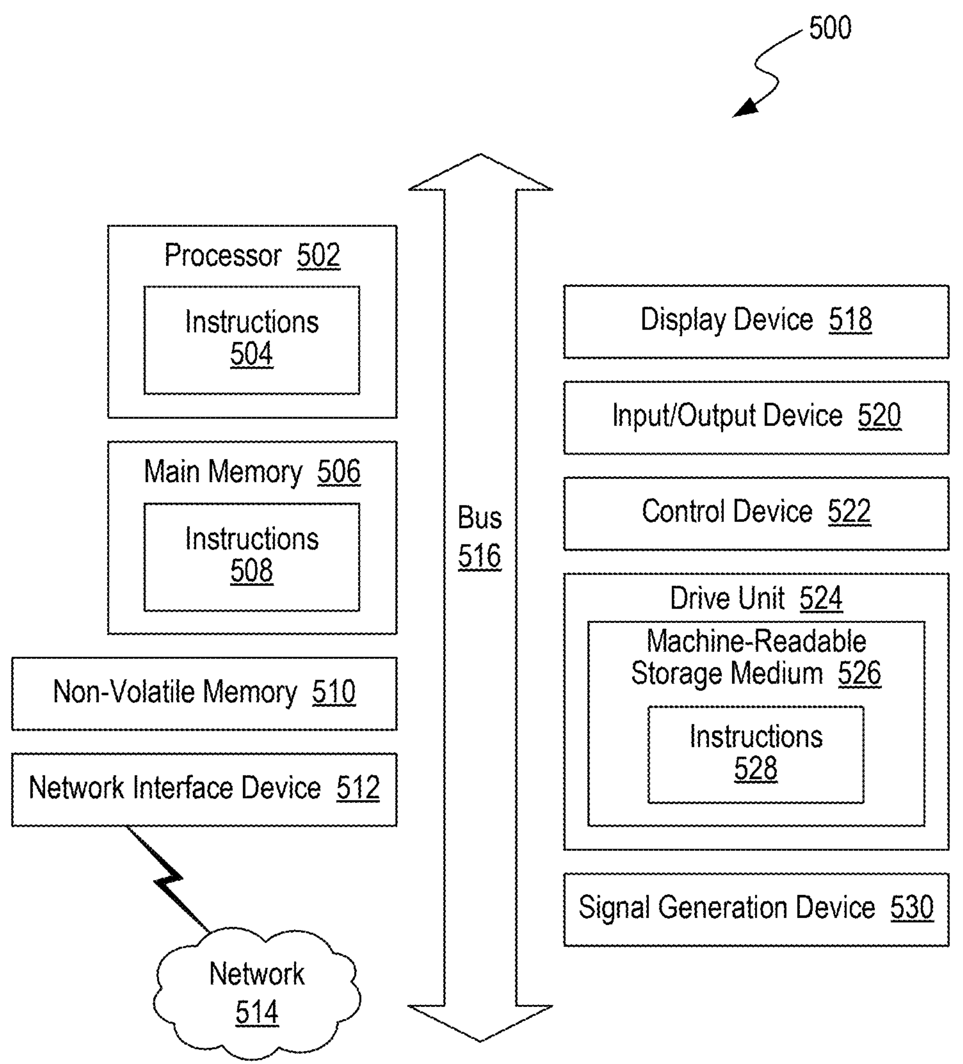
FIG. 5 is a block diagram showing some of the components typically incorporated in at least some of the computer systems and other devices on which the synthetic data generation platform of FIG. 1 operates.

FIG. 5 is a block diagram showing some of the components typically incorporated in at least some of the computer systems and other devices 500 on which the disclosed system operates. As shown, an example computer system 500 can include: one or more processors 502, main memory 508, non-volatile memory 512, a network interface device 514, video display device 520, an input/output device 522, a control device 524 (e.g., keyboard and pointing device), a drive unit 526 that includes a machine-readable medium 528, and a signal generation device 532 that are communicatively connected to a bus 518. The bus 518 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computer system 500 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 500. In some implementations, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 514 enables the computer system 500 to exchange data in a network 516 with an entity that is external to the computing system 500 through any communication protocol supported by the computer system 500 and the external entity. Examples of the network interface device 514 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 508, non-volatile memory 512, machine-readable medium 528) can be local, remote, or distributed. Although shown as a single medium, the machine-readable medium 528 can include multiple media (e.g., a centralized/distributed database and/or associated caches and servers) that store one or more sets of instructions 530. The machine-readable (storage) medium 528 can include any medium that is capable of storing, encoding, or carrying a set of instructions for execution by the computer system 500. The machine-readable medium 528 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 510, 530) set at various times in various memory and storage devices in computing device(s). When read and executed by the processor 502, the instruction(s) cause the computer system 500 to perform operations to execute elements involving the various aspects of the disclosure.

Overview of the Data Simulation Platform

The data simulation platform disclosed herein enables generation of synthetic data that retains structural, statistical, and semantic relationships within the underlying real-world data. For example, the data simulation platform enables inference of statistical attributes of and relationships between various nodes of a financial transaction network (e.g., high-frequency trading entities, prime brokers, and/or trading desks of a trading network). Based on determination of explicit structural constraints within the data of the transaction network, as well as the inferred statistical attributes and relationships, the data simulation platform can generate accurate synthetic data, informed by patent and latent relationships between entities, that enables validation and training of related artificial intelligence models (e.g., credit scoring, risk-assessment, and algorithmic trading models) in compliance with data protection regulations.

Figure 6:
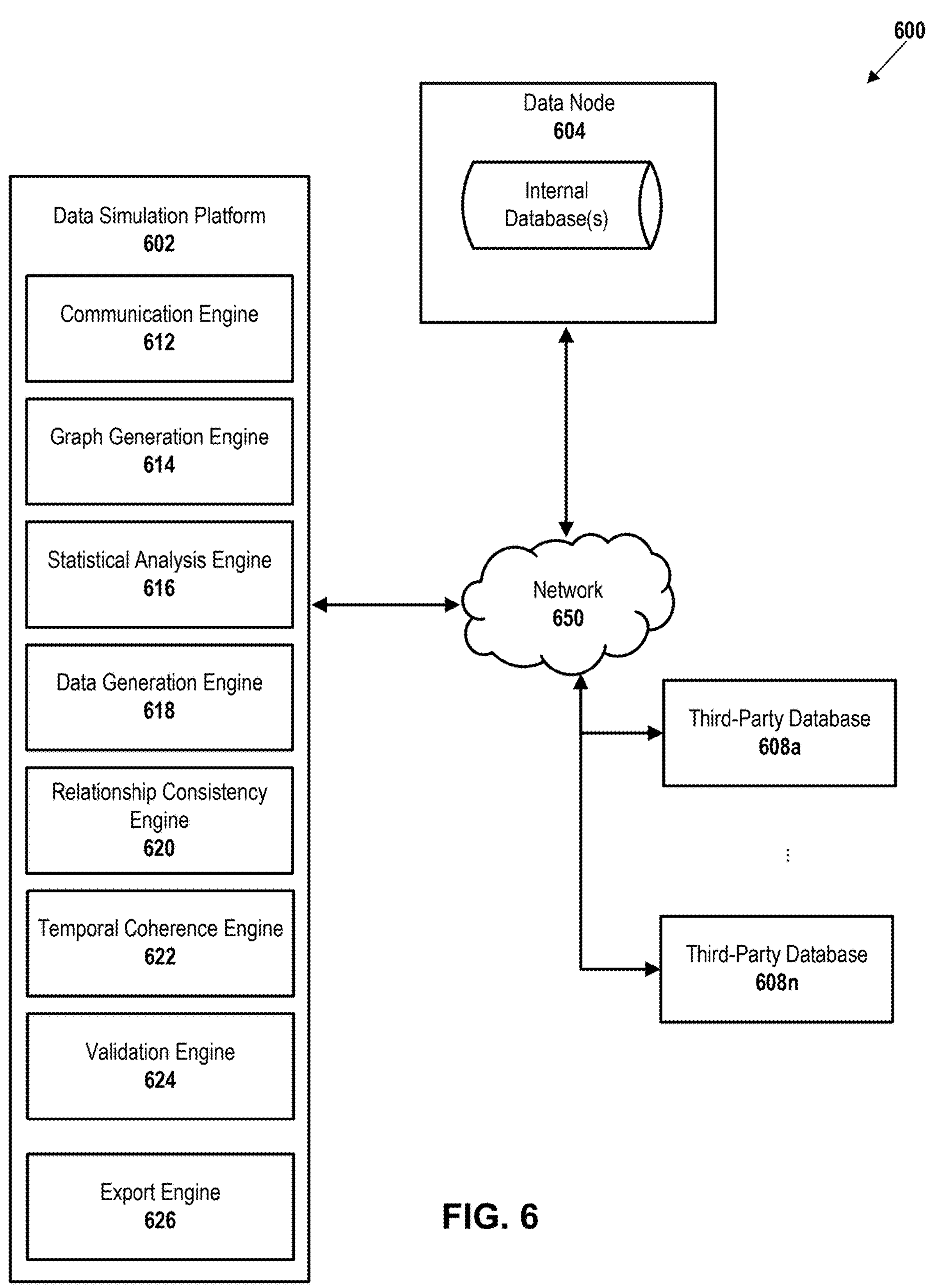
FIG. 6 illustrates an example environment of a data simulation platform that enables generation of synthetic data based on an inferred entity-relationship network capturing structural, statistical, and semantic attributes, in accordance with one or more implementations of the disclosed technology.

FIG. 6 illustrates an example environment 600 including a data simulation platform that enables generation of synthetic data based on an inferred entity-relationship network capturing structural, statistical, and semantic attributes, in accordance with one or more implementations of the disclosed technology. In some implementations, the data simulation platform generates data based on sensitive information from one or more federated databases (e.g., in a multi-party computation-type approach), thereby enabling collaborative synthetic data creation while preventing the unauthorized sharing of sensitive information. For example, the environment 600 includes the data simulation platform 602, which is capable of communicating with (e.g., transmitting or receiving data to or from) a data node 604 and/or third-party databases 604_a_-604_n_ via a network 650. The data simulation platform 602 can include hardware, software, or a combination of both and can reside on a physical server or a virtual server running on a physical computing system. For example, the data simulation platform 602 is configured on a user device (e.g., a laptop computer, smartphone, desktop computer, electronic tablet, or another suitable user device). Furthermore, the data simulation platform 602 can reside on a server or node and/or can interface with third-party databases 608_a_-608_n_ directly or indirectly. In some implementations, the data simulation platform 602 includes, processes, or generates suitable hardware or software components as described in relation to FIGS. 4 and 5 above.

In some implementations, the data simulation platform comprises one or more devices. For example, the data simulation platform includes one or more server devices or entity devices that each include one or more of the engines of the data simulation platform 602, as described in FIG. 10 below. For example, a first entity device includes a data generation engine 618 that includes a first local artificial intelligence model, while a second entity device includes another data generation engine 618 that includes a second local artificial intelligence model. The first and second entity devices can be communicably linked (e.g., using respective communication engines, such as the communication engine 612 of the data simulation platform 602) with a third entity device (e.g., a federated aggregation server) that enables aggregation of model outputs, model parameters, model parameter updates, or representations thereof for configuration of a global model. As such, the components of the data simulation platform 602 can be duplicated, distributed, and/or modified across one or more physical or virtual devices or environments (such as across one or more of third-party databases 608*a*-608*n*).

The data simulation platform 602 can include one or more components, including a communication engine 612, a graph generation engine 614, a statistical analysis engine 616, a data generation engine 618, a relationship consistency engine 620, a temporal coherence engine 622, a validation engine 624, and/or an export engine 626. One or more components can execute one or more operations associated with the disclosed technology.

The data node 604 can store various data, including one or more machine learning models (e.g., LLMs, models associated with the statistical modeling or generative artificial intelligence suites, node maps (e.g., real-world data associated with decentralized networks, knowledge networks, inferred entity-relationship networks), embeddings associated with statistical relationships, structural relationships, or semantic relationships, and/or other suitable data. In some implementations, the data node 604 stores training data, model parameters, model parameter updates, and/or representations thereof. For example, the data node 604 includes one or more internal databases (e.g., capable of storing machine learning model parameters, knowledge network data, real-world data, training data, or other suitable data). In some implementations, the data node 604 stores metadata associated with data lineage and provenance tracking that provides information relating to the structural and statistical properties preserved during the synthetic data generation process (e.g., the inferred entity-relationship network, a set of constraints, or representation(s) thereof).

The data simulation platform 602 can receive inputs (e.g., node datasets, prompts, or other suitable data) from one or more devices, servers, or systems. For example, the data simulation platform 602 can receive data or transmit data using the communication engine 612, which can include software components, hardware components, or a combination of both. In some implementations, the communication engine 612 includes or communicates with a data ingestion layer capable of performing pre-processing tasks, such as data format conversion or transformation. In some aspects, the communication engine 612 includes or interfaces with a network card (e.g., a wireless network card or a wired network card) that is associated with software to drive the card, thereby enabling communication with the network 650. In some implementations, the communication engine 612 also receives data from and/or communicates data with the data node 604, or another computing device associated with the network 650. The communication engine can interface with other components of the data simulation platform 602, including the graph generation engine 614, the statistical analysis engine 616, the data generation engine 618, the relationship consistency engine 620, the temporal coherence engine 622, the validation engine 624, and/or the export engine 626.

As an illustrative example, the data simulation platform 602 receives, via the communication engine 612, a node dataset that includes information relating to entities (e.g., within a distributed system) and relationships between the entities. For example, the node dataset includes an entity dataset (e.g., describing attributes associated with particular nodes or entities of a set of nodes), as well as a relationship dataset (e.g., including a representation of relationships between various nodes of the set of nodes).

A node dataset can include information characterizing a distributed network (e.g., real-world data). The node dataset can include structured data (e.g., in the form of a knowledge network) and/or unstructured data For example, a node dataset includes an entity dataset and a relationship dataset. The entity dataset can include a representation of a set of nodes and associated node values. For example, a node represents a distinct entity within the system being modeled (e.g., a financial trade network or a distributed microservices network). A node can include a computational or logical unit within a system that includes particular attributes and can participate in relationships with other nodes. In the context of a microservices distributed system, a node can, for example, include a containerized microservice with attributes such as a service identifier, a container version, a deployment region, CPU usage, memory consumption, API endpoint configurations, and/or associated resource usage statistics. Additionally or alternatively, a node includes a trading entity (e.g., a prime broker, a customer, a hedge fund, and/or associated devices), associated with attributes such as an entity identifier, asset classes handled, daily trading volumes, risk limits, regulatory status, counterparty relationships, and/or information associated with particular transactions.

The relationship dataset can include a representation of one or more relationships within the received data. For example, a relationship includes a connection or association between two or more nodes that define, characterize, or describe how entities interact, depend on, or influence one another within the system. The relationships can be associated with attributes, semantic labels, or other characterizing data. For example, a relationship includes rules or descriptions (e.g., logs) of API calls between particular microservices, including attributes such as call frequency, response latency, data payload size, authentication methods, and/or error rates. Additionally or alternatively, a relationship includes data characterizing transaction flows between trading entities (e.g., prime brokers, hedge funds, customers, and/or associated devices), including attributes such as transaction frequency, settlement times, transaction volumes, counterparty risk scores, and/or regulatory compliance status.

In some implementations, the node dataset includes a knowledge network (e.g., representing the real-world data). A knowledge network can include a structured representation (e.g., a tabulated data structure, map, graph, vector, or another suitable structure) of entities, relationships, and associated attributes that captures the semantic meaning and/or interconnections within a domain or network. The knowledge network can provide a framework for organizing and understanding complex data relationships through nodes representing entities and edges representing relationships between the entities. For example, the knowledge network can include nodes representing individual microservices and edges representing API dependencies, data flows, and service interactions, with attributes capturing operational metrics and configurational details. Additionally or alternatively, a knowledge network includes nodes that represent trading entities (e.g., prime brokers, hedge funds, and trading desks), with edges representing the relationships, including transaction relationships, communication channels, regulatory dependencies, and/or other suitable relationships. For example, an edge of the knowledge network represents and/or are associated with attributes, such as trading volumes, risk metrics, and/or compliance requirements.

In some implementations, the data simulation platform 602 includes the graph generation engine 614. The graph generation engine 614 can perform tasks relating to generation of and/or tuning of knowledge networks (e.g., node maps or ontological maps), including entity identifiers and relationships between associated entities. The graph generation engine 614 can include hardware components, software components, or a combination of both. For example, the data simulation platform 602 can use the graph generation engine 614 to construct knowledge networks that represent structural relationships within received node datasets, such as dependencies between microservices in distributed systems or connections between financial entities in trading networks. In some implementations, the knowledge network represents explicit relationships (e.g., as defined or described within the real-world data or node dataset). Additionally or alternatively, the graph generation engine 614 (e.g., using the statistical analysis engine 616 and/or the relationship consistency engine 620) can determine latent relationships based on statistical trends, patterns, or attributes of the underlying data. For example, the graph generation engine 614 enhances existing knowledge networks by incorporating statistical information, thereby enabling identification of previously unknown dependencies or latent communication patterns between system components. The graph generation engine 614 can communicate with or interface with other components of the data simulation platform 602, including the communication engine 612, the statistical analysis engine 616, the data generation engine 618, the relationship consistency engine 620, the temporal coherence engine 622, the validation engine 624, and/or the export engine 626.

Figure 7A:
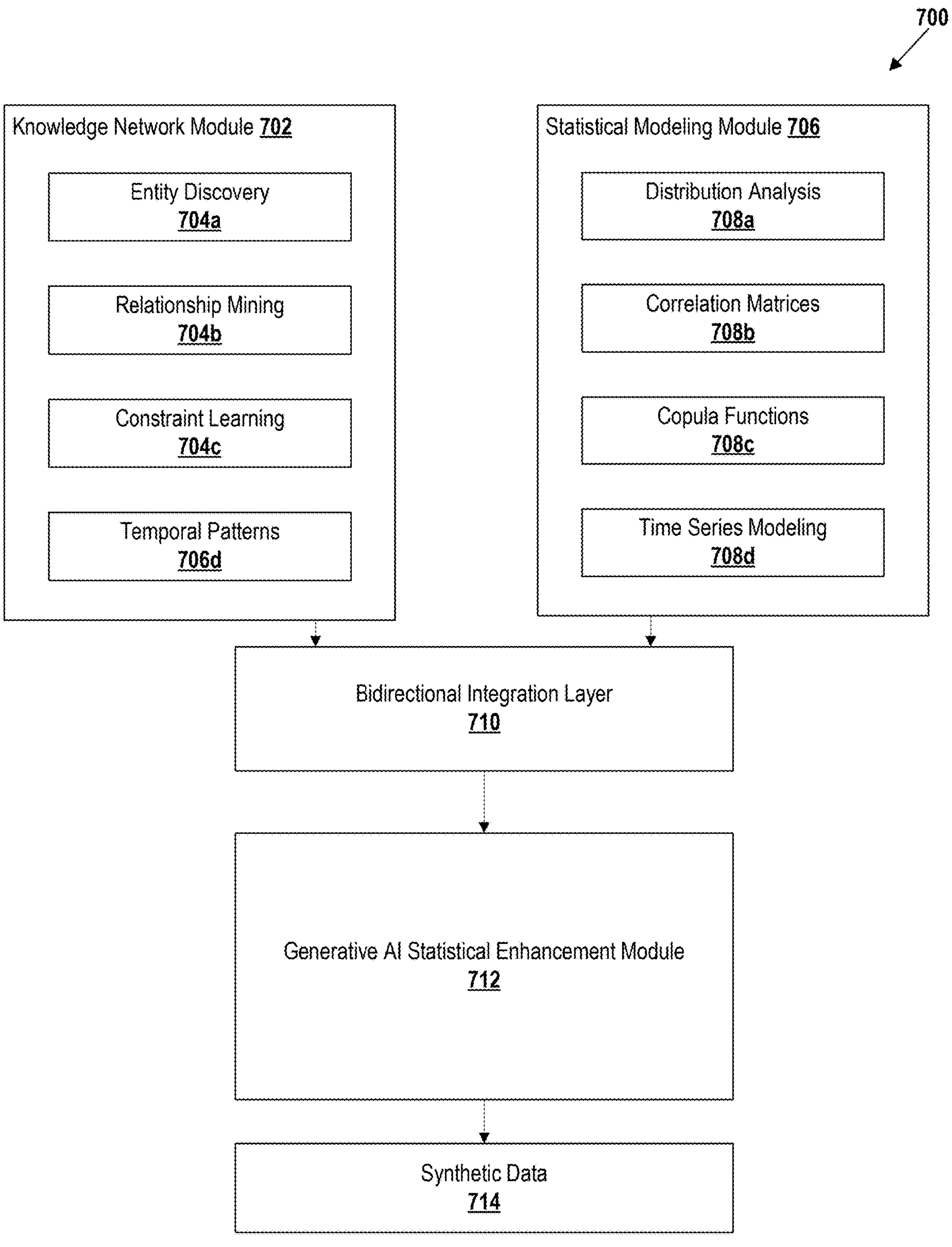
FIG. 7A illustrates an example of a data simulation platform architecture that employs bidirectional integration between statistical inference and knowledge network generation, in accordance with one or more implementations of the disclosed technology.

FIG. 7A illustrates an example of a data simulation platform architecture 700 that employs bidirectional integration between statistical inference and knowledge network generation, in accordance with one or more implementations of the disclosed technology. For example, the data simulation platform architecture 700 includes a knowledge network module 702, a statistical modeling module 706, a bidirectional integration layer 710, and/or a generative AI statistical enhancement module 712. Using the data simulation platform architecture 700, the data simulation platform 602 can generate synthetic data 714 that is consistent with real-world data (e.g., associated with an input node dataset, as described above).

Figure 7B:
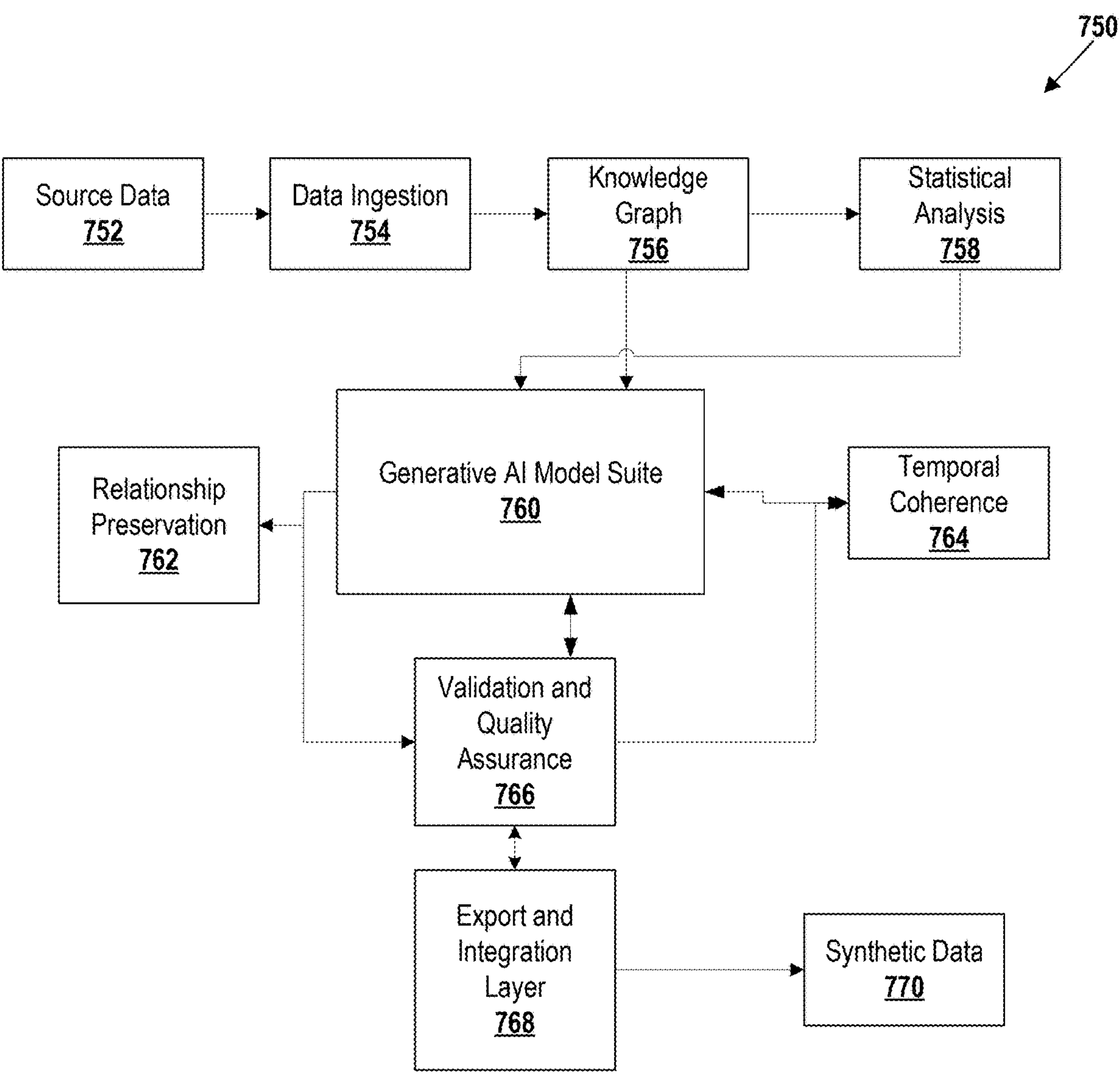
FIG. 7B illustrates an example of a system architecture for generating simulated data based on real-world data, in accordance with one or more implementations of the disclosed technology.

FIG. 7B illustrates an example of a system architecture 750 for generating simulated data based on real-world data, in accordance with one or more implementations of the disclosed technology. For example, the data generation platform 602 can receive source data 752 (e.g., corresponding to a node dataset). The data generation platform 602 can perform data ingestion 754 (e.g., by pre-processing the data and/or structuring any unstructured data within the node dataset). Based on the pre-processed data, the data generation platform 602 can generate a knowledge graph (e.g., generate an entity-relationship network using the knowledge network module 702 of FIG. 7A) that is consistent with defined or implied relationships within the dataset.

As an illustrative example, the graph generation engine 614 of FIG. 6 is associated with the knowledge network module 702 and can carry out associated operations. The knowledge network module 702 can perform operations including entity discovery 704*a*, relationship mining 704*b*, constraint learning 704*c*, and/or can generate temporal patterns 706*d*.

Figures 8A, 8B:
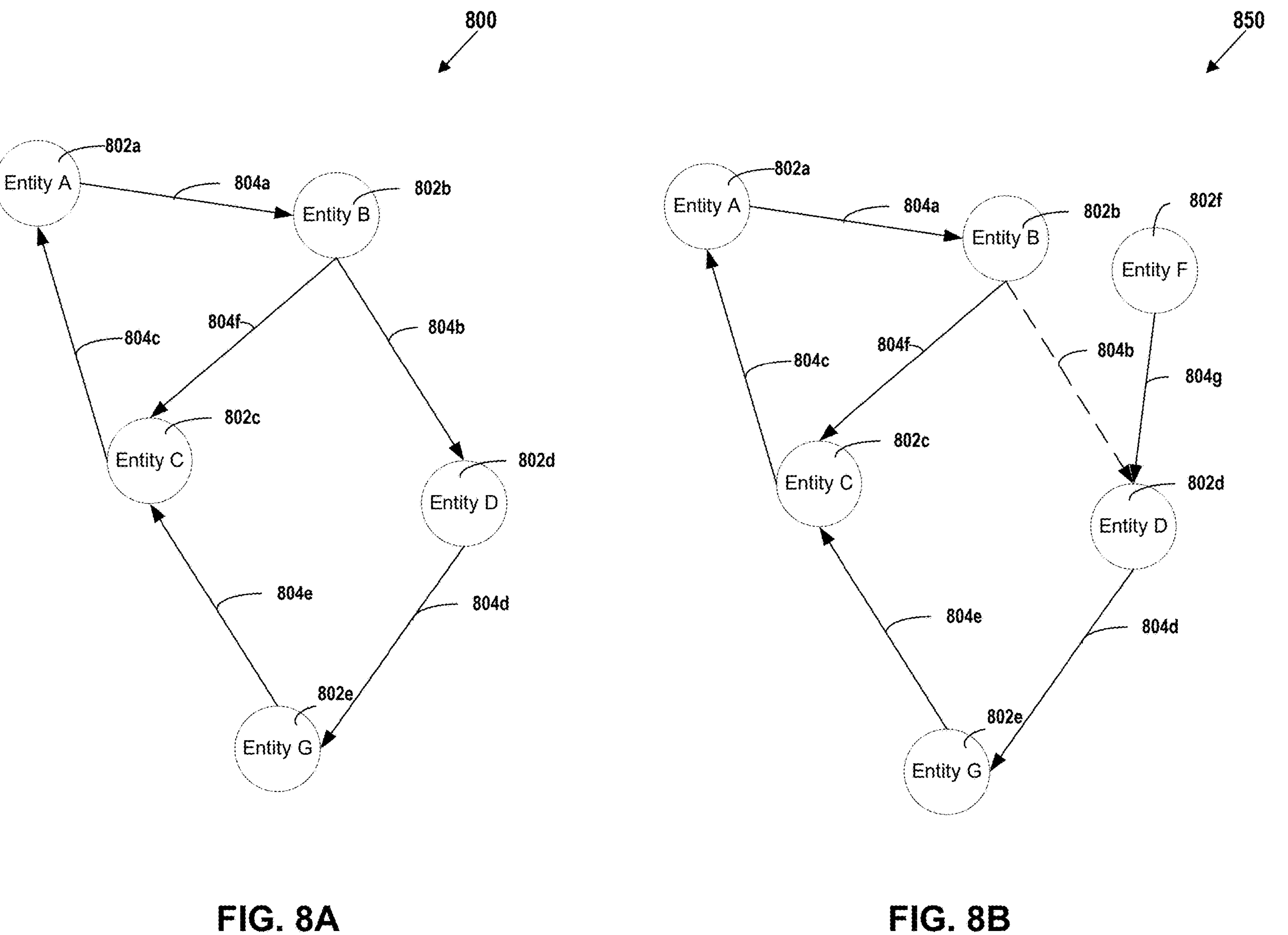
FIG. 8A illustrates a knowledge network showing entity nodes and associated explicit relationships, in accordance with one or more implementations of the disclosed technology.
FIG. 8B illustrates an inferred entity-relationship network including modifications to the knowledge network of FIG. 8A, in accordance with one or more implementations of the disclosed technology.

FIG. 8A illustrates a knowledge network 800 showing entity nodes and associated explicit relationships, in accordance with one or more implementations of the disclosed technology. To illustrate, the knowledge network 800 includes nodes 802*a*-802*e*, each representing a particular entity. The knowledge network 800 can include representations of relationships 804*a*-804*e*.

In some implementations, the graph generation engine 614 generates a knowledge network based on explicit relationships and attributes (e.g., entities) represented within the associated input node dataset (e.g., the real-world data). For example, the graph generation engine 614 can discover different entities and/or restructure unstructured data associated with the input node dataset to determine entity types associated with entities of the node dataset. The entity types include categories of objects within the data (e.g., microservice types and/or financial entity types, such as customer, products, and/or transactions). For example, the entity type can include an indication that a particular node is a customer, transaction, product or location. Additionally or alternatively, the entity represented within the knowledge network can include identity-based, transactional, categorical, locational, temporal, sensitive, and/or derived attributes. Attributes associated with customer-type entities can include identifiers, names, ages, and other suitable attributes. Attributes associated with transaction-type entities can include identifiers, dates, amounts, or other suitable attributes. Attributes associated with location-type entities can include identifiers, addresses, regions, or other suitable attributes. Attributes associated with product-type entities can include identifiers, names, categories, and other suitable attributes. In some implementations the knowledge networks (e.g., including associated entities or entity attributes) can be updated based on statistical or temporal inferences, as described below.

In some implementations, the knowledge network includes edges (e.g., the relationships 804*a*-804*e*) that represent connections between entities with associated constraints and cardinalities. For example, the knowledge network module 702 can execute relationship mining 704*b* operations to generate structured data representing relationships within the real-world data (e.g., the node dataset). In some implementations, the relationships can include identifiers of nodes associated with the endpoints of the relationship. For example, the relationship 804*b* can be associated with a node identifier for the node 802*b* (e.g., a source endpoint) and the node 802*d* (e.g., a target endpoint). The relationship can be associated with one or more types (e.g., and associated labels). Relationship types can include association, temporal, hierarchical, dependency, and/or causal relationships.

Moreover, referring to FIG. 6, the data simulation platform 602 can include the statistical analysis engine 616. The statistical analysis engine 616 enables extraction and analysis of statistical information, metrics, and patterns from node datasets and knowledge networks. The statistical analysis engine 616 can include software components, hardware components, or a combination of both. For example, the statistical analysis engine 616 analyzes relationships, values, and attributes of node datasets (e.g., datasets associated with microservice usage within a distributed network or transactions within a financial network). Based on the analysis, the statistical analysis engine 616 can infer statistics, such as correlation coefficients, distribution parameters, variance values, and other statistical metrics that characterize interdependencies between entities or nodes. In some implementations, the statistical analysis engine 616 includes or interfaces with specialized processing units (e.g., graphics processing units or tensor processing units) that are associated with software to drive the units, thereby enabling efficient, parallel statistical computation and pattern recognition. The statistical analysis engine 616 can perform univariate analysis, multivariate correlation analysis, conditional dependency analysis, outlier detection, and time-series statistical analysis (e.g., independently or in conjunction with the temporal coherence engine 622). The statistical analysis engine 616 can communicate with or interface with other components of the data simulation platform 602, including the communication engine 612, the graph generation engine 614, the data generation engine 618, the relationship consistency engine 620, the temporal coherence engine 622, the validation engine 624, and/or the export engine 626.

The statistical analysis engine 616 enables performance of statistical analysis 758 of FIG. 7A (e.g., based on statistical distribution modeling). As an illustrative example, the statistical analysis engine 616 can drive the statistical modeling module 706 (e.g., including one or more statistical inference models) of the data simulation platform architecture 700. The statistical modeling module 706 can perform operations including distribution analysis 708*a*, generation of correlation matrices 708*b*, generation and evaluation of copula functions 708*c*, and/or time-series modeling 708*d*. For example, the data simulation platform 602 provides the node dataset to a statistical inference model (e.g., associated with the statistical modeling module 706) to generate an inferred statistical dataset for the node dataset, including one or more copula characterizing the dependence between random variables within the node dataset. Additionally or alternatively, the data simulation platform 602 provides a knowledge network representing the node dataset to the statistical inference model to generate the inferred statistical dataset. The statistical modeling model associated with the module can include one or more artificial intelligence models, as described with respect to FIG. 4.

To illustrate, inferred statistical dataset can include statistical metrics and associated values, where the statistical metrics are associated with nodes of the node dataset and/or associated relationships. For example, the data simulation platform 602 performs a correlation analysis, including identifying statistical correlations between API call latencies of different microservices in a distributed system or determining correlation coefficients between trading volumes of interconnected financial entities. Additionally or alternatively, the data simulation platform 602 performs causal discovery, including applying Granger causality tests to identify temporal dependencies between microservice performance metrics or discovering causal relationships between trading decisions of different entities within a distributed financial network. Additionally or alternatively, the data simulation platform 602 performs cluster detection, including identifying groups of microservices with similar resource usage patterns or detecting trading communities within financial networks based on transaction behaviors. Additionally or alternatively, the data simulation platform 602 detects and determines anomaly patterns, including identifying unusual API call flows between microservices that indicate system issues, or detecting atypical trading patterns that represent market opportunities or risk indicators.

For example, statistical metrics that are monitored include univariate metrics, such as mean, variance, and distribution parameters for individual node attributes; multivariate metrics, such as correlation coefficients and covariance matrices between different entities; conditional dependency metrics capturing how values of one attribute affect distributions of others; outlier characteristic metrics identifying anomalous patterns and their frequencies; and time-series patterns that capture seasonal variations, trends, cyclical patterns, autocorrelation measures, temporal cross-correlation measures, and other suitable temporal dependencies. For example, statistical metrics include average API call latencies, distribution of service dependencies, correlation patterns between resource usage across different microservices, and/or temporal patterns in system load. Additionally or alternatively, statistical metrics include transaction volume distributions, correlation coefficients between trading entities, risk correlation patterns, volatility measures, and/or temporal trading frequency patterns capturing market dynamics and behavioral relationships.

Based on the inferred statistical dataset generated at the statistical inference model, the data simulation platform can generate, update, and/or tune a knowledge network representing the real-world data (e.g., using a generative AI model suite 760 of FIG. 7B). For example, using the knowledge network module 702 and the bidirectional integration layer 710, the data simulation platform 602 generates an inferred entity-relationship network that includes inferred node identifiers and node relationships based on the structural, semantic, and statistical properties of the node dataset (e.g., as described within the inferred statistical dataset). In some implementations, the statistical analysis engine 6016 uses the generative AI statistical enhancement module 712 and/or the generative AI model suite 760 to generate the inferred entity-relationship network (and/or tune the knowledge network).

FIG. 8B illustrates an inferred entity-relationship network 850 including modifications to the knowledge network of FIG. 8A, in accordance with one or more implementations of the disclosed technology. For example, the inferred entity-relationship network includes modified or generated relationships, constraints, and/or other information based on statistical or relationship-based analysis of the real-world data (e.g., the received node dataset). For example, the inferred entity-relationship network 850 includes an additional relationship 804*g* and an additional node (e.g., the node 802*f*) as compared to the knowledge network 800 of FIG. 8A (e.g., based on an inference of a correlation between the node 802*f* and the node 802*d* that was not included in the original node dataset and/or knowledge network). In some implementations, the inferred entity-relationship network does not include a relationship (e.g., the relationship 804*b*) or a node of the original knowledge network (e.g., if an explicit correlation is not statistically significant), thereby enabling the system to detect and adapt changes in relationships or communications between different entities.

In some implementations, the knowledge network (inferred or original) can incorporate constraints, such as domain-specific constraints and/or validation rules. For example, the inferred entity-relationship network includes regulatory compliance constraints ensuring that synthetic financial data adheres to Basel III capital requirements, MiFID II transaction reporting standards, or anti-money laundering detection rules. Additionally or alternatively, the inferred entity-relationship network includes architectural constraints (e.g., associated with a distributed microservice system) that includes service dependency hierarchies, API versioning compatibility rules, resource allocation limits, and/or security access control policies. In some implementations, the inferred entity-relationship network incorporates business logic constraints (e.g., referential integrity requirements between customers and transaction entities, temporal ordering constraints for sequential market events, cardinality restrictions that limit the number of relationships between specific entity types, and statistical boundary conditions that ensure that synthetic data maintains realistic value ranges and distribution properties consistent with the underlying real-world system.

In some implementations, the data simulation platform 602 includes the relationship consistency engine 620 (e.g., a relationship preservation framework to enable relationship preservation 762 of FIG. 7B). The relationship consistency engine 620 enables preservation and validation of complex inter-entity relationships prior to, during, and/or after synthetic data generation, enabling the preservation of direct and indirect dependencies. The relationship consistency engine 620 can include software components, hardware components, or a combination of both. For example, the relationship consistency engine 620 employs constraint satisfaction algorithms, relationship-aware sampling techniques, and post-generation validation to ensure that synthetic data adheres to structural integrity requirements and business logic constraints. In some implementations, the relationship consistency engine 620 interfaces with or includes specialized processing units (e.g., graph processing units or parallel computing clusters) that are associated with software to drive the units, thereby enabling efficient relationship validation and constraint checking. In some implementations, the relationship consistency engine 620 generates relationship embeddings, performs topological analysis of entity dependencies, and implements corrective feedback loops (e.g., via the validation engine 624) to address relationship violations during or following the generation process. The relationship consistency engine 620 can communicate with or interface with other components of the data simulation platform 602, including the communication engine 612, the graph generation engine 614, the statistical analysis engine 616, the data generation engine 618, the temporal coherence engine 622, the validation engine 624, and/or the export engine 626.

As an illustrative example, the data simulation platform 602 can generate a set of constraints (e.g., based on the statistical dataset inferred from the real-world data and/or using the knowledge network module 702 to perform constraint learning 704*c*) for generation of simulated data using the inferred entity-relationship network and/or the inferred statistical dataset. The set of constraints can include indications of relationships (e.g., within the inferred entity-relationship network) to be constrained or set and/or can include other policies to guide or limit the generation of synthetic data, thereby improving its real-world applicability. For example, the set of constraints includes structural integrity constraints that preserve valid entity relationships and hierarchical dependencies. Additionally or alternatively, the set of constraints can include statistical fidelity constraints that maintain correlation patterns and distribution properties observed in the original data. In some aspects, the set of constraints includes temporal coherence constraints that ensure sequencing of events and causal relationships analogous to those in real-world data (e.g., the received node dataset). Additionally or alternatively, the set of constraints includes regulatory compliance constraints that enforce industry-specific rules (e.g., capital adequacy ratios or data protection requirements) and/or cardinality constraints (e.g., limiting the number of permissible relationships between entity types. In some implementations, the inferred entity-relationship network includes the set of constraints. Additionally or alternatively, the data simulation platform 602 generates the set of constraints based on or independently of the inferred entity-relationship network. To illustrate, the bidirectional integration layer 710 can control the degree to which the inferred entity-relationship network is influenced by statistical inferences (e.g., by the statistical modeling module 706).

In some implementations, the data simulation platform 602 can generate the set of constraints including hierarchical and/or priority-based handling. For example, the data simulation platform 602 organizes constraints into multiple priority levels. For example, Level 1 critical constraints can include referential integrity requirements that are not to be violated during synthetic data generation. Level 2 important constraints can include business logic rules that define valid data states. Level 3 preferential constraints can include statistical relationship constraints that maintain data realism. Level 4 optimization constraints can include performance and distribution constraints. The data simulation platform 602 can dynamically adjust constraint prioritization based on computational resource availability, regulatory requirements, or specific use-case demands, thereby enabling that higher-priority constraints are satisfied while lower-priority constraints are applied when system resources permit. For example, critical constraints can include regulatory capital limits and settlement requirements, while preferential constraints can include maintaining historical trading volume correlations and market microstructure patterns. As an illustrative example, the data simulation platform 602 determines a priority threshold level based on a computational resource usage level associated with the data simulation platform 602. For example, the priority threshold level is relatively high (e.g, a given constraint requires a relatively high priority for inclusion within the set of constraints and/or for incorporation within the simulated node dataset or generated synthetic data) when the computational resource usage of the system is relatively high. Additionally or alternatively, the data simulation platform 602 determines a relatively low priority threshold level (e.g., where any constraints of any priority level can be incorporated within the simulated node dataset or generated synthetic data) when the computational resource usage is relatively low. For example, the priority threshold level is proportional to a resource usage metric value associated with the computing system.

In some implementations, the data simulation platform 602 uses relationship-preserving sampling to generate indications of constraints (e.g., statistical constraints). For example, the data simulation platform 602 (e.g., via the statistical modeling module 706 and/or the bidirectional integration layer 710) employs Gibbs sampling with constraints to iteratively sample values while respecting entity relationships. The data simulation platform 602 can use a Metropolis-Hastings algorithm with relationship potential functions to accept or reject samples based on relationship consistency. The data simulation platform 602 can use variational inference techniques to approximate complex joint distributions while maintaining interdependencies between nodes (e.g., entities). The relationship-preserving sampling can generate constraint indicators that specify acceptable value ranges for correlated attributes, maintain conditional probability distributions between related entities, preserve temporal ordering requirements for sequential data, and enable synthetic data generation that adheres to explicit relationships defined in the original knowledge network and implicit statistical dependencies discovered through the bidirectional integration process between structural relationships within the knowledge network and the statistically-inferred relationships associated with the underlying real-world data.

In some implementations, the data simulation platform 602 generates the constraints including embeddings of relationships. For example, the data simulation platform 602 creates learned vector representations of relationships using graph neural network embeddings that capture complex relationship patterns (e.g., multi-hop relationships), relationship type embeddings that encode different semantic categories of connections between entities, contextual relationship embeddings (e.g., that adapt based on specific entities being connected and their attributes) and temporal relationship embeddings (e.g., that capture time-varying relationship dynamics over time). To illustrate, the data simulation platform 602 can ensure temporal coherence 764 (e.g., of FIG. 7B) based on generating the temporal relationship embeddings using a temporal coherence engine. The associated relationship and temporal relationship embeddings can be incorporated into the constraint generation process to enable generation of synthetic data that preserves complex and/or nuanced relationships that are difficult to express through traditional rule-based constraints, thereby enabling the system to maintain subtle interdependencies (e.g., hierarchical trading relationships in financial networks or complex service dependencies in distributed microservices architectures) during generation of synthetic data for validation (e.g., validation and quality assurance 766 of FIG. 7B) or testing. The relationships generated or tuned using the relationship transfer learning can be incorporated within the inferred entity-relationship network and/or the set of constraints.

In some implementations, the data simulation platform 602 (e.g., through constraint learning 704*c* of the knowledge network module 702 of FIG. 7A) can execute relationship transfer learning to improve the accuracy and applicability of learned relationships (e.g., and associated constraints). For example, the data simulation platform 602 performs cross-domain relationship mapping to transfer relationship patterns between similar domains (e.g., applying trading network structures learned from equity markets to derivative markets). Additionally or alternatively, the data simulation platform 602 performs few-shot relationship learning to quickly adapt to new relationship types from minimal training examples. The data simulation platform 602 can leverage relationship interpolation to generate intermediate relationship states that bridge different entity types or temporal periods. Additionally or alternatively, the data simulation platform 602 performs relationship extrapolation to extend known relationship patterns to new contexts or previously unseen entity combinations. The relationship transfer learning process can leverage pre-trained relationship embeddings from large-scale knowledge networks and adapt relationship constraints based on domain-specific characteristics, thereby enabling the data simulation platform 602 to generate synthetic data that maintains relationship fidelity, even with limited training data or novel entity configurations in complex distributed systems. The relationships generated or tuned using the relationship transfer learning can be incorporated within the inferred entity-relationship network and/or the set of constraints.

In some implementations, the data simulation platform 602 (e.g., via the statistical analysis engine 616, graph generation engine 614, data generation engine 618, or the relationship consistency engine 620) can perform operations described herein in a parallel architecture to improve the performance of the data simulation platform. For example, the data simulation platform 602 enables independent subgraph generation (e.g., via the graph generation engine 614) to enable parallelization of generation of disconnected components of the inferred entity-relationship network. Additionally or alternatively, the data simulation platform 602 can generate multiple relationship options in parallel prior to selecting one to include within the inferred entity-relationship network and/or set of constraints (e.g., via a speculative relationship generation engine). By doing so, the data simulation platform 602 enables dynamic testing of various network topologies in a scalable manner. In some implementations, the data simulation platform 602 enables graphics processing unit-accelerated constraint checking via parallelization schemes to improve the performance of constraint generation and validation. Additionally or alternatively, the data simulation platform 602 enables distributed relationship validation (e.g., by scaling validation across multiple nodes), thereby reducing the computational burden of validating each node independently.

In some implementations, the data simulation platform 602 enables caching and memorization to improve the latency and performance of generation of synthetic data. For example, in some implementations, the data simulation platform 602 leverages a relationship pattern cache to store successful relationship generation patterns, thereby enabling retrieval when similar relationships arise in subsequently received real-world data. In some implementations, the data simulation platform 602 can leverage a constraint resolution cache to store solutions to common constraint problems (e.g., solutions to multi-variate or multi-entity constraints that otherwise require iterative methods for generating consistent attribute values within the inferred entity-relationship network or resulting simulated node dataset). In some implementations, the data simulation platform 602 includes a validation result cache to store validation results for repeated patterns to reduce the computational burden associated with validation tasks (e.g., with respect to the validation engine 624). In some implementations, the data simulation platform 602 includes a relationship embedding cache, enabling pre-computation and storage of relationship embeddings.

Referring to FIG. 6, in some implementations, the data simulation platform 602 includes the data generation engine 618. The data generation engine 618 enables generation of synthetic data (e.g., a simulated node dataset using the export and integration layer 768 of FIG. 7B) that maintains statistical properties, structural relationships, and/or temporal patterns of original datasets while ensuring privacy and anonymization. The data generation engine 618 can include software components, hardware components, or a combination of both. For example, the data generation engine 618 employs multiple specialized generative models, such as generative adversarial networks (GANs), variational autoencoders (VAEs), diffusion models, and transformer-based models, coordinate through a unified framework to generate high-fidelity synthetic data. In some implementations, the data generation engine 618 includes or interfaces with machine learning accelerators (e.g., graphics processing units, tensor processing units, or neural processing units) that are associated with software to drive the units, thereby enabling efficient synthetic data generation. In some implementations, the data generation engine 618 generates synthetic data based on constraints derived from inferred entity-relationship networks, ensuring that the generated data maintains both explicit structural relationships and implicit statistical dependencies. The data generation engine 618 can communicate with or interface with other components of the data simulation platform 602, including the communication engine 612, the graph generation engine 614, the statistical analysis engine 616, the relationship consistency engine 620, the temporal coherence engine 622, the validation engine 624, and/or the export engine 626.

For example, the data generation engine 618 generates a simulated node dataset (e.g., the synthetic data 770 of FIG. 7B) that can reflect and/or include synthetic entities, synthetic relationships, synthetic relationships, and/or synthetic temporal sequences. For example, synthetic entities include artificially generated data objects representing distinct elements within the system (e.g., nodes) while maintaining statistical and structural properties of real-world entities. Synthetic entities can include simulated trading desks, hedge funds, prime brokers, or individual traders with realistic attributes (e.g., trading volumes, risk tolerances, and regulatory classifications). Additionally or alternatively, synthetic entities can include containerized services, API endpoints, or computing resources with appropriate resource utilization patterns, latency characteristics, and dependency requirements that mirror production environments without exposing sensitive operational data.

Synthetic relationships (e.g., inferred relationships) can include artificially generated connections between entities that preserve the structural integrity, statistical correlations, and semantic meaning (e.g., as found in real-world data associated with the received node dataset). For example, the relationships can include transaction flows between trading entities (e.g., with realistic volumes and frequencies), counterparty risk exposures, hierarchical reporting structures between trading desks and parent institutions, or market correlation patterns between different asset classes. In some implementations, the data simulation platform 602 generates synthetic relationships within the simulated node dataset that include API call dependencies between simulated services, simulated data flow patterns, authentication requirements, service-level agreements, and resource-allocation relationships that maintain the complex interdependencies of the original system while enabling testing without operational leakage or risk.

In some implementations, the data simulation platform 602 includes the temporal coherence engine 622. The temporal coherence engine 622 enables preservation of time-based patterns, sequential relationships, and causal dependencies in synthetic data generation, enabling preservation of the logical progression of events and the maintenance of temporal integrity. The temporal coherence engine 622 can include software components, hardware components, or a combination of both. For example, the temporal coherence engine 622 employs multiscale attention mechanisms, hierarchical encodings, neural Hawkes processes, and temporal point processes to model sequences and generate temporal dependency graphs that capture static and dynamic interrelationships. In some aspects, the temporal coherence engine 622 includes or interfaces with time-series processing units or recurrent neural network accelerators that are associated with software to drive the units, thereby enabling efficient temporal pattern analysis and sequence modelling (e.g., in a parallelizable manner). In some implementations, the temporal coherence engine 622 preserves seasonal patterns, cyclical behaviors, and causal sequences while maintaining static and dynamic statistical distributions, thereby enabling synthetic data to reflect realistic time-based behaviors essential for applications requiring temporal fidelity. The temporal coherence engine 622 can communicate with or interface with other components of the data simulation platform 602, including the communication engine 612, the graph generation engine 614, the statistical analysis engine 616, the data generation engine 618, the relationship consistency engine 620, the validation engine 624, and/or the export engine 626.

As such, the data simulation platform 602 can generate the synthetic data (e.g., the simulated node dataset) including and/or adhering to synthetic temporal sequences. Synthetic temporal sequences can include artificially generated time-series data that preserves chronological patterns, seasonal variations, and causal relationships present in the real-world temporal data (e.g., as associated with the received node dataset). For example, the sequences include trading activity patterns showing realistic market open/close effects, seasonal volatility cycles, reaction sequences to market events, settlement timelines for different transaction types, or regulatory reporting schedules (e.g., with appropriate temporal dependencies). The synthetic temporal sequences can include traffic pattern variations throughout the day within a distributed microservices platform, service deployment and scaling events, scheduled maintenance windows, cascading failure patterns, and/or recovery sequences that maintain the temporal coherence necessary for realistic system testing and optimization.

For example, the temporal coherence engine 622 enables generation of temporal dependency graphs (e.g., using dynamic graph neural networks, causal discovery, dependency strength evaluations, and edge classification (e.g., classification of a particular relationship as being temporal, causal, or correlated in nature). The temporal coherence engine 622 can include domain-specific modules. For example, in the context of a complex financial entity network, the temporal coherence engine includes a transaction sequencer (e.g., enabling sequence analysis of different transactions, subject to settlement dependencies and regulatory constraints), a market-event correlator (e.g., correlating market events with cross-asset cascades or volatility spillover), a regulatory sequencer (e.g., enabling encoding of reporting deadlines and/or compliance patterns), and/or an anomaly preserver (e.g., enabling preservation of fraud patterns and/or market shocks). In some implementations, the data simulation platform 602, via the temporal coherence engine 622, evaluates the temporal fidelity of generated synthetic data and/or associated inferred entity-relationship networks or temporal dependency graphs based on autocorrelation similarity, event timing accuracy, a causal preservation score, and/or a sequence likelihood. In some implementations, the data simulation platform 602 enables adaptive temporal resolution (e.g., changing the time-step value associated with a time-series dynamically), temporal indexing, parallel processing, and/or graphics processing unit acceleration.

As an illustrative example, the data simulation platform 602 incorporates time-series data associated with the node dataset to enhance temporal modeling capabilities. Each data point of the time-series data can be associated with a particular timestamp, enabling the system to capture temporal dependencies and sequential relationships. The data simulation platform 602 can provide the time-series data along with other components (e.g., the node dataset, inferred entity-relationship network, set of constraints, or inferred statistical dataset) to a temporal coherence model to generate a temporal dependency graph that identifies temporal dependency constraints, sequence progression constraints, or time-based correlations. For example, the temporal dependency graph can capture the sequential nature of market events, such as how order placements during market volatility periods influence subsequent trading patterns across interconnected trading desks. The temporal coherence model enables the data simulation platform 602 to generate synthetic datasets that preserve realistic time-dependent behaviors and causal relationships, thereby improving the accuracy of synthetic data for training machine learning models in algorithmic trading systems or risk assessment applications.

Synthetic anomalies can include artificially generated edge cases, outliers, or unusual patterns that maintain the statistical and contextual characteristics of anomalies found in real-world data. For example, an anomaly includes unusual trading patterns indicative of market manipulation, liquidity gaps during stress events, flash crash scenarios, compliance violations, or fraud indicators with appropriate statistical rarity and contextual relationships. In some implementations, synthetic anomalies include simulated service degradation patterns, resource exhaustion scenarios, unusual traffic spikes, security breach indicators, or cascading failure conditions that enable testing of detection and mitigation systems without introducing actual vulnerabilities or disruption to the real-world system.

In some implementations, the data simulation platform 602 includes an anomaly preservation framework to enable generation of synthetic anomalies. For example, the data simulation platform 602 detects anomalies at multiple levels (e.g., based on statistics, pattern recognition, and/or the associated domain). In some implementations, the data simulation platform 602 classifies detected anomalies by value (e.g., with respect to alpha generation, market intelligence, risk indicators, and/or strategic signals). In some implementations, the data simulation platform 602 enables preservation of particular temporal relationships (e.g., based on a financial impact score, strategic value score, and/or relationship preservation rules).

In some implementations, the data simulation platform 602 can perform multi-dimensional bias mitigation for the synthetic data (e.g., the simulated node dataset) and associated inferred entity-relationship network and/or constraints. For example, the data simulation platform 602 enables mitigation of direct discrimination bias, indirect/proxy discrimination bias, historical bias, representation bias, aggregation bias, and/or confirmation bias.

The data simulation platform 602 can receive bias-related input data, including financial transactions, associated demographics, credit histories, and/or market data. The data simulation platform 602 can utilize the statistical modeling module 706 to conduct demographic parity testing and/or conditional statistical tests to generate distribution divergence metrics, thereby enabling an intersectional analysis of various factors associated with bias. The data simulation platform 602 can leverage a causal analysis module to perform counterfactual reasoning, explore path-specific effects, conduct a mediation analysis, and/or detect confounding factors. In some implementations, the data simulation platform 602 includes a fairness module that leverages adversarial debiasing networks, fair representation learning, bias amplification detection, and/or model interpretability analyses. By doing so, the data simulation platform 602 can perform multi-metric aggregation to determine a confidence score associated with bias detection within a particular dataset (e.g., received and/or generated). In some implementations, the data simulation platform 602 detects a particular type of bias and assigns a severity level to the detected biases. Additionally or alternatively, the data simulation platform 602 can provide the bias-related information to a regulatory compliance verification module to determine whether the generated synthetic data (e.g., the associated simulated node dataset) complies with regulatory requirements. Based on the determination, the data simulation platform 602 can generate a bias detection report to enable mitigation of bias within the data simulation platform 602.

The data simulation platform 602 (e.g., via the data generation engine 618) can generate the simulated node dataset (e.g., suitable synthetic data) in a relationship-aware manner (e.g., by performing a relationship topology analysis, by leveraging contextual generation windows, or by leveraging the relationship-preserving sampling discussed above).

To illustrate, the data simulation platform 602 can perform a relationship topology analysis to generate simulated data associated with strongly connected components together. The data simulation platform 602 can determine, within the inferred entity-relationship network, at least two inferred nodes of the set of inferred nodes that are associated with a first inferred relationship of the set of inferred node relationships. In response, the data simulation platform 602 can determine a topological sort of portions of the inferred entity-relationship network to determine an order in which to generate the simulated node dataset (e.g., the synthetic data). For example, a topological sort includes an ordering of nodes in a directed graph such that, for every directed edge from node A to node B, node A appears before node B in the ordering. As an illustrative example, the data simulation platform 602 processes prime brokers (e.g., with no dependencies), then hedge funds (e.g., which depend on prime brokers), and finally individual trading desks (e.g., which depend on both prime brokers and hedge funds). Additionally or alternatively, the platform can process core services first, followed by dependent middleware services, and finally user-facing applications that rely on both core and middleware components. The approach enables the generation of dependent entities in a manner that maintains the accuracy and business logic of network relationships, while enabling efficient parallelization of generation of synthetic data. In some implementations, the data simulation platform 602 can detect and resolve circular dependencies through relationship relaxation (e.g., by removing or relaxing a particular constraint).

In some implementations, the data simulation platform 602 generates the simulated dataset while maintaining a sliding context window. By doing so, the data simulation platform 602 (e.g., via the data generation engine 618) can preserve local relationship contexts and dependencies while limiting the burden on computational resources. Contextual generation windows can define bounded regions (e.g., within the inferred entity-relationship network) where entities and associated relationships are generated together as cohesive units, thereby ensuring that the synthetic data maintains contextual integrity of interrelated components. To enable harmonization between portions of the simulated dataset that are generated asynchronously, the context can include backward context (e.g., previously generated entities that constrain current generation), forward context (e.g., placeholder constraints for entities yet to be generated), lateral context (e.g., information relating to peer entities at the same hierarchical level) and/or temporal context (e.g., associated with time-based relationships and sequences). For example, a context generation window can include a prime broker and its directly connected hedge funds, ensuring that synthetic trading volumes, risk exposures, and transaction patterns between the entities remain consistent with the observed relationships in the original data. The data simulation platform 602 can dynamically adjust the size and scope of the contextual windows based on the density of relationships, computational resources, and specific requirements of the target application, thereby enabling generation of synthetic data that preserves local relationship fidelity and global network coherence.

In some aspects, different components of the simulated node dataset (e.g., the synthetic data) are generated using a variety of specialized generative models. For example, the data generation engine 618 includes models, such as graph neural networks, variational autoencoders, transformer-based models, generative adversarial networks, and/or diffusion models. Each specialized generative model of the model suite can be associated with a particular model specialization that enables targeted generation of specific data types or patterns within the simulated node dataset. To illustrate, graph neural networks can specialize in generating entity relationships and network structures, preserving hierarchical dependencies and complex interconnections between nodes such as trading relationships in financial networks or service dependencies in distributed systems. Variational autoencoders can focus on generating statistical distributions and maintaining probabilistic relationships between attributes associated with nodes or relationships, ensuring that synthetic data preserves the underlying statistical properties (e.g., associated with transaction volumes, risk metrics, or resource utilization patterns). Transformer-based models can specialize in sequence data generation (e.g., to create temporal patterns and time-series information that capture market dynamics, trading frequencies, or system performance metrics over time). Generative adversarial networks can include high-fidelity instance generation, including realistic generation of synthetic entities with complex attribute combinations mirroring real-world trading desks, financial instruments, or system components. Diffusion models can specialize in numerical data generation, enabling generation of continuous-valued attributes (e.g., transaction amounts, latency measurements, or risk scores), while maintaining appropriate distributions and correlations. The data simulation platform 602 can generate portions of the simulated node dataset where each portion is processed by the corresponding specialized model to generate model outputs that are subsequently integrated into the comprehensive simulated node dataset.

In some implementations, the data simulation platform 602 includes the validation engine 624. The validation engine 624 can enable verification of synthetic data quality (e.g., to determine whether the generated data meets specified criteria for statistical fidelity, structural integrity, privacy preservation, and/or regulatory compliance). The validation engine 624 can include software components, hardware components, or a combination of both. For example, the validation engine 624 performs structural validation through graph isomorphism testing, cardinality verification, referential integrity checking, and/or constraint satisfaction verification processes. For example, the validation engine 624 can perform statistical validation testing (e.g., by comparing distributions and correlations), as well as semantic validation (e.g., via business rule verification or contextual coherence testing). In some aspects, the validation engine 624 includes or interfaces with validation accelerators or distributed computing resources that are associated with software to drive the units, thereby enabling efficient, large-scale validation and quality assurance processes. In some implementations, the validation engine 624 generates validation reports, calculates quality metrics, performs privacy leakage analyses, and provides feedback to other engines for iterative improvement of synthetic data generation (e.g., via a feedback mechanism). The validation engine 624 can communicate with or interface with other components of the data simulation platform data simulation platform 602, including the communication engine 612, the graph generation engine 614, the statistical analysis engine 616, the data generation engine 618, the relationship consistency engine 620, the temporal coherence engine 622, and/or the export engine 626.

For example, the data simulation platform 602 can determine, using the validation engine 624, a validation status for components or aspects of the synthetic data (e.g., the simulated node dataset). The validation engine 624 can input the simulated node dataset into a validation model to generate a validation report for the simulated node dataset. The validation report can include an indication of at least one of a structural validation status, a statistical validation status, or a semantic validation status.

The structural validation status can include an indication of whether the simulated node dataset is consistent with the inferred entity-relationship network and the set of constraints. For example, the structural validation status includes an indication of whether synthetic trading relationships maintain proper hierarchical dependencies (e.g., between prime brokers and hedge funds, as defined in the inferred entity-relationship network). To illustrate, the validation engine 624 performs graph isomorphism testing to verify that the relationship structure matches the original (e.g., real-world) data. The validation engine 624 can perform cardinality verification to ensure that relationship multiplicities are preserved. Additionally or alternatively, the validation engine 624 performs referential integrity checking to validate foreign key relationships. The validation engine 624 can perform constraint satisfaction verification to determine whether the simulated node dataset satisfies defined constraints (e.g., within the set of constraints).

The statistical validation status can include an indication of whether the simulated node dataset is consistent with the inferred statistical dataset. To illustrate, the statistical validation status can include an indication of whether synthetic transaction volumes preserve correlation patterns and distribution properties observed in the original, real-world data. For example, the data simulation platform 602 (e.g., via the validation engine 624) can perform joint distribution testing to validate the existence of relationship-dependent distributions (e.g., as consistent with the real-world data). The data simulation platform 602 can compare correlation matrices (e.g., via the correlation matrices **708*b* operation of the statistical modeling module 706) to determine that the correlation matrices (e.g., between different attributes of the inferred entity-relationship network or resulting simulated node dataset) are similar to the correlation matrices observed in the real-world data (e.g., in the received node dataset). Additionally or alternatively, the data simulation platform 602 can verify conditional probability relationships (e.g., using Bayes' theorem). The data simulation platform 602** can perform mutual information analysis (e.g., to validate information content between related entities.

The semantic validation status can include an indication of whether the simulated node dataset is consistent with rule-based constraints. To illustrate, the semantic validation status includes an indication of whether the generated synthetic data (e.g., the simulated node dataset) adheres to business logic constraints, such as regulatory capital requirements or trading limit restrictions (e.g., in a domain-specific manner). For example, the data simulation platform 602 performs temporal consistency checking (e.g., to validate time-based relationship logic). The data simulation platform 602 can verify transitive relationships (e.g., to ensure that indirect relationships are preserved). Additionally or alternatively, the data simulation platform 602 performs contextual coherence testing (e.g., to validate that generated relationships make semantic sense).

Based on the validation report, the data simulation platform 602 can input the simulated node dataset into a data generation model to generate an updated simulated node dataset (e.g., that is consistent with the inferred entity-relationship network and is based on the simulated node dataset and the validation report). For example, the data simulation platform 602, via the validation engine 624, employs one or more feedback loops to improve the accuracy of generated synthetic data.

In some implementations, the data simulation platform 602 implements a multi-level feedback architecture. For example, data simulation platform 602 implements micro-feedback mechanisms that enable entity-level corrections with fast response times (e.g., along the order of 1 ms), enabling real-time adjustments to individual synthetic trading entities or microservices. The data simulation platform 602 can implement meso-feedback mechanisms for batch-level adjustments (e.g., with response times of approximately 100 ms), enabling corrections to groups of related financial instrument or service clusters, for example. The data simulation platform 602 can implement macro-feedback mechanisms for system-wide tuning (e.g., with response times of approximately 1 s), thereby enabling holistic adjustments to market-wide or system-wide patterns. In some implementations, the data simulation platform 602 implements meta-feedback mechanisms (e.g., that optimize the feedback process itself) by dynamically adjusting correction parameters (e.g., based on historical effectiveness).

In some implementations, the data simulation platform 602 implements adaptive correction strategies. For example, the data simulation platform 602 implements gradient-based correction strategies that use relationship violation gradients to incrementally adjust synthetic data parameters toward target statistical distributions. In some implementations, the data simulation platform 602 uses reinforcement learning correction strategies (e.g., that use reward signals based on statistical fidelity and relationship preservation) to guide synthetic data generation, thereby improving the synthetic data's accuracy and compliance with associated requirements. The data simulation platform 602 can implement evolutionary correction strategies that generate multiple candidate synthetic datasets and select those with superior preservation of inferred relationships (e.g., "critical"-level financial relationships/constraints or service dependencies). In some implementations, the data simulation platform 602 performs Bayesian optimization correction strategies that build probabilistic models associated with generation parameters (e.g., associated with the inferred entity-relationship network), thereby enabling efficient exploration of the parameter space for improved generation of simulated data.

In some implementations, the data simulation platform 602 implements feedback propagation mechanisms. For example, the data simulation platform 602 implements backward propagation mechanisms that adjust upstream generation parameters (e.g., associated with various generation models of the generation model suite) based on current quality assessments. The data simulation platform 602 can implement forward-propagation correction mechanisms that proactively adjust future synthetic data generation, thereby enabling anticipatory corrections to the generation pipeline. The data simulation platform 602 can implement lateral propagation mechanisms for feedback (e.g., to improve generation of synthetic data, such as the simulated node dataset) by coordinating adjustments across peer entities (e.g., by spreading corrections to other entities at the same hierarchical level within the inferred entity-relationship network). The data simulation platform 602 can implement temporal propagation mechanisms (e.g., by adjusting time-based dependencies to maintain consistency across time-based relationships, thereby preserving seasonal patterns in market activity).

In some implementations, the data simulation platform 602 includes the export engine 626. The export engine export engine 626 enables conversion, formatting, and transmission of synthetic data to target systems, applications, or devices in formats compatible with their requirements and use cases. The export engine 626 can include software components, hardware components, or a combination of both. For example, the export engine 626 converts synthetic data into structured datasets for database testing, API call logs for performance analysis, streaming data for real-time system validation, or specialized formats for machine learning model training and artificial intelligence applications. In some aspects, the export engine 626 includes or interfaces with data transformation units or network interface controllers that are associated with software to drive the units, thereby enabling efficient data format conversion and secure transmission capabilities. The export engine 626 can communicate with or interface with other components of the data simulation platform 602, including the communication engine 612, the graph generation engine 614, the statistical analysis engine 616, the data generation engine 616, the data generation engine 618, the relationship consistency engine 620, the temporal coherence engine 622, and/or the validation engine 624.

The data simulation platform 602 (and/or components thereof) can communicate (e.g., via the network 650 and the communication engine 612) with one or more third-party databases 608*a*-608*n*. The third-party databases 608*a*-608*n* can store various types of data that can be utilized by the data simulation platform 602 for synthetic data generation, including reference datasets, validation benchmarks, regulatory compliance templates or information, industry-specific data schemas, and/or historical pattern libraries. In some implementations, the third-party databases 608*a*-608*n* include cloud-based storage systems, distributed databases, data warehouses, and/or specialized repositories that include domain-specific information relevant to the synthetic data generation process. The third-party databases 608*a*-608*n* can provide supplementary data sources that enhance the knowledge network construction, statistical modeling, and constraint generation processes performed by the data simulation platform 602. In some aspects, the third-party databases 608*a*-608*n* include secure data repositories that require authentication and authorization protocols to access sensitive or proprietary datasets (e.g., associated with financial transactions and as regulated by suitable regulatory entities). The communication between the data simulation platform 602 and the third-party databases 608*a*-608*n* can be facilitated through standardized APIs, secure data transfer protocols, or federated query mechanisms that enable seamless integration while maintaining data security and privacy requirements. The third-party databases 608*a*-608*n* can communicate with or interface with various components of the environment 600, including the communication engine 612, the graph generation engine 614, the statistical analysis engine 616, the data generation engine 618, the relationship consistency engine 620, the temporal coherence engine 622, the validation engine 624, and/or the export engine 626.

For example, the data simulation platform 602 transmits the simulated node dataset (e.g., synthetic data) to a device, server, node, other entity for validation, testing, or evaluation of machine learning models associated with the system.

As an illustrative example, the data simulation platform 602 provides synthetic financial trading data to regulatory compliance systems for stress-testing of risk management models. Additionally or alternatively, the data simulation platform 602 transmits synthetic microservices performance data to development environments for load-testing and capacity planning (e.g., without exposing proprietary data associated with the real system). In some implementations, the data simulation platform 602 formats the synthetic data (e.g., the simulated node dataset) according to target system requirements (e.g., by converting knowledge network representations into relational database schemas, transforming temporal sequences into time-series formats for analytical tools, or packaging synthetic datasets with associated metadata).

Engines, subsystems, or other components of the data simulation platform 602 are illustrative. As such, operations, subcomponents, or other aspects of particular subsystems (e.g., engines) of the data simulation platform 602 can be distributed, varied, or modified across other engines. In some implementations, particular engines can be deprecated, added, or removed. For example, operations associated with generation of the knowledge network can be performed at the statistical analysis engine 616, the relationship consistency engine 620, the temporal coherence engine 622, the validation engine 624 (e.g., or any suitable engine) instead of or in addition to the graph generation engine 614.

Figure 9:
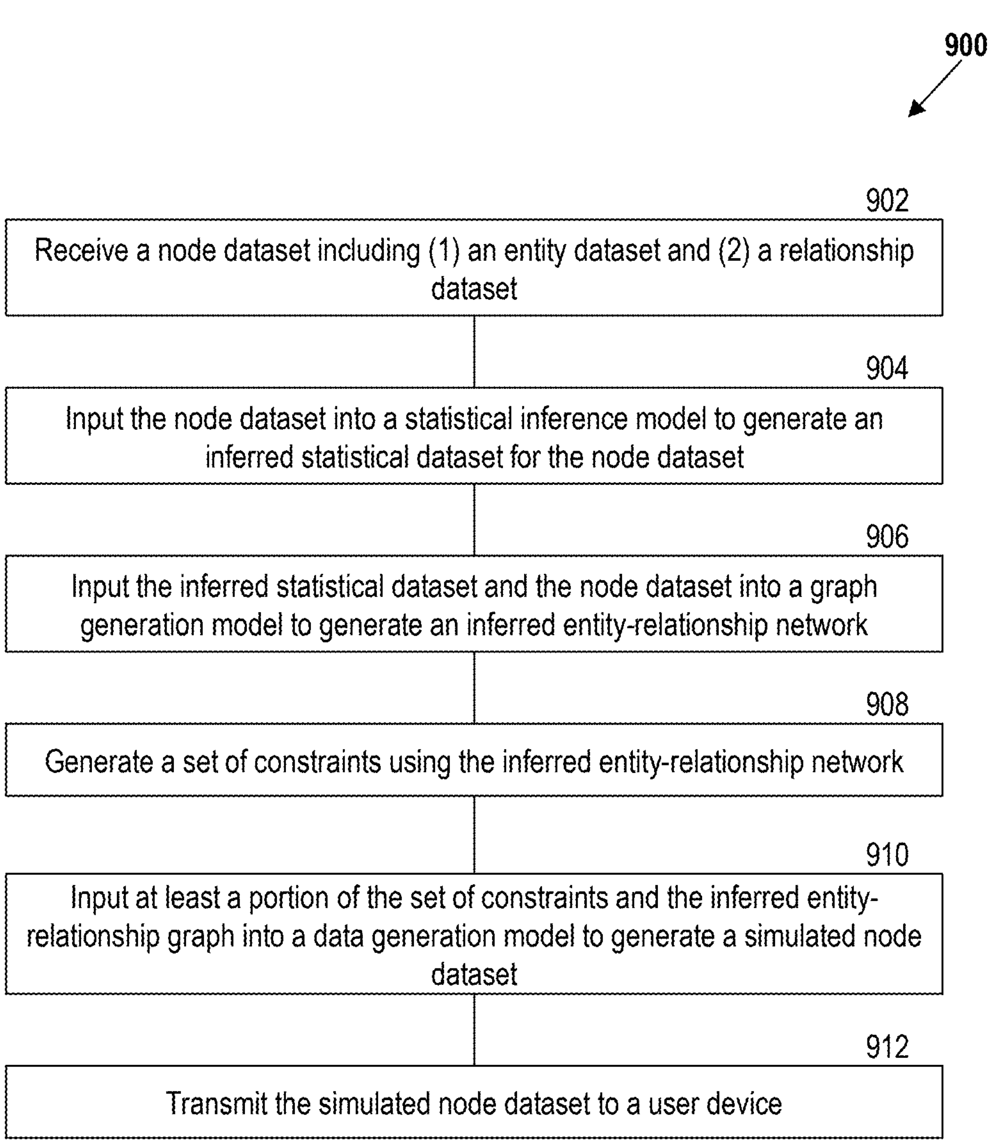
FIG. 9 illustrates an example flowchart for a process for graph-driven synthetic data generation based on statistical inference of interdependencies and constraints, in accordance with one or more implementations of the disclosed technology.

FIG. 9 illustrates an example flowchart for a process 900 for graph-driven synthetic data generation based on statistical inference of interdependencies and constraints, in accordance with one or more implementations of the disclosed technology. For example, the data simulation platform 602 receives a financial trading network dataset including prime brokers and trading desks and their associated transaction relationships. The data simulation platform can apply statistical inference to discover latent trading patterns and correlations, thereby enhancing the knowledge network with derived statistical metric values. By doing so, the data simulation platform 602 enables generation of synthetic trading data that preserves network topology and statistical properties (e.g., for subsequent testing and/or validation of adjacent machine learning models) without exposing sensitive data.

At 902, the data simulation platform 602 can receive a node dataset representing entities and associated relationships. For example, the data simulation platform 602 receives a node dataset comprising (1) an entity dataset and (2) a relationship dataset. The entity dataset can include a representation of a set of nodes and associated node values. The relationship dataset can include a representation of relationships between at least two nodes of the set of nodes. As an illustrative example, the data simulation platform 602 receives a node dataset representing a financial trading network corresponding to trading entities (e.g., prime brokers, hedge funds, and trading desks and associated computing devices). Relationships can represent transaction flows, dependency links, and/or communication patterns between the entities. By doing so, the data simulation platform 602 enables the system to capture complex interdependencies within financial networks and/or other complex, distributed systems (e.g., a distributed system of microservices), thereby improving the accuracy and realism of synthetic data generation for regulatory compliance testing, risk assessments, or other suitable validation/training operations (e.g., for associated artificial intelligence models).

At 904, the data simulation platform 602 can input the node dataset into a statistical inference model to generate an inferred statistical dataset (e.g., capturing statistical patterns, trends, or relationships within the node dataset). For example, the data simulation platform 602 inputs the node dataset into a statistical inference model to generate an inferred statistical dataset for the node dataset. The inferred statistical dataset can include (1) a set of statistical metrics and (2) a set of statistical metric values associated with the set of statistical metrics. Each statistical metric of the set of statistical metrics can be associated with one or more nodes of the set of nodes or one or more relationships of the relationship dataset. As an illustrative example, the data simulation platform 602 analyzes transaction volumes, latency patterns, and/or dependency strengths (e.g., between trading entities or microservices of a distributed network) to generate statistical metrics such as correlation coefficients between API call frequencies, average transaction processing times, and variance measures (e.g., for trading volumes across different market conditions). The statistical inference capabilities of the data simulation platform 602 enable identification of previously unknown dependencies and latent communication patterns that are not explicitly defined in the original network structure (e.g., the original microservices log data or trading network data), thereby improving the accuracy of synthetic data generation for complex distributed systems.

In some implementations, the data simulation platform 602 generates one or more statistical metric value associated with statistical measures of the received node dataset (e.g., the received financial transaction data). For example, the data simulation platform 602 determines a statistical metric, of the set of statistical metrics, between at least two values of the associated node values of the set of nodes. The statistical metric can include at least one of a univariate metric, a multivariate metric, a conditional dependency metric, an outlier characteristic metric, or a time-series statistical metric. The data simulation platform 602 can provide the node dataset to the statistical inference model to generate at least one statistical value corresponding to the determined statistical metric. The data simulation platform 602 can generate the inferred statistical dataset including the at least one statistical value associated with the statistical metric. As an illustrative example, the data simulation platform 602 (e.g., through the statistical analysis engine 616) analyzes transaction volumes between trading entities to determine correlation coefficients, variance measures, and/or outlier patterns in trading behavior across different market conditions. By incorporating multiple types of statistical metrics, the data simulation platform 602 enables more accurate detection and preservation of complex trading patterns and relationships, thereby improving the fidelity and reliability of synthetic financial data generation while maintaining privacy requirements and avoiding the use of personal or proprietary data (e.g., as regulated by relevant regulatory organizations).

At 906, the data simulation platform 602 can input the inferred statistical dataset and the node dataset into a graph generation model to generate an inferred entity-relationship network (e.g., representing ontological structures, such as trading network patterns). For example, the data simulation platform 602 inputs the inferred statistical dataset and the node dataset into a graph generation model to generate an inferred entity-relationship network including (1) a set of inferred node identifiers corresponding to a set of inferred nodes and (2) a set of inferred node relationships. The inferred entity-relationship network can include an indication of structural, semantic, and statistical properties of the node dataset. The indication of the structural, semantic, and statistical properties can be consistent with the inferred statistical dataset. Each relationship of the set of inferred node relationships can indicate a particular relationship label between at least two particular nodes of the set of inferred nodes. As an illustrative example, the data simulation platform 602 generates an inferred entity-relationship network for a financial trading network that captures explicit relationships (e.g., direct trading partnerships or communications between prime brokers and hedge funds) and latent statistical dependencies (e.g., correlated trading volumes during market volatility events), thereby enabling the system to represent complex multi-dimensional trading behaviors that emerge from statistical analysis of transaction patterns. By leveraging a bidirectional integration layer between generated knowledge networks and statistical inferences, the data simulation platform 602 enables enhanced, accurate modelling of real-world systems (e.g., financial system dynamics and/or dynamics within a distributed mesh of microservices).

At 908, the data simulation platform 602 can generate a set of constraints based on the inferred entity-relationship network. For example, the data simulation platform 602 generates, using the inferred entity-relationship network, a set of constraints for generation of simulated data. As an illustrative example, the data simulation platform 602 generates constraints that ensure that synthetic trading data maintains realistic transaction volume ratios (e.g., between prime brokers and associated hedge funds). For example, the data simulation platform 602 preserves the temporal ordering of market events and can enforce regulatory requirements across generated trading entities. In some implementations, the data simulation platform 602 generates a range of acceptable values for given attributes or factors associated with the node dataset, such as minimum and maximum transaction volumes, correlation thresholds between related entities, temporal dependencies that are maintained between sequential events, and structural integrity requirements, thereby ensuring referential consistency between interconnected nodes within the synthetic data generation process, even when associated constraints are latent.

In some implementations, the data simulation platform 602 uses relationship sampling algorithms to determine constraining relationships to be reflected in the synthetic data generated. For example, the data simulation platform 602 determines a relationship sampling algorithm comprising at least one of: a Gibbs sampling algorithm, a Metropolis-Hastings algorithm, or a Variational Inference algorithm. The data simulation platform 602 can apply the relationship sampling algorithm to the received node dataset to determine a relationship constraint set associated with the set of inferred node relationships. The data simulation platform 602 can generate the set of constraints including the relationship constraint set. As an illustrative example, the data simulation platform 602 applies Gibbs sampling to iteratively sample trading relationships between financial entities, ensuring that synthetic transaction flows maintain realistic dependency structures (e.g., between prime brokers, hedge funds, and trading desks), while preserving context-specific (e.g., market-specific) correlation patterns observed in the original trading network. By doing so, the data simulation platform 602 can generate synthetic data that maintains complex interdependencies necessary for training and validation of models (e.g., that enable stress testing and risk assessment modeling) in distributed systems (e.g., financial trading networks and/or distributed meshes of microservices).

In some implementations, the data simulation platform 602 embeds the relationship using an embedding model to generate the relationship-based constraint. For example, the data simulation platform 602 inputs the received node dataset into a constraint generation model to generate a relationship embedding set with respect to the received node dataset. Each relationship embedding of the relationship embedding set can characterize a corresponding inferred node relationship of the set of inferred node relationships. The relationship embedding set can include at least one of (1) a graph neural network embedding, (2) a relationship-type embedding, (3) a contextual-relationship embedding, and (4) a temporal relationship embedding. The data simulation platform 602 can generate the relationship constraint set including the relationship embedding set. As an illustrative example, the data simulation platform 602 generates graph neural network embeddings that capture hierarchical relationships between trading desks and parent institutions, relationship-type embeddings that distinguish between different transaction or relationship categories (e.g., equity trades, derivatives, repo agreements, etc.), and temporal embeddings that encode time-dependent trading patterns during market openings and closing periods. The embedding-based constraint generation enables preservation of nuanced relationship semantics that are computationally difficult to represent through traditional rule-based approaches, thereby improving the technical accuracy of synthetic data generation for complex financial network modeling applications.

At 910, the data simulation platform 602 can input at least a portion of the set of constraints and the inferred entity-relationship network into a data generation model to generate a simulated node dataset. For example, the data simulation platform 602 inputs at least a portion of the set of constraints and the inferred entity-relationship network into a data generation model to generate a simulated node dataset consistent with the set of constraints and the inferred entity-relationship network. As an illustrative example, the data simulation platform 602 generates synthetic trading data (e.g., for a high-frequency trading network) where the simulated dataset maintains the hierarchical structure of entity relationships, as well as statistical properties (e.g., associated with transaction volumes, latencies, and market correlations observed in the original trading network). The constraint-guided generation process enables creation of technically accurate synthetic datasets that preserve complex financial system dynamics while ensuring regulatory compliance, thereby enabling stress-testing without exposing sensitive or proprietary trading information.

In some implementations, the data simulation platform 602 leverages a specialized model to generate the synthetic data. For example, the data simulation platform 602 determines a specialized generative model set associated with the data generation model. Each specialized generative model of the specialized generative model set can be associated with a particular model specialization of a model specialization set. The data simulation platform 602 can generate, based on: (1) the inferred entity-relationship network, (2) the set of constraints, and (3) the model specialization set, a portion set. Each portion of the portion set can correspond to a particular portion of the inferred entity-relationship network or a particular portion of the set of constraints. Each portion of the portion set can be associated with a corresponding model specialization of the model specialization set. The data simulation platform 602 can provide each portion of the portion set to a corresponding specialized generative model of the specialized generative model set that is associated with a corresponding model specialization of the model specialization set to generate a model output set. The data simulation platform 602 can generate the simulated node dataset including the model output set. As an illustrative example, the data simulation platform 602 employs specialized graph neural networks for modelling hierarchical trading relationships, variational autoencoders for generating transaction volume distributions, and/or transformer models for preserving temporal trading frequencies within a high-frequency trading environment. The modular specialization enables parallel processing of different aspects of the real-world data, while maintaining consistency across the entire synthetic dataset, thereby reducing computational complexity and improving scalability for large-scale financial network simulation applications.

In some implementations, the data simulation platform 602 can integrate temporal data to generate constraints that reflect temporal patterns within the real-world data. For example, the data simulation platform 602 determines time-series data associated with the node dataset. Each data point of the time-series data can be associated with a particular timestamp of a set of timestamps. The data simulation platform 602 can provide the time-series data and at least two of the node dataset, the inferred entity-relationship network, the set of constraints, or the inferred statistical dataset to a temporal coherence model to generate a temporal dependency graph consistent with the time-series data. The temporal dependency graph can identify at least one of a temporal dependency constraint, a sequence progression constraint, or a time-based correlation. The data simulation platform 602 can provide the inferred entity-relationship network, the temporal dependency graph, and the set of constraints to the data generation model to generate the simulated node dataset consistent with the set of constraints, the inferred entity-relationship network, and the temporal dependency graph. As an illustrative example, the data simulation platform 602 analyzes time-series trading data from a high-frequency trading network to generate temporal dependency graphs capturing sequential market events, such as order placement patterns (e.g., during market volatility periods) and the cascading effects of large block trades across interconnected trading desks. The temporal coherence modeling enables the platform to generate synthetic datasets that preserve realistic time-dependent trading behaviors and causal relationships, thereby improving the technical accuracy of synthetic data for training machine learning models to be used in algorithmic trading systems, risk assessment applications, or other suitable models.

In some implementations, the data simulation platform 602 generates the simulated node dataset in a manner that preserves the distribution of anomalies in the underlying real-world dataset (e.g., the node dataset). For example, the data simulation platform 602 can leverage an anomaly preservation framework to preserve temporal anomalies associated with the correct temporal context.

Figure 10A:
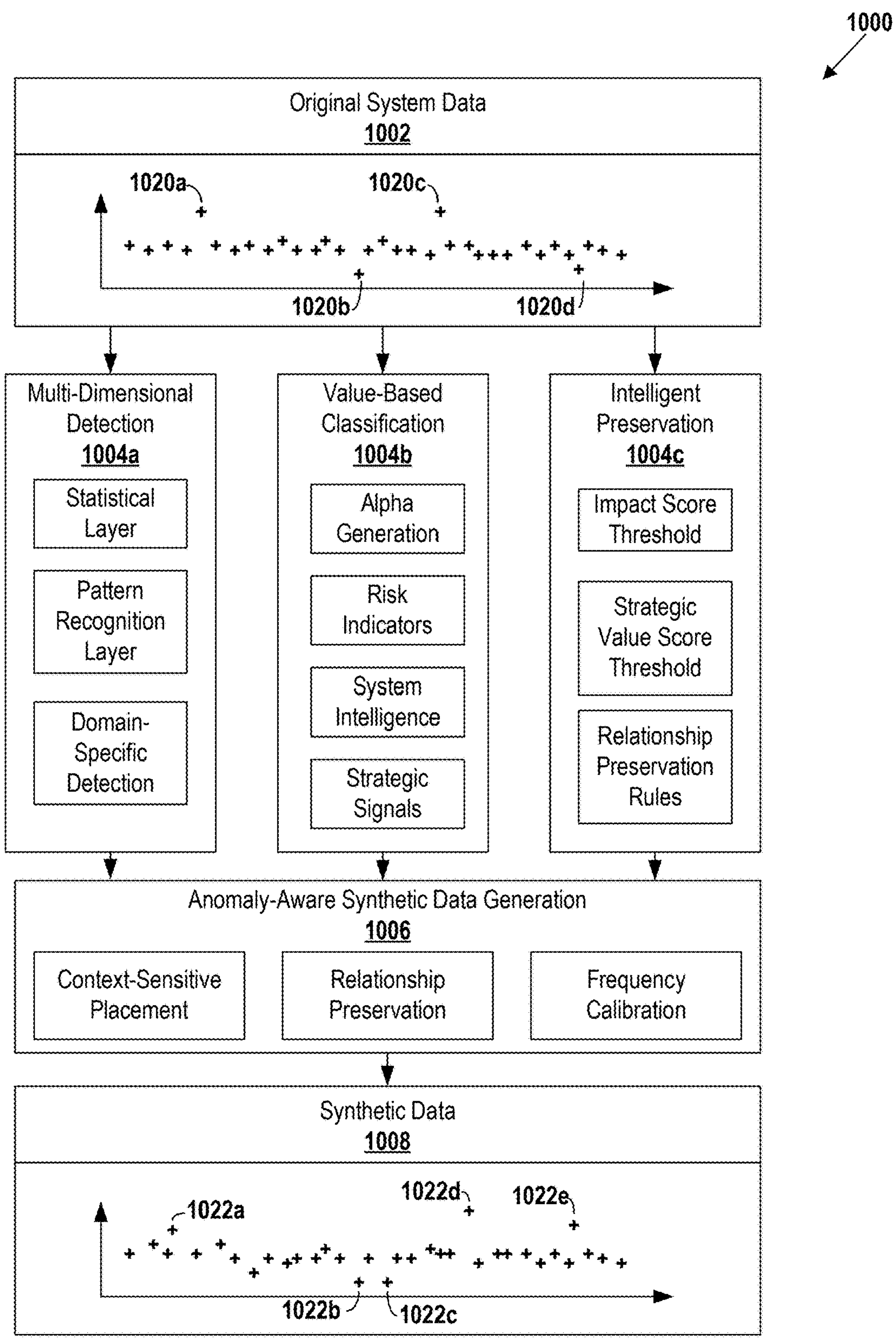
FIG. 10A illustrates an example architecture for an anomaly preservation framework associated with the data simulation platform, in accordance with one or more implementations of the disclosed technology.

FIG. 10A illustrates an example architecture for an anomaly preservation framework 1000 associated with the data simulation platform, in accordance with one or more implementations of the disclosed technology. For example, the data simulation platform 602, via the anomaly preservation platform, receives a real-world dataset (e.g., the node dataset) corresponding to the original system data 1002. The original system data 1002 can include financial market data, including temporal anomalies (e.g., anomalies 1020*a*-1020*d*). To illustrate, anomalies can include arbitrage opportunities, liquidity anomalies, break correlation anomalies, and/or risk event anomalies associated with financial market timeseries data.

In some implementations, the anomaly preservation framework 1000 enables the data simulation platform 602 to perform multi-dimensional detection at a module 1004*a*. For example, the module 1004*a* enables recognition of statistical information (e.g., at a statistical layer), patterns (e.g., at a pattern recognition layer), or domain-specific information (e.g., at a domain-specific detection layer) within the original system data 1002. For example, the data simulation platform detects statistical, pattern-based, and/or domain-specific anomalies within the original system data 1002.

In some implementations, the anomaly preservation framework 1000 enables value-based classification of the real-world data represented within the original system data 1002 using a module 1004*b*. For example, the data simulation platform can generate and/or measure alphas associated with a financial market (e.g., representing an excess return on investment in relation to a benchmark). The data simulation platform can generate risk indicators (e.g., associated with a particular market or market structure), leverage system intelligence, and detect strategic signals associated with the financial market data. By generating or recording such information relating to the real-world data, the data simulation platform enables characterization of anomalies within the real-world data that can be subsequently simulated within the generated simulated data (e.g., synthetic financial data), thereby enabling testing and validation of anomaly-related system performance.

In some implementations, the anomaly preservation framework 1000 enables intelligent preservation of aspects of the real-world data within the generated simulated data (e.g., using a module 1004*c*). For example, the data simulation platform can, using module 1004*c*, determine that a financial impact score is greater than or equal to a particular threshold value, determine that a strategic value score is greater than or equal to another particular threshold value, and/or determine relationships between variables or data points within the data for preservation within the simulated data (e.g., the simulated node dataset). As an illustrative example, the data simulation platform determines the economic significance value of a particular anomaly (e.g., a loss magnitude or a measure of the market disruption) and determine to preserve anomalies that are greater than a threshold economic significance value. Additionally or alternatively, the data simulation platform can measure the relevance of a particular anomaly (e.g., one or more of anomalies 1020*a*-1020*d*) to a particular strategic objective (e.g., risk management, regulatory compliance, and/or model robustness) and generate a strategic object relevance metric accordingly. The data simulation platform can compare the strategic object relevance metric to a particular threshold metric to determine whether to preserve the anomaly. Based on satisfaction of one or more thresholds, the data simulation platform (e.g., via the module 1004*c* of the anomaly preservation framework 1000) can generate relationship preservation rules that preserve relationships and associated anomalies within generated synthetic data that is based on the real-world system data (e.g., the node dataset or original financial market data). In some implementations, the data simulation platform represents the relationship preservation rules, including associated anomaly information (e.g., the multi-dimensional detection, value-based classification, or intelligent preservation data), within an inferred entity-relationship network (e.g., an inferred node map, as described above). Additionally or alternatively, the data simulation platform represents the anomaly-related information within the set of constraints derived from the entity-relationship network.

The anomaly preservation framework 1000 enables the data simulation platform to execute anomaly-aware synthetic data generation at the module 1006 of FIG. 10A. For example, the data simulation platform generates the simulated node dataset (e.g., the simulated financial data) based on the real-world data by placing simulated anomalies, based on the anomaly-related information (and/or associated relationship preservation rules or constraints), within the simulated dataset in a context-sensitive manner. In some implementations, the generated simulated dataset is consistent with relationship preservation rules and, therefore, preserves statistical, pattern-based, and anomaly-related information derived from the real-world dataset. The data simulation platform can calibrate the frequency of associated anomalies based on the multi-dimensional detection (e.g., from the module 1004*a*), the value-based classification (e.g., from the module 1004*b*) and/or the intelligent preservation (e.g., from the module 1004*c*). For example, the data simulation platform determines a temporal frequency associated with a particular anomaly type (e.g., arbitrage opportunity-related anomaly, a liquidity anomaly, a break correlation-related anomaly, and/or a risk event-related anomaly) and generates, within the simulated dataset, anomalies according to the determined temporal frequencies.

To illustrate, the generated synthetic data 1008 of FIG. 10 includes anomalies 1022*a*-1022*e* that reflect the statistical information, patterns, domain-specific information, alphas, risk indicators, system intelligence, strategic signals, relationship preservation rules, context-information, and anomaly frequencies of the original system data 1002. For example, 1022*a* and 1022*e* reflects arbitrage opportunity-related anomalies temporally separated in a manner that reflects the average anomaly frequency for arbitrage opportunities within the real-world, original system data 1002 (e.g., original financial market data).

Figure 10B:
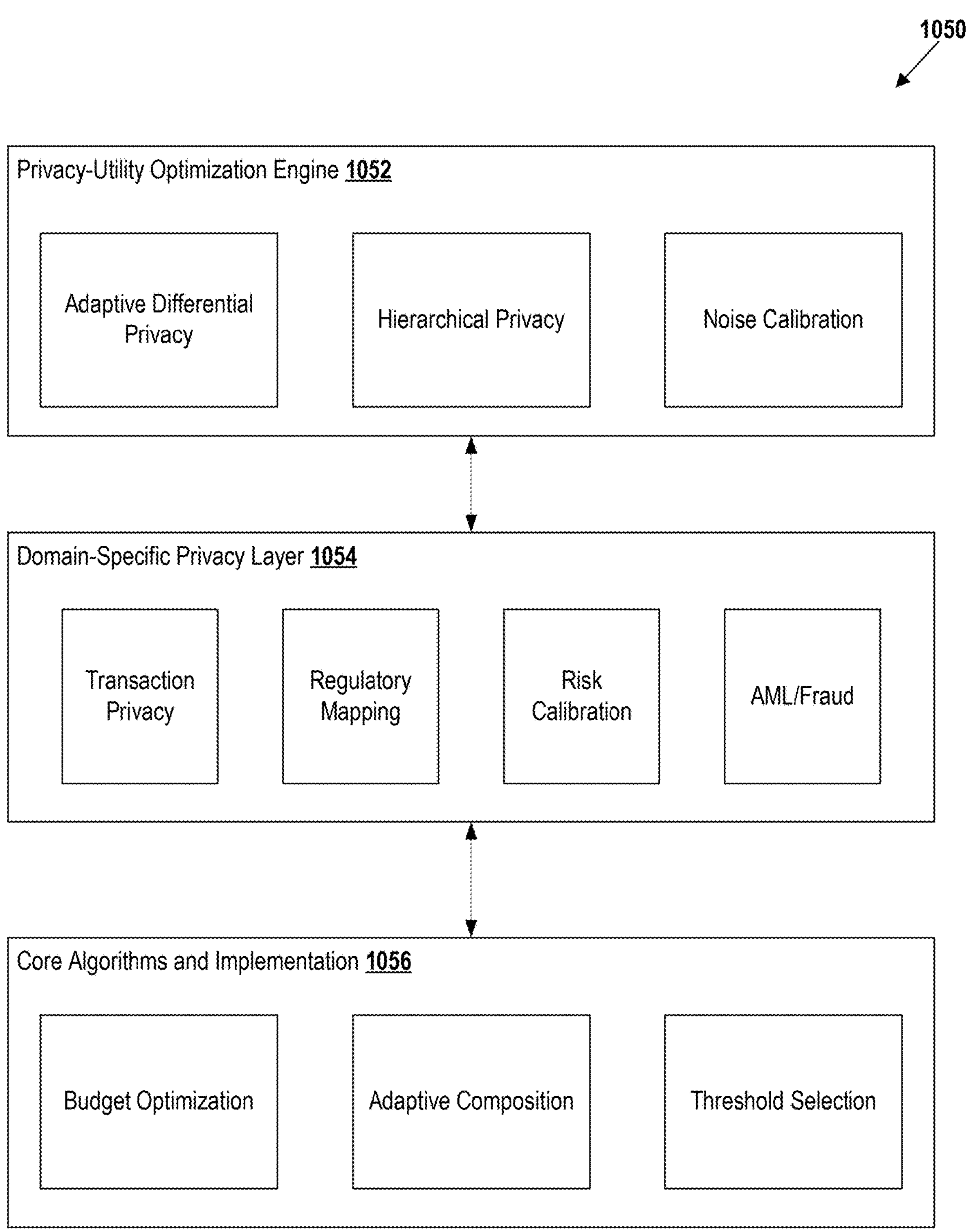
FIG. 10B illustrates an example of a privacy preservation framework associated with the data simulation platform, in accordance with one or more implementations of the disclosed technology.

FIG. 10B illustrates an example of a privacy preservation framework 1050 associated with the data simulation platform, in accordance with one or more implementations of the disclosed technology. In some implementations, the data simulation platform leverages adaptive privacy controls to protect exposure of real-world data (e.g., the node dataset) to unauthorized computing systems. As an illustrative example, the data simulation platform leverages a privacy-utility optimization engine 1052, a financial services privacy layer 1054, and/or a core algorithms and implementation module 1056. To illustrate, the privacy-utility optimization engine 1052 leverages a differential privacy framework to enable the release of statistical information relating to a dataset while protecting the privacy of individual subjects of data. To illustrate, the data simulation platform injects calibrated noise into statistical computations such that the utility of the statistic is preserved, while limiting what can be inferred about any individual in the dataset. A change to a particular entry in the generated simulated dataset only creates a small change in the probability distribution of the outputs of statistical measures. In some implementations, the data simulation platform dynamically determines a differential privacy parameter value (e.g., a privacy budget represented by ε) dynamically to control the amount of noise injected into the simulated dataset by data type, time, or dataset feature. For example, the data simulation platform 602 assigns a differential privacy parameter value based on the an event type within the dataset, as well as the desired privacy level. The data simulation platform 602 can assign a relatively high sensitivity (e.g., associated with a relatively low ε value) to large trade events to improve the privacy and security for discrete events, while using a relatively high ε value for aggregated daily volume data that does not require high levels of privacy.

In some implementations, the privacy-utility optimization engine 1052 enables the data simulation platform 602 to perform a sensitivity analysis to validate and/or configure the differential privacy parameter value. For example, the data simulation platform 602 perturbs the simulated data (e.g., by removing a particular data entry or other data element) and determines a resulting change in the statistical properties of the simulated dataset to determine a sensitivity value for the particular dataset and/or data element of the dataset. In some implementations, the data simulation platform 602 adjusts the differential privacy parameter value (e.g., the privacy budget) in response to determining the sensitivity value for the dataset. The data simulation platform 602 can implement temporal decay functions to assign a lower privacy budget value (e.g., a lower ε value) to recent or real-time data, as such data can be more sensitive. As such, the data simulation platform 602 can adjust the privacy budget according to the sensitivity and/or temporal features associated with the dataset.

In some implementations, the privacy-utility optimization engine 1052 determines privacy or exposure mitigation features in a hierarchical manner. For example, the data simulation platform 602 determines privacy controls particular to various levels (e.g., at a global level, an entity level, or an attribute level). The corresponding level-specific controls can include privacy budgets (e.g., ε values) particular to each level, each entity, and/or each attribute. In some implementation, the privacy preservation framework 1050 enables cascading guarantees (e.g., enabling privacy guarantees at higher levels, such as globally, to cascade down to lower levels, such as to the attribute or entity). For example, the data simulation platform 602 exerts a constraint such that a sum of privacy losses at lower levels does not exceed the upper-level budget. In some implementations, the data simulation platform enables granular optimization of privacy controls associated with data elements at different levels (e.g., at each hierarchical level) based on data sensitivity, utility, and age. In some implementations, the granular optimization is dynamically performed.

In some implementations, the privacy-utility optimization engine 1052 enables noise calibration for generation of the simulated dataset. For example, the data simulation platform 602 enables dynamic adjustment of noise magnitude within the simulated dataset based on the context (e.g., data sensitivity, temporal relevance, or anomaly presence). For example, recent, high-impact trades associated with the real-world dataset receive more noise, while less sensitive historical data receives less noise. By doing so, the privacy-utility optimization engine enables context-aware scaling of privacy controls applied to the various elements or levels within the simulated dataset. In some implementations, the privacy preservation framework 1050, through the privacy-utility optimization engine 1052, applies asymmetric distributions to model real-world data characteristics or to minimize distortions in particular directions of the simulated data. For example, in financial data, negative outliers can be more critical, significant, or consequential than positive outliers. As such, a skewed noise distribution enables preservation and/or configuration of statistical tail behavior within the simulated dataset. In some implementations, the privacy-utility optimization engine enables calibration of noise within the dataset to minimize utility loss metrics for defined analytical tasks (e.g., anomaly detection, risk modeling, etc.). For example, the data simulation platform 602 performs task-aware calibration of noise or adaptive epsilon allocation (e.g., of privacy budgets) based on the context of a particular task associated with the simulated data. In some implementations, the data simulation platform 602, through the privacy-utility optimization engine 1052, imposes domain constraints that limit or configure the application of noise to the simulated data. For example, the domain constraints set valid data ranges to prevent unrealistic or infeasible simulated data values. As such, the privacy-utility optimization engine enables configuration of statistical features (e.g., noise) that enable privacy protection and exposure mitigation associated with sensitive data features of the real-world data underlying the simulated data.

The privacy preservation framework 1050 can include a domain-specific privacy layer 1054 that enables protection of particular, domain-specific features of the real-world dataset and associated simulated dataset. For example, the domain-specific privacy layer 1054 includes a transaction privacy layer that defines privacy budgets associated with different elements of transactions (e.g., transaction amounts, merchants, timestamps, and locations) within the real-world dataset. In some implementations, the domain-specific privacy layer 1054 includes a regulatory mapping module enabling compliance with different regulatory regimes, such as PCI-DSS, GDPR, Basel II rules, and/or SOX audit trails. In some implementations, the domain-specific privacy layer 1054 enables risk calibration based on impact assessments, probability scoring, and sensitivity analyses, thereby enabling dynamic adjustment of privacy controls and other related parameter values. In some implementations, the privacy preservation framework 1050 includes anti-money laundering or anti-fraud features, including pattern preservation, anomaly retention, network analysis, and alert thresholds. To illustrate, the privacy preservation framework 1050 (e.g., via the core algorithms and implementation module 1056) leverages algorithms including budget optimization, adaptive composition, and threshold selection to enable domain-specific privacy-utility optimization and exposure mitigation.

In some implementations, the data simulation platform 602 generates constraints with different priority levels and generate the synthetic data such that it is consistent with certain constraints depending on their priority levels. For example, the data simulation platform 602 generates the set of constraints. A first constraint subset of the set of constraints can be associated with a first constraint priority level. A second constraint subset of the set of constraints can be associated with a second constraint priority level. The data simulation platform 602 can determine a system status indicating a computational resource usage level associated with the computing system. The data simulation platform 602 can determine, using the system status, a priority threshold level. The data simulation platform 602 can determine that the first constraint priority level satisfies the priority threshold level and that the second constraint priority level does not satisfy the priority threshold level. In response to determining that the first constraint priority level satisfies the priority threshold level and the second constraint priority level does not satisfy the priority threshold level, the data simulation platform 602 can input the first constraint subset into the data generation model to generate the simulated node dataset. The simulated node dataset is consistent with the first constraint subset and not consistent with the second constraint subset. As an illustrative example, the data simulation platform 602 prioritizes regulatory compliance constraints (e.g., capital adequacy ratios, position limits, etc.) over optimization constraints (e.g., constraints that improve the performance or scalability of the synthetic data generation system) when computational resources are not limited. Additionally or alternatively, the data simulation platform 602 also prioritizes optimization constraints when the data simulation platform 602 detects that system resource usage is high (e.g., above a particular usage threshold). The adaptive constraint prioritization mechanism enables maintenance of computational efficiency while preserving technically important data characteristics for training or validation of the target models.

In some implementations, the data simulation platform 602 leverages a topological sort to determine portions of the synthetic data to generate preferentially to other portions. For example, the data simulation platform 602 determines, within the inferred entity-relationship network, at least two inferred nodes of the set of inferred nodes that are associated with a first inferred relationship of the set of inferred node relationships. In response to determining the at least two inferred nodes, the data simulation platform 602 can determine a topological sort of portions of the inferred entity-relationship network. A first portion of the inferred entity-relationship network can include the at least two inferred nodes and the first inferred relationship. The data simulation platform 602 can input, in an order consistent with the topological sort, the portions of the inferred entity-relationship network into the data generation model to generate the simulated node dataset. The at least two inferred nodes and the first inferred relationship can be input into the data generation model simultaneously. As an illustrative example, the data simulation platform 602 first processes a financial trading network by generating synthetic data for prime brokers (e.g., with no dependencies). Subsequently, the data simulation platform 602 generates synthetic data associated with hedge funds (e.g., which depend on prime brokers) and, finally, individual trading desks (e.g., which can depend on both prime brokers and hedge funds). By doing so, the dependent entities are generated in a manner that improves the accuracy and business logic of the financial transaction network, enabling the platform to maintain referential integrity and dependency constraints during synthetic data generation, reducing the computational overhead and preventing the generation of invalid entity relationships that would compromise the structural, statistical, or semantic validity of the synthetic financial network.

At 912, the data simulation platform 602 can transmit the simulated node dataset to a user device. For example, the data simulation platform 602 transmits the simulated node dataset to a user device to cause validation or training, using the simulated node dataset, of an artificial intelligence model. As an illustrative example, the data simulation platform 602 transmits synthetic high-frequency trading data to regulatory compliance systems for automated stress-testing of capital adequacy models or to machine learning development environments for algorithmic trading systems without exposing proprietary marketing strategies or regulatorily protected information. As such, the data simulation platform 602 enables automated integration with downstream analytical streams, improving the technical efficiency of model validation workflows in distributed computing environments.

In some implementations, the data simulation platform 602 performs validations of the generated synthetic data based on structural, statistical, and/or semantic properties of the synthetic data. For example, the data simulation platform 602 inputs the simulated node dataset into a validation model to generate a validation report for the simulated node dataset. The validation report can include an indication of at least one of: (1) a structural validation status comprising an indication of whether the simulated node dataset is consistent with the inferred entity-relationship network and the set of constraints, (2) a statistical validation status comprising an indication of whether the simulated node dataset is consistent with the inferred statistical dataset, or (3) a semantic validation status comprising an indication of whether the simulated node dataset is consistent with rule-based constraints associated with the set of constraints. The data simulation platform 602 can input the simulated node dataset, the inferred entity-relationship network, and the validation report into the data generation model to generate an updated simulated node dataset, consistent with the inferred entity-relationship network and based on the simulated node dataset and the validation report. As an illustrative example, the data simulation platform 602 validates synthetic trading data by verifying relationships between particular entities within the knowledge network (e.g., structural validation), that transactions comply with regulatory requirements (e.g., semantic validation), and/or that transaction volume distributions and other statistical metrics are consistent with historical patterns (e.g., statistical validation). The validation framework enables the platform to ensure that synthetic data quality and regulatory compliance are maintained in automated financial system testing environments, thereby providing a technical solution to validating complex financial models without exposing sensitive or proprietary information.

Process for Generating Explainable Synthetic Data Based on Federated Data

The data simulation platform described herein enables generation of explainable synthetic data based on secure or sensitive real-world data from one or more devices or servers without exposure of the underlying data associated with the real-world data. For example, the data simulation platform 602 (e.g., of FIG. 6) generates simulated, synthetic data based on local models trained on real-world data that originates from multiple servers or entities (e.g., in a federated structure). Moreover, the data simulation platform 602 enables multi-layered explainability of the generated synthetic data in an analytical, interactive manner.

Figure 11:
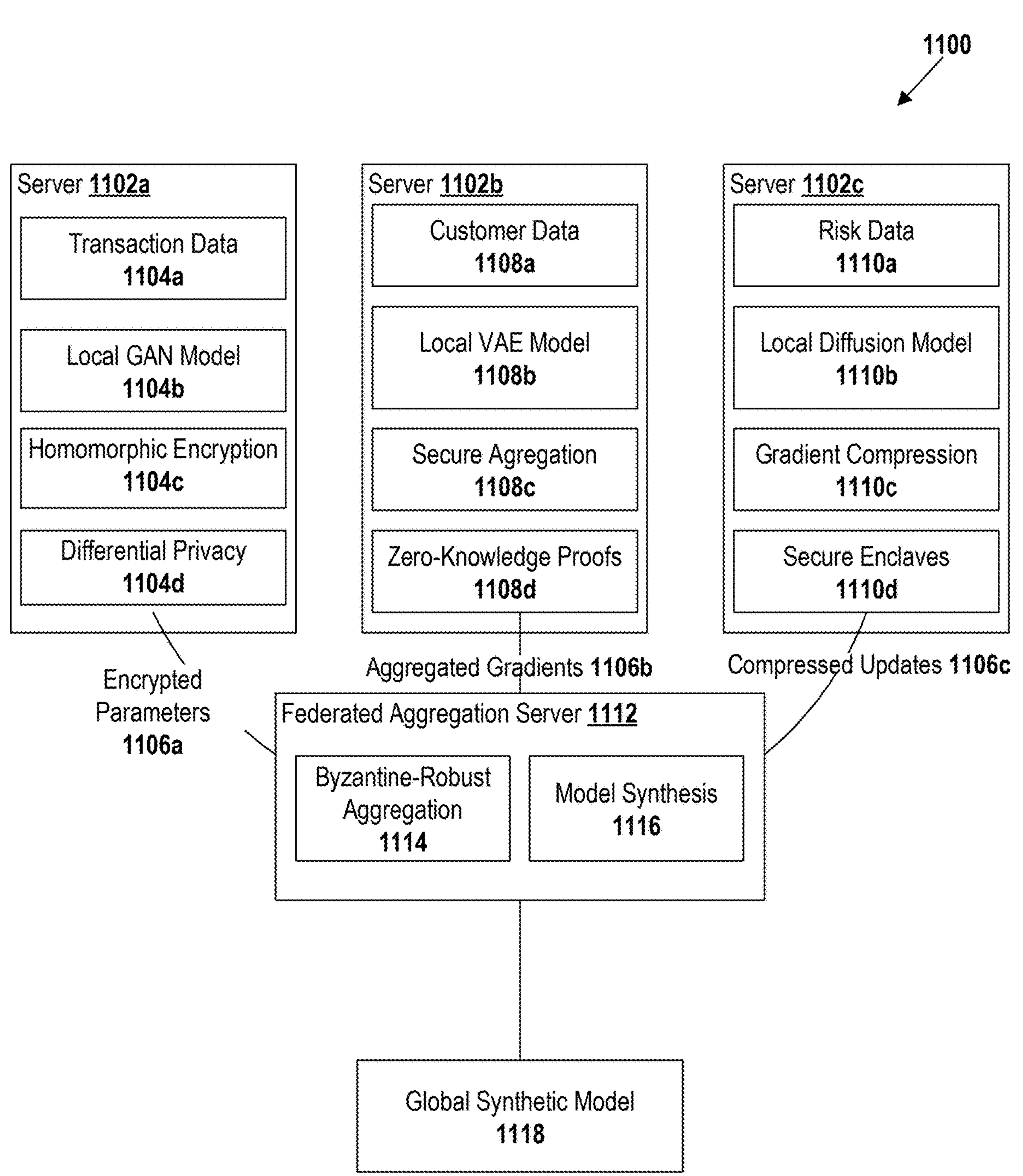
FIG. 11 illustrates an example architecture for federated synthetic data generation, in accordance with one or more implementations of the disclosed technology.

FIG. 11 illustrates an example architecture 1100 for federated synthetic data generation, in accordance with one or more implementations of the disclosed technology. For example, the data simulation platform 602 leverages data (e.g., real-world data, such as data associated with a node dataset, as described with respect to FIGS. 6-10B above) from one or more servers (e.g., server 1102*a*, server 1102*b*, and/or server 1102*c*) for federated generation of synthetic data.

To illustrate, the data simulation platform 602 can obtain a first update parameter set of a first format from a first server device (e.g., the server 1102*a* of FIG. 11). The update parameter set can include and/or be associated with parameters associated with a first local artificial intelligence model that is of a first model type. In some implementations, the local artificial intelligence model resides on or is accessible to the first server device. As an illustrative example, the data simulation platform 602 can obtain representations of model parameters and/or model parameter updates associated with local artificial intelligence models that are associated with particular servers (e.g., the server(s) 1102*a*-1102*c*), where the model parameter updates enable subsequent aggregation for configuration of a global model that enables generation of synthetic data based on information associated with multiple servers (e.g., in a federated configuration).

A server (e.g., one of servers 1102*a*-1102*c* of FIG. 11) can include a computing system or a networked device that stores, processes, and manages data or computational resources for access by other devices or systems within a network infrastructure. In some implementations, the server is associated with and/or is an entity (e.g., a device, organization, and/or other suitable structure). In some implementations, a server device includes physical hardware such as dedicated server computers, cloud-based virtual machines, containerized computing instances, or distributed computing nodes that execute machine learning processes. In some implementations, a server device includes a networked device operated by a financial institution or organization (e.g., including dedicated banking infrastructure, such as secure data centers, cloud-based financial computing instances, or distributed computing nodes or microservices). For example, the server(s) 1102*a*-1102*b* can include one or more of third-party databases 608*a*-608*n* as described in FIG. 6. The server device can include processing units, memory storage, network interfaces, and storage components that enable training of local artificial intelligence models on data, such as private customer data, transaction records, or risk assessment information (e.g., and/or other suitable input node datasets, as described below), while generating secure parameter updates for collaborative synthetic data generation. As such, a particular server device can represent a particular financial institution (e.g., a bank) and/or a particular branch or subsidiary.

The server device can include input node datasets (e.g., inputs, node datasets, and/or real-world data). An input node dataset can include data associated with model inputs. In some implementations, the input node dataset includes one or more real-world datasets to be simulated within a synthetic dataset generated by the data simulation platform 602. As an illustrative example, an input node dataset includes data of one or more different data types, including transaction data 1104*a*, customer data 1108*a*, and/or risk data 1110*a* (e.g., as associated with one or more financial institutions), as shown in FIG. 11. To illustrate, an input node dataset includes data of a particular data type and/or data of mixed data types.

A data type can include a category or classification of information characterizing the nature, structure, and/or semantic meaning of datasets stored or processed by computing systems. For example, a data type includes transaction-level data that captures individual financial operations, pattern-level data that represents behavioral trends over time, risk-score data that quantifies potential threats or opportunities, or compliance mapping-type data that ensures adherence to regulatory requirements. In some implementations, data types enable the data simulation platform 602 to apply specialized processing algorithms (e.g., local artificial intelligence models), privacy controls, and/or model architectures that are optimized for specific characteristics and/or requirements of each category of information.

Transaction data 1104*a* (e.g., or other suitable communication/transmission data) can include financial records, payment information, and/or transactional metadata capturing details of monetary or security exchanges, transfers, and/or commercial activities within a financial institution's systems. For example, transaction data 1104*a* includes customer payment histories, credit card transactions, wire transfers, account balances, merchant information, transaction timestamps, and/or associated fees or charges. In some implementations, the communication data includes communications and/or transmissions of data between one or more microservices of a distributed network of microservices (e.g., including information relating to financial transactions).

Customer data 1108*a* (e.g., or other suitable user account data) can include personal information, account details, and/or demographic characteristics associated with individual clients and/or users of a particular system (e.g., a financial services network and/or a distributed microservices network). For example, the customer data 1108*a* includes user account profiles, contact information, credit histories, loan applications, investment portfolios, customer relationship management records, and/or other suitable data that enable personalized financial services and risk assessment. In some implementations, the customer data 1108*a* includes user authentication logs, session management data across containerized applications, and/or user interaction patterns with API endpoints that capture how users and/or customers engage with digital banking platforms and/or other suitable distributed microservices networks or financial services architectures.

Risk data 1110*a* can include information relating to potential threats, vulnerabilities, and/or exposure levels associated with operations and/or processes. For example, the risk data 1110*a* includes credit scores, fraud detection alerts, market volatility indicators, regulatory compliance assessments, and/or portfolio risk metrics enabling institutions to evaluate and/or manage potential losses and/or regulatory violations. In some implementations, the risk data 1110*a* includes security event logs (e.g., in the context of distributed microservices), performance metrics indicating potential service failures, and/or anomaly detection results from containerized applications identifying unusual patterns in distributed computing environments, where the anomaly detection results indicate security breaches or operational risks.

In some implementations, particular types of data (e.g., data types) are associated with or exclusively accessible to particular servers and/or entities. For example, server 1102*a* can store and/or access the transaction data 1104*a*, while one or more other servers (e.g., the server 1102*b* or the server 1102*c*) cannot access the transaction data 1104*b*.

For example, a server device (e.g., an entity device, one or more of servers 1102*a*-1102*n*) includes and/or interfaces with one or more local artificial intelligence models. A local artificial intelligence model can include a machine learning algorithm or neural network (e.g., as described with respect to FIGS. 4-10B) that resides on and/or is trained by a specific server device. In some implementations, the local artificial intelligence model is trained on or uses proprietary or sensitive datasets, without sharing the underlying training data with external systems (e.g., other server devices or a federated aggregation server, such as the federated aggregation server 1112). For example, a local artificial intelligence model includes a local GAN model 1104*b* of the server 1102*a*, a local VAE model 1108*b* of the server 1102*b*, and/or a local diffusion model 1110*b* of the server 1102*c*. The local artificial intelligence model can include one or more independent or compound models (e.g., machine learning models, artificial intelligence models, or other suitable algorithms). Local artificial intelligence models can be trained to execute data generation tasks, classification tasks, or other suitable algorithms. For example, a local artificial intelligence model can receive, as input, one or more input datasets (e.g., of a particular type) and can generate, based on the input, one or more outputs (e.g., local model outputs).

The local artificial intelligence model can include one or more local parameter sets. For example, a local parameter set includes specific weights, biases, activation functions, and/or learned feature representations that characterize the computational behavior and/or decision-making capabilities of a local artificial intelligence model. To illustrate, a local parameter set includes weight matrices and bias vectors of a local GAN model (e.g., associated with a first bank's server 1102*a*) that has been trained to generate synthetic transaction patterns. Additionally or alternatively, a local parameter set includes encoder-decoder parameters of the variational autoencoder model 1108*b* of the server 1102*b* (e.g., trained on customer demographic data). Additionally or alternatively, a local parameter set includes noise scheduling parameters associated with a local diffusion model 1110*b* of the server 1102*c*. In some implementations, the local parameter set captures statistical relationships, correlations, and/or patterns that the model has extracted from sensitive datasets, while maintaining the information local to the associated server or entity, thereby preserving the privacy and security of the underlying sensitive data. As such, in some implementations, the local parameter set is stored locally within an associated server and is prevented from being shared or exposed external to the associated server (e.g., via a firewall or other suitable security features).

The local artificial intelligence model can be associated with one or more model types. For example, a model type includes a particular category or architectural classification of a machine learning or artificial intelligence algorithm (e.g., associated with a local and/or global artificial intelligence model). The model type can define and/or characterize the computational approach, training methodology, and/or data generation capabilities of an artificial intelligence model. As an illustrative example, a model type can include a generative adversarial network (GAN) model type, a variational autoencoder (VAE) model type, and/or a diffusion model type.

A GAN model (e.g., the local GAN model 1104*b*) can include a generative adversarial network architecture employing at least two competing neural networks (e.g., a generator and a discriminator). The two competing neural networks can be trained in an adversarial process to create high-quality synthetic data. For example, the local GAN model 1104*b* can generate realistic synthetic data (e.g., synthetic transaction data 1104*a*) by training the generator network to create fake data that the discriminator network cannot distinguish from real data, thereby enabling creation of datasets that preserve structural, semantic, and/or statistical properties of the real-world dataset.

A VAE model (e.g., the local VAE model 1108*b*) can include a variational autoencoder architecture that uses probabilistic encoding and decoding processes to learn latent representations of data and generate new synthetic data from learned probability distributions. For example, the local VAE model 1108*b* encodes particular information (e.g., the customer data 1108*a*) into a compressed latent space and decodes the compressed data to generate synthetic customer data that preserves the statistical distributions (e.g., of age, income, geographical, location, and/or account types), while ensuring that no individual data entries (e.g., customers) can be identified). As such, the VAE model enables capture and preservation of complex statistical relationships and correlations within datasets while ensuring mathematical robustness with respect to probabilistic properties of generated synthetic data.

A diffusion model (e.g., the local diffusion model 1110_b_) can include a generative model architecture that enables generation of synthetic data through an iterative denoising process. For example, the diffusion model can gradually transform random noise into structured data by learning to reverse a forward diffusion process that adds noise to training data. To illustrate, the local diffusion model 1110_b_ generates synthetic risk assessment scores by learning to denoise corrupted credit data through multiple iterative steps, creating high-quality synthetic risk profiles that capture complex relationships between different types of risk-related data (e.g., including credit history, financial behavior, and default probability, while maintaining privacy of individual customer credit information).

Based on the model parameters associated with the local artificial intelligence model (e.g., the local parameter set(s)), the servers (and/or, in some implementations, the data simulation platform 602) can obtain and/or generate update parameter sets (e.g., of a particular format). The update parameter set can include one or more representations of parameters (and/or updates thereof) associated with the local artificial intelligence model of a particular format.

For example, the update parameter set includes secure representations of model parameters, parameter changes, and/or learned knowledge from local artificial intelligence models, thereby enabling federated learning and collaborative synthetic data generation without exposing underlying sensitive training data or complete model architectures. For example, update parameter sets can be of particular formats. A format can include a data structure, encoding scheme, and/or representation method used to securely transmit or store update parameter sets from local artificial intelligence models. A format can include an encrypted parameters-type format (e.g., an update parameter set corresponding to the encrypted parameters 1106_a_), an aggregated gradients-type format (e.g., an update parameter set corresponding to the aggregated gradients 1106_b_), and/or a compressed updates-type format (e.g., an update parameter set corresponding to the compressed updates 1106_c_).

For example, an update parameter set can include encrypted parameters 1106 (e.g., associated with a homomorphic encryption 1104_c_ of parameters of the local GAN model 1104_b_ of FIG. 11). The encrypted parameters 1106 can include model weights, biases, and/or other learned parameters that have been cryptographically protected using encryption techniques to enable secure transmission and processing without exposing the underlying parameter values or model architecture details. For example, the encrypted parameters 1106 can be generated (e.g., via the server 1102_a_) using homomorphic encryption 1104_c_ to protect the generator and discriminator network weights of the local GAN model 1104_b_, while allowing mathematical operations such as addition and multiplication to be performed on the encrypted values. As such, the data simulation platform 602 enables further processing and/or aggregation of the parameters associated with the server, while maintaining security and privacy of the underlying model, model parameters, and/or training data.

Homomorphic encryption 1104_c_ can include cryptographic schemes such as partially homomorphic encryption that supports either addition or multiplication operations, or fully homomorphic schemes that enable arbitrary computations on encrypted data, thereby enabling the federated aggregation server (e.g., the federated aggregation server 1112) to combine encrypted parameters from multiple servers without decrypting the individual contributions.

Additionally or alternatively, the update parameter set includes aggregated gradients 1106_b_ associated with the local VAE model 1108_b_ of the server 1102_b_. For example, the aggregated gradients 1106_b_ can include the accumulated and/or averaged gradient values that represent the direction and/or magnitude of parameter updates computed during the training process of local artificial intelligence models, thereby enabling knowledge sharing without exposure of complete model states or individual training examples. For example, the server 1102_b_ can determine cumulative parameter changes learned from customer data 1108_a_, using secure aggregation 1108_c_ techniques to combine multiple gradient computations into summary statistics that preserve the learning signal while protecting individual customer information (e.g., via cryptographic protocols that prevent any single party from accessing raw gradient values). Secure aggregation 1108_c_ can include multi-party computation protocols that enable multiple servers to jointly compute aggregate statistics without revealing their individual contributions (e.g., via Shamir's secret sharing or threshold cryptography techniques), thereby mitigating the risk that individual server's gradients are isolated or reverse-engineered.

In some implementations, the update parameter set includes compressed updates 1106_c_ of a local diffusion model 1110_b_ associated with the server 1102_c_. As an illustrative example, the compressed updates 1106_c_ can include reduced-dimensionality or quantized representations of model parameter changes. For example, a server 1102_c_ can transmit compressed updates 1106_c_ to the federated aggregation server 1112 to minimize bandwidth requirements and/or computational overhead, while preserving essential learning information for federated aggregation. The compressed updates 1106_c_ can use gradient compression 1110_c_ techniques (e.g., top-k sparsification) to transmit only the most significant parameter changes (e.g., above a particular threshold) or quantization techniques to reduce the precision of parameter update values (or parameter values. The gradient compression 1110_c_ can include algorithms such as error feedback mechanisms (e.g., that accumulate compression errors over multiple rounds to maintain convergence properties) or adaptive compression schemes (e.g., that adjust compression ratios based on network conditions, model performance requirements, and/or privacy or security requirements).

In some implementations, the servers 1102_a_-1102_n_ and/or the data simulation platform 602 can further update parameters associated with the local artificial intelligence models, thereby updating the resulting update parameter sets shared with the federated aggregation server 1112. For example, the data simulation platform 602 can train the local artificial intelligence model to generate local model outputs based on input datasets (e.g., input node datasets), thereby enabling generation of an update parameter set. For example, the data simulation platform 602 obtains a training dataset that includes an input node dataset of a first data type and a ground-truth dataset of the first data type.

The ground-truth dataset can include actual and/or verified data serving as a reference standard for evaluating the accuracy, fidelity, and/or performance of synthetic data generation models or other machine learning or artificial intelligence systems. For example, the ground-truth dataset includes a bank's actual transaction records, verified customer profiles, and/or validated risk assessment scores that are used to measure how closely generated synthetic data matches the statistical, semantic, and/or structural properties, relationships, or patterns of real-world data (e.g., financial data). For example, the ground-truth dataset includes sensitive information that remains secure and/or siloed within a particular server device (e.g., associated with a particular institution or bank), while enabling quality assessment of synthetic data generation. In some implementations, the ground-truth dataset includes production API call logs, service performance metrics, real user authentication patterns, and/or verified resource utilization data enabling validation of synthetic datasets generated for testing purposes (e.g., within the context of a distributed microservices network).

The data simulation platform 602 can input, using the first server device, the input node dataset to the first local artificial intelligence model to generate a local model output (e.g., a local simulated dataset) based on the input node dataset. The local model output can include a local simulated dataset of the first data type, where the local model output preserves structural, semantic, and statistical properties of the input node dataset. As an illustrative example, the local model output includes synthetic data, predictions, classifications, or other computational results generated by a local artificial intelligence model (e.g., the local GAN model 1104*b*, the local VAE model 1108*b*, and/or the local diffusion model 1109*b* of FIG. 11). For example, the local model output is generated by the local artificial intelligence model based on training on sensitive or proprietary datasets accessible only to the hosting server device. As an illustrative example, a local model output includes synthetic transaction records generated by the local GAN model 1104*b* of the server 1102*a* (e.g., associated with a Bank A); synthetic customer data generated by the local VAE model 1108*b* of the server 1102*b* (e.g., associated with a Bank B); and/or synthetic risk data generated by the local diffusion model 1110*b* of the server 1102*c* (e.g., associated with a Bank C). In some implementations, the local model output preserves the structural, semantic, and/or statistical properties of the original training data (e.g., using techniques, methods, and/or components described with respect to FIGS. 6-10B).

The data simulation platform 602 can generate, based on the ground-truth dataset and the local simulated dataset, a loss metric value for the first local artificial intelligence model. The loss metric value can characterize a difference between the local model output and the ground-truth dataset, such as a quantitative measurement that characterizes the difference, error, and/or divergence between synthetic data generated by a local artificial intelligence model and the corresponding ground-truth reference data used for validation. For example, the loss metric value includes mean squared error calculations (e.g., based on square differences between local synthetic data and associated ground-truth data). As such, the loss metric value enables quantification of the quality and fidelity of the local model's synthetic data generation capabilities.

The data simulation platform 602 can determine, based on the loss metric value, an original and/or updated model parameter set for the first local artificial intelligence model. For example, the data simulation platform 602 can determine the format of the generated update parameter set depending on the type of local model associated with the loss metric value. As an illustrative example, the data simulation platform 602 can determine the first model type of the first local artificial intelligence model (e.g., whether the local model is a GAN model, a VAE model, and/or a diffusion model).

The data simulation platform 602 can determine, based on the first model type and the first local artificial intelligence model, the first update parameter set. For example, the data simulation platform 602 can determine a format for updates to be shared with the federated aggregation server 1112 for subsequent configuration of the global synthetic model 1118. For example, depending on the first model type, the data simulation platform 602 can generate the first update parameter set including at least one of encrypted parameters, aggregated gradients, or compressed updates, as described above. By doing so, the data simulation platform 602 enables various server devices to contribute specialized model knowledge to the federated synthetic data generation process in a manner that is consistent with the underlying local artificial intelligence models, thereby maintaining security and privacy requirements that are specific to each model type and data domain.

Based on the processes and components described above with respect to FIG. 11, the federated aggregation server 1112 can receive various update parameter sets (e.g., from different server devices, such as from the server 1102*a*, the server 1102*b*, and/or the server 1102*c*). For example, the data simulation platform 602 (and/or one or more components thereof) obtains, from a second server device (e.g., the server 1102*b*), a second update parameter set (e.g., the aggregated gradients 1106*b*) of a second format distinct from the first format (e.g., associated with the encrypted parameters-type format from the server 1102*a*). The second update parameter set can include parameters associated with a second local artificial intelligence model of a second model type. The second local artificial intelligence model can resides on the second server device.

As such, the data simulation platform 602 (e.g., via the federated aggregation server 1112) can aggregate the various received update parameter sets, corresponding to sensitive data from various servers, to configure a global synthetic model 1118. For example, the federated aggregation server 1112 performs model synthesis 1116 based on byzantine-robust aggregation 1114 of update parameter sets received from the various servers (e.g., the server 1102*a*, the server 1102*b*, and the server 1102*c*).

In some implementations, the data simulation platform 602 aggregates the information associated with the various local artificial intelligence models (e.g., associated with various servers and associated input data or data types respectively). For example, the data simulation platform 602 determines a first aggregation model weight value pertaining to the first model type and a second aggregation model weight value pertaining to the second model type.

An aggregation model weight (and associated value) can include a numerical coefficient or weighting factor that determines the relative contribution and influence of each local artificial intelligence model's update parameter set during the federated aggregation process for configuring a global synthetic data generation model. For example, the aggregation model weight value can include a higher weight value for a particular local GAN model (e.g., the local GAN model 1104*b*), a moderate weight value for the local VAE model 1108*b*, and a relatively low weight value for the local diffusion model 1110*b*. The aggregation model weight values can be dynamically determined based on factors such as relative data quality metrics, model performance scores, dataset size, statistical representativeness, and/or historical contribution reliability (e.g., relative with respect to the servers and/or associated local artificial intelligence models) to ensure that higher-quality local models have greater influence on the global synthetic data generation capabilities.

In some implementations, the federated aggregation server 1112 selects particular aggregation model weight values based on the model type associated with the server from which the respective update parameter set is received. For example, the data simulation platform 602 determines the first model type associated with the first server device and determines the first aggregation model weight value specific to the first model type and the first server device. The aggregation model weight values can include tensors, matrices, functions, functionals, and/or other transformations to ensure that aggregation can be performed with respect to update parameter sets of heterogeneous formats. As an illustrative example, the data simulation platform 602 applies matrix multiplications to convert the encrypted parameters 1106 (e.g., associated with the server 1102*a*) from a homomorphic encryption format into a standardized vector representation; use tensor operations to reshape aggregated gradients 1106*b*; and/or employ functional mappings to transform the compressed updates 1106*c* from a quantized format into a full-precision parameter representation suitable for federated aggregation.

The federated aggregation server 1112 can apply the aggregation model weight values to the respective update parameter sets to generate and/or configure a global artificial intelligence model. A global artificial intelligence model can include a machine learning model, artificial intelligence model, or another suitable algorithm that enables combination of knowledge, patterns, capabilities, updates, and/or parameters from multiple models (e.g., various local artificial intelligence models). The global artificial intelligence model can be of a type associated with one or more local artificial intelligence models (e.g., of a GAN, VAE, or diffusion type). Additionally or alternatively, the global artificial intelligence model is associated with a model architecture or type that is not identical to or topologically analogous to one or more local artificial intelligence models. The global artificial intelligence model can be used to generate synthetic data based on federated synthetic data (e.g., as shown as global synthetic model 1118 of FIG. 11).

For example, the data simulation platform 602 applies (1) the first aggregation model weight value to the first update parameter set and (2) the second aggregation model weight value to the second update parameter set to configure a global artificial intelligence model. To illustrate, the federated aggregation server 1112 performs model synthesis 1116 by computing weighted combinations of the received update parameter sets to generate the individual parameter values for the global artificial intelligence model. The data simulation platform 602 can multiply the encrypted parameters 1106*a* associated with the local GAN model 1104*b* from the server 1102*a* by the corresponding aggregation weight value, and perform analogous operations with respect to the other received update parameter sets. The data simulation platform 6002 can sum the weighted contributions to generate each individual weight and bias value in the global synthetic model 1118, thereby configuring the global model. In some implementations, the weighted summation process described herein occurs for every parameter in the global model architecture (e.g., as an inner product), enabling the global model to incorporate specialized knowledge from the local model of each server (e.g., each bank or financial institution) while maintaining relative influence determined by the aggregation weight values.

In some implementations, the federated aggregation server 1112 utilizes byzantine-robust aggregation protocols (e.g., Byzantine-Robust Aggregation 1112 of FIG. 11) to incorporate the update parameter sets from the various servers and to generate the global synthetic model 1118. For example, the byzantine-robust aggregation 1114 includes fault-tolerant computational protocols capable of detection and mitigation of the influence of malicious, corrupted, or erroneous parameter contributions from participating server devices during the federated learning process. For example, the byzantine-robust aggregation 1114 employs median-based aggregation methods that identify and exclude outlier parameter updates from potentially compromised servers, use trimmed mean calculations that automatically remove highest and lowest parameter contributions to prevent manipulation by malicious actors, or implement reputation-based weighting systems that reduce the influence of particular servers with historically unreliable or suspicious parameter submissions. Based on the federated, byzantine-robust aggregation of update parameter sets, the federated aggregation server 1112 can execute model synthesis 1116 to configure the global artificial intelligence model (e.g., the global synthetic model 1118) to generate synthetic data based on data associated with various servers.

Subsequently, the federated aggregation server 1112 (e.g., and/or other suitable components of the data simulation platform 602 of FIG. 6) can generate a simulated dataset using the configured global artificial intelligence model. As an illustrative example, in response to configuring the global artificial intelligence model, the federated aggregation server 1112 can generate a simulated dataset using the configured global artificial intelligence model. The simulated dataset, as described above with respect to FIGS. 6-10B, can include artificially generated data that preserves the statistical, structural, and/or semantic properties of input datasets (e.g., real-world datasets). For example, the simulated dataset can be generated based on inferred entity-relationship networks (e.g., on the basis of individual and/or federated/aggregated data). As an illustrative example, the data simulation platform 602 can generate the simulated dataset based on heterogenous knowledge contributions (e.g., update parameter sets) from multiple specialized local models, thereby enabling the creation of comprehensive synthetic data that captures complex interdependencies and relationships that no single server or model can generate independently (e.g., due to data-sharing restrictions associated with the sensitivity of the underlying data). As such, the federated approach disclosed herein leverages diverse model architectures, data types, and domain specializations of participating entities to generate synthetic datasets in an efficient, reliable, and accurate manner.

In some implementations, the federated aggregation server 1112 can determine to refine individual local models based on quality metrics associated with the respective local artificial intelligence models (and the resulting generated simulated datasets). To generate the local model output, the data generation platform 602 can provide an input node dataset (e.g., as described above with respect to FIG. 11) to a first local artificial intelligence model to generate a local model output based on the input node dataset. The local model output can preserve the structural, semantic, and statistical properties of the input node dataset. The data simulation platform 602 can transmit the simulated dataset to the first server device.

Figure 12:
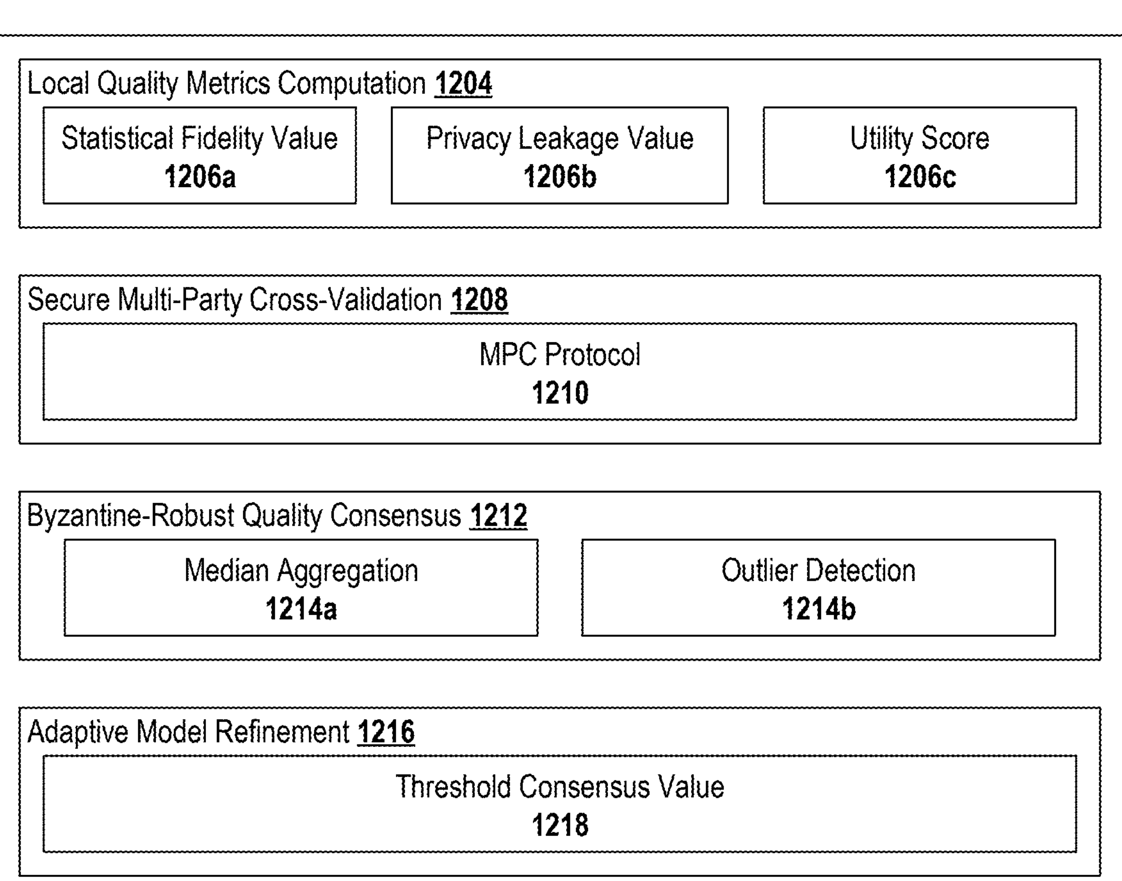
FIG. 12 illustrates an example architecture for synthetic data validation, in accordance with one or more implementations of the disclosed technology.

FIG. 12 illustrates an example architecture 1200 for synthetic data validation, in accordance with one or more implementations of the disclosed technology. The architecture 1200 can leverage local quality metrics computation 1204, secure multi-party cross-validation 1208, byzantine-robust quality consensus 1212, and/or adaptive model refinement 1216 to train and/or improve the local artificial intelligence models to provide improved feedback to the federated aggregation server 1112, thereby enabling improvements to the generated synthetic datasets based on the global artificial intelligence model.

In some implementations, in response to transmitting the simulated dataset to the first server device, the data simulation platform 602 receives a set of local quality metric values from the first server device. The data simulation platform 602 (e.g., and/or the associated server 1102*a*) can generate the local quality metric values based on the local model output, the simulated dataset (e.g., as generated by the global artificial intelligence model), and/or the local ground-truth dataset associated with the first local artificial intelligence model. A local quality metric value can include one or more values characterizing the quality of the generated output from the local artificial intelligence model, including a statistical fidelity value 1206*a*, a privacy leakage value 1206*b*, and/or a utility score 1206*c*. By generating local quality metrics, the data simulation platform 602 enables participating server devices to independently evaluate the quality and suitability of the globally generated synthetic data against their own local ground-truth datasets and domain-specific requirements, ensuring that the federated synthetic data generation process maintains suitable reliability and accuracy across all participating server devices. As such, the local quality assessments described herein enable feedback for iterative improvement of the global model, while maintaining the privacy and security of each server's data and evaluation process.

A statistical fidelity value 1206*a* can include a quantitative measurement assessing how accurately the synthetic data preserves the statistical properties, distributions, and/or correlations of the original training data used by the local artificial intelligence model. For example, the statistical fidelity value 1206*a* can include a correlation coefficient, a Kolmogorov-Smirnov test result, and/or a Jensen-Shannon divergence calculation that quantify the similarity between synthetic and real-world data and/or distributions generated by Bank A's, Bank B's, or Bank C's respective local models. In some implementations, the statistical fidelity value enables each financial institution to verify that the globally generated synthetic data maintains the statistical characteristics required for their specific use cases, such as regulatory stress testing and/or model validation.

A privacy leakage value 1206*b* can include a quantitative assessment of the risk that sensitive information from the original training data can be inferred, extracted, or reverse-engineered from the synthetic data generated by the global artificial intelligence model. For example, a privacy leakage value 1206*b* includes membership inference attack success rates that measure whether individual transactions or communications can be identified in the synthetic data. Additionally or alternatively, the privacy leakage value 1206*b* includes attribute inference scores that assess the risk of deducing sensitive customer information from synthetic profiles. The privacy leakage value 1206*b* can include reconstruction attack resistance metrics that evaluate how well the synthetic data prevents recovery of real-world data associated with the servers 1102*a*, 1102*b* and/or 1102*c*.

A utility score 1206*c* can include a measurement of how effectively the synthetic data can be used for its intended applications, such as model training, system testing, or analytical tasks. For example, a utility score 1206*c* includes machine learning model performance metrics when trained on synthetic versus real data, such as classification accuracy for fraud detection models, prediction error rates for credit scoring algorithms, or convergence speed measurements for risk assessment neural networks that demonstrate whether synthetic data from the federated system provides adequate training signal for downstream applications.

The data simulation platform 602 can execute secure multi-party cross-validation 1208 (e.g., using a multi-party cross-validation protocol 1210). The data simulation platform 602 can receive other sets of local quality metric values (e.g., from other servers, associated with corresponding local artificial intelligence models). For example, the data simulation platform 602 receives a second set of local quality metric values for the second local artificial intelligence model. Based on the received sets of local quality metric values, the data simulation platform 602 can execute secure multi-party cross-validation 1208 including cryptographic protocols that enable multiple servers to jointly validate synthetic data quality without exposing individual ground-truth datasets or quality assessment results to other participants. For example, the secure multi-party cross-validation technique can include secret sharing schemes that enable computation of aggregate quality metrics and/or synthetic data without revealing independent validation methodologies or performance benchmarks (and/or the associated real-world, sensitive and/or proprietary data).

In some implementations, the data simulation platform 602 can use a byzantine-robust quality consensus model to generate a quality consensus value for the first and second local artificial intelligence models, thereby enabling evaluation of the globally generated synthetic data. For example, the data simulation platform 602 provides the first and second sets of local quality metric values to a byzantine-robust consensus model 1212 to generate a quality consensus value for the first and second local artificial intelligence models. The byzantine-robust consensus model 1212 can include median aggregation 1214*a* or outlier detection 1214*b*, as described above. The byzantine-robust consensus model 1212 can subsequently generate a quality consensus value characterizing the overall quality of the synthetic dataset based on the contributions by the participating local artificial intelligence models.

A quality consensus value can include an aggregate assessment metric value representing the collective evaluation of synthetic data quality across multiple participating server devices. In some implementations, the data simulation platform 602 can use a byzantine-robust quality consensus model to generate a quality consensus value for the first and second local artificial intelligence models, thereby enabling evaluation of the globally generated synthetic data. For example, the data simulation platform 602 provides the first and second sets of local quality metric values to a byzantine-robust consensus model 1212 to generate a quality consensus value for the first and second local artificial intelligence models. The byzantine-robust consensus model 1212 can include median aggregation 1214*a* or outlier detection 1214*b*, as described above. The quality consensus value can include a median-aggregated score that combines a first server's statistical fidelity assessment, a second server's privacy leakage evaluation, and a third server's utility score while automatically excluding outlier assessments that may indicate compromised validation processes or malicious attempts to manipulate the global model's perceived performance. As such, the quality consensus value enables evaluation of local model performance on the basis of synthetic data generated by the associated global model, enabling training or refinement decisions.

For example, the architecture 1200 includes an adaptive model refinement module 1216 that enables the data simulation platform 602 to determine whether the quality consensus value satisfies a quality consensus threshold value (e.g., the threshold consensus value 1218). In response to determining that the quality consensus value does not satisfy the quality consensus threshold value, the data simulation platform 602 can generate a training indicator specifying whether the first and second local artificial intelligence models are to be trained. In response to generating the training indicator, the data simulation platform 602 can provide the simulated dataset to the first and second local artificial intelligence models to generate updated first and second parameter sets. As an illustrative example, the data simulation platform 602 can automatically trigger retraining of the local GAN model 1104*b* of FIG. 11 and the local VAE model 1108*b* when the combined quality consensus value falls below the threshold, using the globally generated synthetic data as additional training input to improve their local model performance and subsequent parameter contributions. The disclosed adaptive refinement process enables continuous improvement of the federated synthetic data generation system by identifying underperforming local models.

A training indicator can include a digital signal or data structure that specifies whether one or more local artificial intelligence models require retraining, parameter updates, or performance optimization (e.g., based on quality assessment results from the federated synthetic data generation process). For example, in the context of federated synthetic data generation across financial institutions, a training indicator includes a binary flag that signals that the local GAN model 1104*b* is to be retrained when its statistical fidelity value 1206*a* falls below a particular threshold value. As such, the training indicator enables automated orchestration of model improvement processes across the federated system, ensuring that underperforming local models receive appropriate remediation while maintaining the overall quality and reliability of the global synthetic data generation capabilities.

Figure 13:
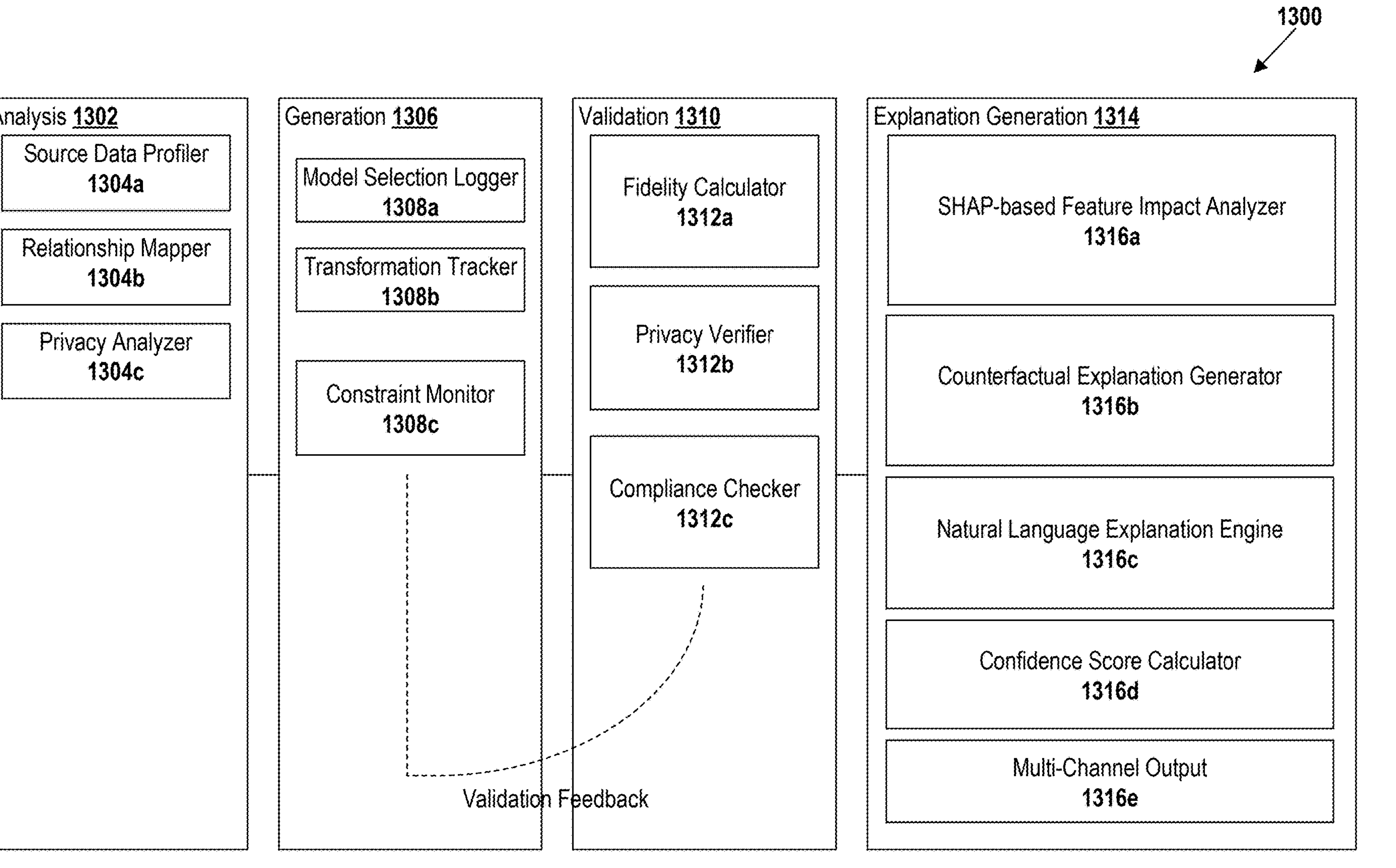
FIG. 13 illustrates an example architecture for generating explainable synthetic data including an indication of metadata analysis and characterization, in accordance with one or more implementations of the disclosed technology.

FIG. 13 illustrates an example architecture 1300 for generating explainable synthetic data including an indication of metadata analysis and characterization, in accordance with one or more implementations of the disclosed technology. For example, the data generation platform disclosed herein enables characterization and/or validation of generated synthetic data on the basis of one or more factors, attributes, or categorizations.

For example, the data generation platform 602 can generate characterization datasets for the generated synthetic dataset, where each characterization dataset describes, explains, or otherwise characterizes a particular portion, pattern, attribute, aspect, or feature of the generated synthetic dataset. The data generation platform 602 can input the simulated dataset into a data characterization model to generate a first characterization dataset and a second characterization dataset. The first characterization dataset can include a first natural language characterization of first data associated with the first model type and the second characterization dataset can include a second natural language characterization of second data associated with the second model type. As an illustrative example, the data generation platform 602 generates a first natural language characterization that describes transaction patterns and behaviors captured in the synthetic data from the local GAN model 1104*b*. The characterizations enable users to understand what types of patterns and relationships have been preserved from the original heterogeneous data sources, providing transparency into the synthetic data's composition and suitability for specific testing or validation applications.

For example, the data characterization model includes one or more components associated with the architecture 1300, including an analysis module 1302, a generation module 1306, a validation module 1310, and/or an explanation generation module 1314.

A characterization dataset can include comprehensive metadata and explanatory information that describes the patterns, relationships, and properties of synthetic data (e.g., through multiple analytical dimensions and natural language descriptions). For example, a characterization dataset can comprise SHAP-based feature impact analysis (e.g., based on analyzer 1316*a* of FIG. 13) that quantifies how different transaction attributes contribute to synthetic data patterns. For example, the SHAP-based analyzer enables feature importance calculation, Shapley value decomposition, and/or interaction effect quantification for inclusion within a characterization dataset. The characterization dataset can include counterfactual explanations that demonstrate "what-if" scenarios showing how changes in particular attributes or features of the synthetic data would affect other attributes or features of the synthetic data (e.g., a causal analysis based on the generator 1316*b*). In some implementations, the counterfactual explanation can include minimal change identification. The characterization dataset can include natural language descriptions that explain in human-readable terms features, relationships, characterizations, or descriptions of the synthetic data (e.g., based on the engine 1316*c*). For example, the natural language descriptions can be generated based on templates, can be context-aware, and can support multi-level details. The characterization dataset can include confidence scores that indicate the reliability or uncertainty associated with specific synthetic data elements (e.g., based on the calculator 1316*d*). The characterization dataset can multi-channel outputs that present this information through various formats including text summaries, visualizations, and interactive dashboards (e.g., based on the multi-channel output 1316*e*).

In some implementations, the analysis module 1302 can leverage a source data profiler 1304*a* to analyze source data associated with the real-world data on which the synthetic data is based. For example, the data simulation platform 602 obtains source metadata, model generation metadata (e.g., associated with the generation module 1306), and validation metadata (e.g., associated with the validation module 1310).

The source metadata (e.g., associated with the source data profiler 1304*a* of the analysis module 1302 of FIG. 13) can include information characterizing input data associated with at least one of the first or second local artificial intelligence models. Source metadata can include comprehensive information that characterizes the properties, structure, and statistical attributes of the input datasets used to train local artificial intelligence models within the federated synthetic data generation system. The source data profiler 1304*a* can generate statistical summaries and distribution characteristics of the original datasets. For example, source metadata includes statistical distribution profiles generated by a source data profiler 1304*a* that captures communication (e.g., transaction volume) patterns and customer characteristics from a particular server's datasets. The relationship mapper 1304*b* can identify structural connections and dependencies between different data elements. For example, relationship mappings created by a relationship mapper 1304*b* that identifies connections between different components of the real-world data and/or associated nodes (e.g., accounts, transactions, and risk factors). The privacy analyzer 1304*c* can evaluate data sensitivity levels and regulatory compliance requirements. For example, privacy assessments produced by a privacy analyzer 1304*c* that evaluates the sensitivity levels and regulatory compliance requirements of aspects or portions of the real-world data. As such, the source metadata enables the characterization dataset to provide detailed explanations of how the original data properties have been preserved or transformed in the synthetic data generation process.

In some implementations, the source metadata includes statistical distribution data associated with the source data, an inferred entity-relationship network (e.g., including node identifiers and node relationships associated with the source data), and/or a privacy dataset. For example, the data simulation platform 602 transmits, to the first server device, a request for the source metadata. The data simulation platform 602 can receive the source metadata, from the first server device and for source data associated with the first local artificial intelligence model, including at least one of: (1) a source data statistical distribution dataset, (2) an inferred entity-relationship network characterizing node identifiers and node relationships for the source data, or (3) a privacy dataset characterizing privacy characteristics of the source data.

The model generation metadata (e.g., generated by the generation module 1306) can include information characterizing configuring the global artificial intelligence model. Model generation metadata can include detailed information that documents the processes, decisions, and parameters involved in configuring the global artificial intelligence model from the federated update parameter sets received from multiple local models. The model selection logger 1308*a* can record architectural decisions and model type selections. For example, model generation metadata includes model selection records generated by a model selection logger 1308*a* that documents which GAN, VAE, or diffusion model architectures were chosen for Bank A, Bank B, and Bank C respectively. The transformation tracker 1308*b* monitors data format conversions and parameter integration processes. For example, transformation tracking data produced by a transformation tracker 1308*b* records how encrypted parameters, aggregated gradients, and compressed updates were converted and integrated during the federated aggregation process. The constraint monitor 1308*c* can validate compliance with system requirements and operational constraints throughout the global model configuration process. For example, the constraint monitoring information from a constraint monitor 1308*c* validates whether the global model configuration adheres to regulatory requirements, privacy constraints, and performance thresholds established by the participating financial institutions.

For example, the model generation metadata can include an indication of at least one data processing action and generate an indication of a data processing protocol accordingly. For example, the data simulation platform 602 detects at least one data processing action associated with generating the simulated dataset using the configured global artificial intelligence model. The data simulation platform 602 can generate, using the at least one data processing action, an indication of a data processing protocol comprising at least one of: (1) a model selection, (2) a data transformation, or (3) an applied constraint associated with the global artificial intelligence model. The data simulation platform 602 can generate the model generation metadata including the indication of the data processing protocol. As such, the model generation metadata can include information relating to model selections within the explanations generated in response to the generated synthetic data, thereby improving the explainability and troubleshooting capabilities of the synthetic data generation.

The validation metadata (e.g., generated by the validation module 1310) can include information characterizing a validation status for the simulated dataset. Validation metadata can include comprehensive information that characterizes the quality, security, and regulatory compliance status of the simulated dataset generated by the global artificial intelligence model. The fidelity calculator 1312*a* can generate statistical accuracy measurements and distribution comparisons. For example, validation metadata includes statistical fidelity assessments (e.g., a statistical fidelity indicator, such as a metric value) generated by a fidelity calculator 1312*a* that measures how accurately the synthetic data preserves transaction patterns, customer demographics, and risk distributions from the original datasets of Bank A, Bank B, and Bank C. The privacy verifier 1312*b* can generate privacy leakage assessments and re-identification risk evaluations (e.g., a privacy verification indicator, which can include a quantitative metric of an extent of privacy risk). For example, privacy verification reports produced by a privacy verifier 1312*b* can evaluate whether the synthetic data maintains adequate protection against re-identification attacks and complies with data protection regulations such as GDPR or PCI-DSS. In some implementations, the privacy verifier executes epsilon-DP verification, k-anonymity checks, and/or inference testing. The compliance checker 1312*c* can create regulatory adherence reports and policy compliance validations for the simulated dataset. For example, the compliance validation results from a compliance checker 1312*c* can generate a compliance indicator to confirm that the synthetic data meets industry-specific regulatory requirements for financial services, including Basel III capital adequacy standards and anti-money laundering detection capabilities. In some implementations, the compliance indicator is a quantitative metric indicating an extent to which the synthetic data is compliant with the relevant regulatory requirements. For example, the compliance checker can perform regulatory mapping and/or audit preparation operations.

In some implementations, the data simulation platform 602 leverages one or more components of the validation data (e.g., associated with or generated by the validation module 1310) to modify model generation decisions (e.g., as detected by the generation module 1306). By doing so, the data simulation platform 602 enables dynamic feedback and iterative improvements to the federated synthetic data generation process disclosed herein.

Based on the source metadata, the generation metadata, the validation metadata, the data simulation platform 602 can generate one or more characterization datasets. For example, the data simulation platform 602 generates, using the source metadata, the model generation metadata, and the validation metadata, the first characterization dataset based on at least two of: (1) a feature impact dataset, (2) a counterfactual explanation dataset, (3) a natural language explanation dataset, or (4) a confidence score value dataset (e.g., as described above). As such, the generated first characterization dataset can include at least one quantitative (e.g., a confidence score field) or qualitative feature (e.g., a natural language explanation field) of the simulated dataset and a corresponding value characterizing the at least one quantitative or qualitative feature.

The data simulation platform 602 can receive, from a user device, a characterization request associated with the simulated dataset. In response to receiving the characterization request, the data simulation platform 602 can generate, for display on the user device, a graphical representation of the first characterization dataset. For example, a characterization request can include a request for a specific channel of the multi-channel output 1316*e*, such as a technical report format for data scientists, an executive summary for business stakeholders, or an interactive dashboard for system administrators to explore synthetic data quality metrics and explanations. In response to receiving the characterization request, the data simulation platform 602 can generate, for display on the user device, a graphical representation of the first characterization dataset that presents the requested explanatory information in the appropriate format, enabling users to understand, validate, and make informed decisions about deploying the synthetic data for their specific use cases.

Figure 14:
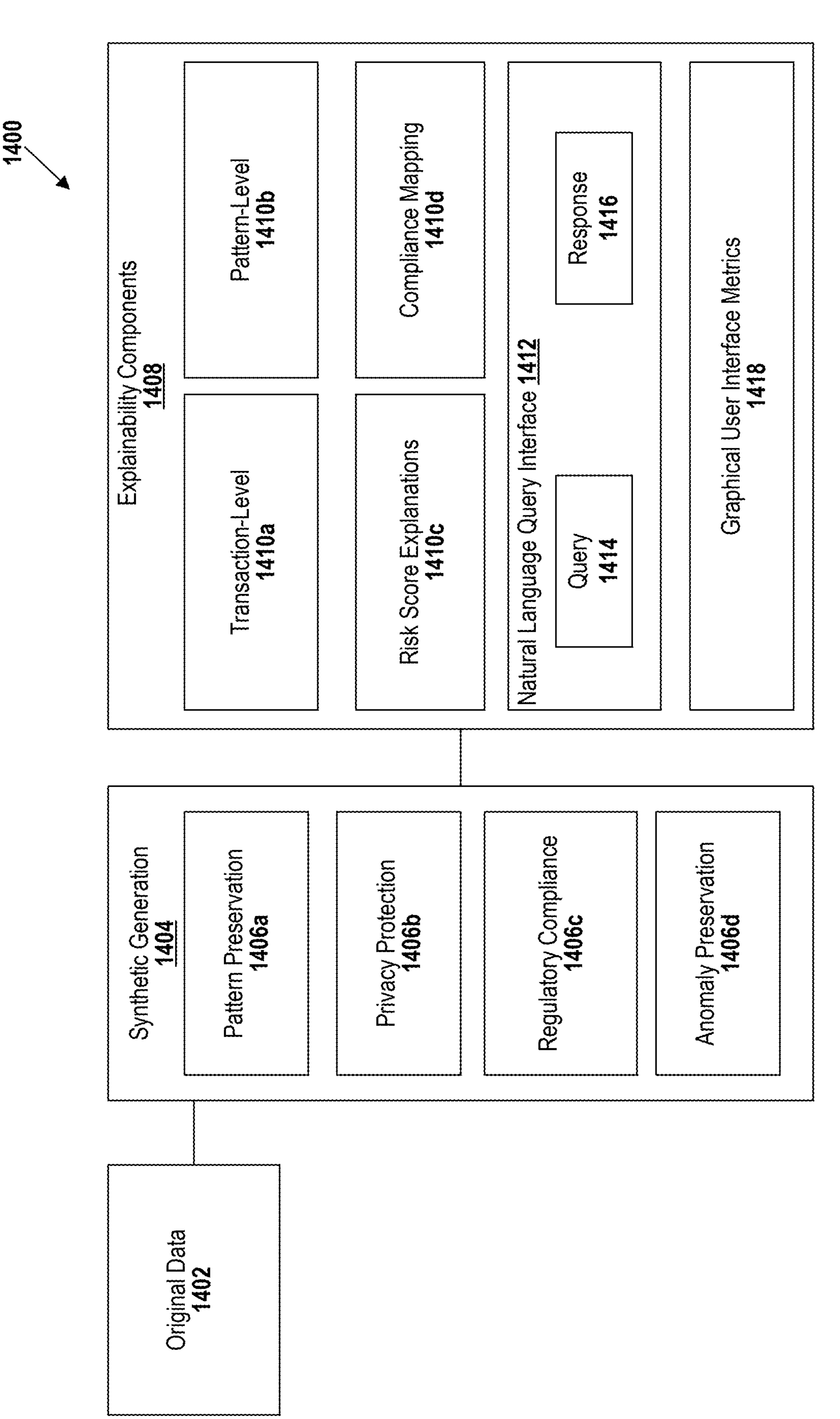
FIG. 14 includes an example architecture for generating multi-layered explainability components and enabling natural language query user interactions, in accordance with one or more implementations of the disclosed technology.

FIG. 14 includes an example architecture 1400 for generating multi-layered explainability components and enabling natural language query user interactions, in accordance with one or more implementations of the disclosed technology. For example, the data simulation platform 602, via the architecture 1400, can ingest original data 1402 (e.g., real-world data, such as an input node dataset) and can generate synthetic data at synthetic generation step 1404 (e.g., including pattern preservation 1406*a*, privacy protection 1406*b*, regulatory compliance 1406*c*, and/or anomaly preservation 1406*d*, as consistent with systems and methods disclosed with respect to FIGS. 6-10B). As such, based on the real-world data and the generated synthetic data, the data simulation platform 602 can generate the characterization dataset to include one or more explainability components (e.g., associated with separate or the same data sources, such as one or more of the servers 1102*a*-1102*c* of FIG. 11).

For example, the data simulation platform 602 can generate transaction-level data explanatory data 1410*a*, pattern-level explanatory data 1410*b*, risk-score explanatory data 1410*c*, and/or compliance mapping data 1410*d*. In some implementations, the data simulation platform 602 (e.g., via the communication engine 612) enables user interaction with one or more of the explainability components 1408 via a graphical user interface and/or a natural language query interface 1412. The explainability components 1408 and/or the characterization dataset can include aggregate information (e.g., associated with one or more data sources and/or data types), and/or can be separated by data type and/or data source (e.g., separated on the basis of the server from which the relevant synthetic data is associated with, of FIG. 11).

In some implementations, based on the first characterization dataset and the second characterization dataset, the data simulation platform 602 can generate an aggregate characterization dataset. The first characterization dataset can include a description of the first data of a first data type. The second characterization dataset can include a description of the second data of a second data type. The first or second data type can include at least one of: a transaction-level type, a pattern-level type, a risk-score type, or a compliance mapping-type.

The data simulation platform 602 can receive, from a first device, a user prompt including a query relating to the simulated dataset. The query (e.g., an alphanumeric, textual, image-based, video-based, audio-based, or multimedia user input) can be associated with characterization of the simulated dataset. The characterization can relate to one or more of the first and second data types. The data simulation platform 602 can input the user prompt and the aggregate characterization dataset to a language model to generate a natural language output. The natural language output can include one or more characterization values that characterize the simulated dataset according to the first data type and the second data type. For example, the natural language output can include alphanumeric, textual, image-based, video-based, audio-based, or multimedia output).

Transaction-level data can include detailed information and explanatory metadata associated with individual synthetic transactions or data points. For example, the transaction-level data can include source information, amount information, and/or timing information associated with particular data entries within the synthetic dataset and/or associated with patterns or trends thereof. For example, transaction-level data can characterize specific financial operations, API calls, or system interactions within the generated synthetic dataset. To illustrate, transaction-level data can include individual synthetic credit card purchases with associated merchant categories, transaction amounts, timestamps, and explanatory metadata indicating which Bank's GAN model contributed the spending pattern, which statistical distributions were preserved, and what privacy protections were applied to that specific transaction record.

Pattern-level data can include aggregated explanatory information that describes broader behavioral trends, recurring sequences, or statistical patterns observed across multiple relationships, transactions, or interactions within the synthetic dataset. For example, pattern-level data includes explanations of frequency-based or seasonal spending behaviors (e.g., including amounts or accounts) that emerge from Bank A's transaction data, demographic-based risk patterns or derived from Bank B's customer models, or market volatility correlations captured from Bank C's risk assessment algorithms, along with metadata indicating how these patterns were preserved during the federated aggregation process.

Risk-score explanations can include detailed justifications and contributing factor analyses that explain how synthetic risk assessments are calculated, including information relating to underlying data patterns. For example, the risk-score explanations can include credit scores or security threat levels that were calculated and what underlying data patterns influenced these evaluations. The risk-score explanations can include natural language descriptions of why a synthetic customer profile received a particular credit score, including explanations of how income levels from Bank A's demographic data, transaction history patterns from Bank B's behavioral models, and market conditions from Bank C's risk algorithms contributed to the final synthetic risk assessment. In some implementations, the risk score explanations include jurisdiction risk, transaction behavior, and/or customer type.

Compliance mapping data can include regulatory alignment information and audit trail documentation. For example, the compliance mapping data can include information relating to how the synthetic dataset adheres to specific industry regulations, privacy laws, and organizational policies. Compliance mapping data can include detailed documentation showing how synthetic transaction data complies with PCI-DSS requirements for payment card security, how synthetic customer profiles meet GDPR privacy protection standards, and how synthetic risk assessments align with Basel III capital adequacy regulations, including specific explanations of which privacy-preserving techniques were applied and which regulatory thresholds were maintained.

The data simulation platform 602 can generate one or more representations of the characterization dataset(s) for display on a user interface. For example, using the multi-channel output 1316*e* of FIG. 13, the data simulation platform 602 can generate, for display on a user interface of a user device, a graphical representation of the first characterization dataset and the second characterization dataset. The graphical user interface can include executive dashboard metrics, including metrics characterizing the pattern fidelity, privacy level, compliance, risk coverage, trust score, and/or audit readiness of the generated synthetic data.

In some implementations, the data simulation platform 602 can receive a data authorization indicator for the simulated dataset based on the generated characterization dataset (s). For example, the data simulation platform 602 receives, from the user device, a data authorization indicator for the simulated dataset. The data authorization indicator can specify that a user of the user device authorizes deployment of the simulated dataset. As an illustrative example, the data simulation platform 602 can include a signal or indication from an administrator that has reviewed the natural language characterizations that the synthetic data is suitable for testing or validation purposes (e.g., as required by the administrator). As such, the data simulation platform 602 enables human oversight and control over the synthetic data deployment process, enabling automated testing, and/or validation of the synthetic data deployment throughout the federated system.

For example, the data simulation platform, in response to receiving the data authorization indicator, can deploy the simulated dataset. The data simulation platform 602 can be triggered (e.g., in response to receiving the data authorization indicator) to automatically deploy the simulated dataset to at least a first computing node of a set of computing nodes to enable validation of a data processing pipeline using the simulated dataset. As an illustrative example, the data simulation platform 602 automatically deploys the authorized synthetic financial dataset to Bank A's regulatory compliance testing environment, Bank B's model validation servers, and/or Bank C's risk assessment development systems (and/or the respective servers), enabling each institution to conduct stress testing, algorithm validation, and regulatory reporting using realistic synthetic data that preserves the statistical properties of their collective real-world datasets, without exposing sensitive customer information.

Figure 15:
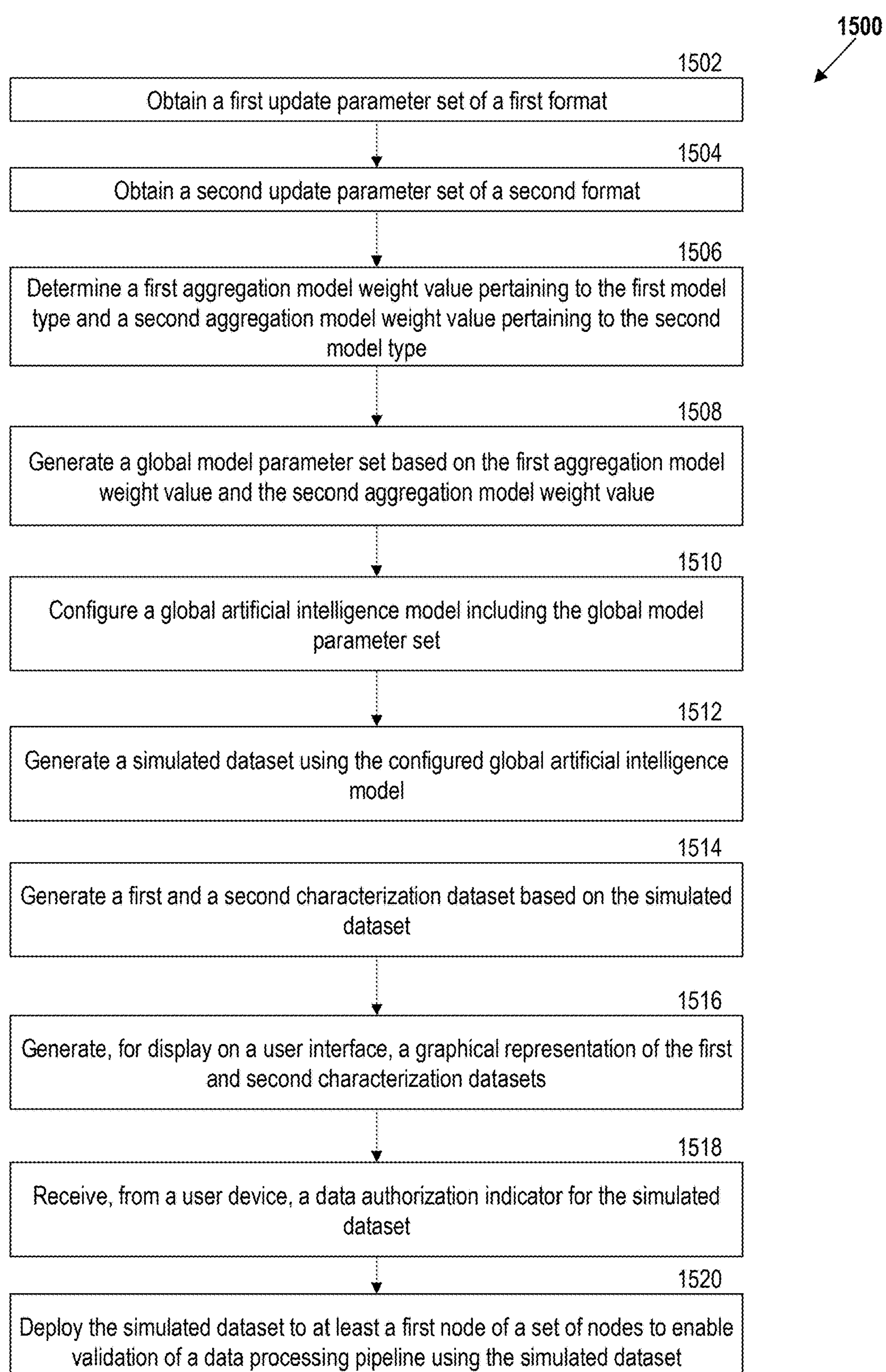
FIG. 15 illustrates an example flowchart for a process for explainable synthetic data generation based on federated, real-world source data, in accordance with one or more implementations of the disclosed technology.

FIG. 15 illustrates an example flowchart 1500 for a process for explainable synthetic data generation based on federated, real-world source data, in accordance with one or more implementations of the disclosed technology.

At 1502, the data simulation platform 602 can obtain a first update parameter set of a first format. For example, the data simulation platform 602 obtains, from a first server device, a first update parameter set of a first format. The first update parameter set can include parameters associated with a first local artificial intelligence model of a first model type. The first local artificial intelligence model can reside and/or be accessible from the first server device.

In some implementations, the data simulation platform 602 can obtain one or more update parameter sets by training and/or updating local artificial intelligence models. For example, the data simulation platform 602 obtains a training dataset comprising (1) an input node dataset of a first data type and (2) a ground-truth dataset of the first data type. The data simulation platform 602 can input, using the first server device, the input node dataset to the first local artificial intelligence model to generate a local model output based on the input node data. The local model output can preserve structural, semantic, and statistical properties of the input node dataset. The first local artificial intelligence model can include a model parameter set. The data simulation platform 602 can generate, based on the ground-truth dataset and the local simulated dataset, a loss metric value for the first local artificial intelligence model. The loss metric value can characterize a difference between the local model output and the ground-truth dataset. The data simulation platform 602 can determine, based on the loss metric value, an updated model parameter set for the first local artificial intelligence model. The data simulation platform 602 can determine the first model type of the first local artificial intelligence model. The first model type can include at least one of: a generative adversarial network (GAN) model type, a variational autoencoder model type, or a diffusion model type. The data simulation platform 602 can determine, based on the first model type and the first local artificial intelligence model, the first update parameter set. The first update parameter set comprises at least one of: encrypted parameters, aggregated gradients, or compressed updates.

At 1504, the data simulation platform 602 can obtain a second update parameter set of a second format. For example, the data simulation platform 602 obtains, from a second server device, a second update parameter set of a second format. The second update parameter set can include parameters associated with a second local artificial intelligence model of a second model type. The second local artificial intelligence model can resides on and/or be accessible from the second server device.

At 1506, the data simulation platform 602 can determine a first aggregation model weight value associated with the first model type and a second aggregation model weight value associated with the second model type. For example, the data simulation platform 602 determines a first aggregation model weight value pertaining to the first model type and a second aggregation model weight value pertaining to the second model type.

In some implementations, the data simulation platform 602 can determine the aggregation model weight value based on a model type associated with the corresponding local artificial intelligence model. For example, the data simulation platform 602 determines the first model type associated with the first server device. The data simulation platform can determine the first aggregation model weight value specific to the first model type and the first server device.

At 1508, the data simulation platform 602 can generate a global model parameter set based on the first aggregation model weight value and the second aggregation model weight value. At 1510, the data simulation platform 602 can configure a global artificial intelligence model including a global model parameter set generated based on the first aggregation model weight value and the second aggregation model weight value. For example, the data simulation platform 602 applies (1) the first aggregation model weight value to the first update parameter set and (2) the second aggregation model weight value to the second update parameter set to configure a global artificial intelligence model. In response to configuring the global artificial intelligence model, the data simulation platform 602 can generate a simulated dataset using the configured global artificial intelligence model.

At 1512, the data simulation platform 602 can generate a simulated dataset using the configured global artificial intelligence model. At 1514, the data simulation platform 602 can generate one or more characterization datasets based on the simulated dataset. For example, the data simulation platform 602 inputs the simulated dataset into a data characterization model to generate a first characterization dataset and a second characterization dataset. The first characterization dataset can include a first natural language characterization of first data associated with the first model type. The second characterization dataset can include a second natural language characterization of second data associated with the second model type.

In some implementations, the data simulation platform 602 can update the local artificial intelligence models based on calculation of quality metric values. For example, the data simulation platform 602 provides an input node dataset to the first local artificial intelligence model to generate a local model output based on the input node dataset. The local model output preserves structural, semantic, and statistical properties of the input node dataset. The data simulation platform 602 can transmit the simulated dataset to the first server device. In response to transmitting the simulated dataset to the first server device, the data simulation platform 602 can receive a set of local quality metric values from the first server device. The set of local quality metric values can be generated using the local model output, the simulated dataset, and a local ground-truth dataset associated with the first local artificial intelligence model. The set of local quality metric values can characterize at least one of a statistical fidelity, a privacy leakage, or a utility score associated with the local model output. The data simulation platform 602 can receive, from the second server device, a second set of local quality metric values for the second local artificial intelligence model. The data simulation platform 602 can provide the first and second sets of local quality metric values to a Byzantine-robust consensus model to generate a quality consensus value for the first and second local artificial intelligence models. The data simulation platform 602 can determine whether the quality consensus value satisfies a quality consensus threshold value. In response to determining that the quality consensus value does not satisfy the quality consensus threshold value, the data simulation platform 602 can generate a training indicator specifying whether the first and second local artificial intelligence models are to be trained. In response to generating the training indicator, the data simulation platform 602 can provide the simulated dataset to the first and second local artificial intelligence models to generate updated first and second parameter sets.

In some implementations, the data simulation platform 602 uses source metadata, model generation metadata, and/or validation metadata to generate the characterization dataset. For example, the data simulation platform 602 obtain source metadata, model generation metadata, and validation metadata. The source metadata can include information characterizing input data associated with at least one of the first or second local artificial intelligence models. The model generation metadata can include information characterizing configuring the global artificial intelligence model. The validation metadata can include information characterizing a validation status for the simulated dataset. The data simulation platform 602 can generate, using the source metadata, the model generation metadata, and the validation metadata, the first characterization dataset based on at least two of: (1) a feature impact dataset, (2) a counterfactual explanation dataset, (3) a natural language explanation dataset, or (4) a confidence score value dataset. The first characterization dataset can include at least one quantitative or qualitative feature of the simulated dataset and a corresponding value characterizing the at least one quantitative or qualitative feature. The data simulation platform 602 can receive, from a user device, a characterization request associated with the simulated dataset. In response to receiving the characterization request, the data simulation platform can generate, for display on the user device, a graphical representation of the first characterization dataset.

In some implementations, the data simulation platform 602 obtains the source metadata including statistical distribution information, inferred entity-relationship network information, and/or privacy information. For example, the data simulation platform 602 transmits, to the first server device, a request for the source metadata. The data simulation platform 602 can receive the source metadata, from the first server device and for source data associated with the first local artificial intelligence model, comprising at least one of: (1) a source data statistical distribution dataset, (2) an inferred entity-relationship network characterizing node identifiers and node relationships for the source data, or (3) a privacy dataset characterizing privacy characteristics of the source data.

In some implementations, the data simulation platform 602 obtains the model generation metadata based on detecting one or more data processing actions. For example, the data simulation platform 602 detects at least one data processing action associated with generating the simulated dataset using the configured global artificial intelligence model. The data simulation platform 602 generates, using the at least one data processing action, an indication of a data processing protocol comprising at least one of: (1) a model selection, (2) a data transformation, or (3) an applied constraint associated with the global artificial intelligence model. The data simulation platform 602 can generate the model generation metadata including the indication of the data processing protocol.

In some implementations, the data simulation platform 602 obtains the validation metadata based on a statistical fidelity indicator, a privacy verification indicator, and/or a compliance indicator. For example, the data simulation platform 602 determines, based on the simulated dataset, the validation status comprising at least one of (1) a statistical fidelity indicator, (2) a privacy verification indicator, and (3) a compliance indicator. The data simulation platform 602 can generate the validation metadata including the determined validation status.

At 1516, the data simulation platform 602 can generate, for display on a user interface, a graphical representation of at least one characterization dataset. For example, the data simulation platform 602 generates, for display on a user interface of a user device, a graphical representation of the first characterization dataset, the second characterization dataset, and/or an aggregate characterization dataset.

In some implementations, the data simulation platform 602 can generate the graphical representation of one or more characterization datasets by generating an aggregate characterization dataset. For example, the data simulation platform 602, based on the first characterization dataset and the second characterization dataset, generates an aggregate characterization dataset. The first characterization dataset can include a description of the first data of a first data type. The second characterization dataset can include a description of the second data of a second data type. The first or second data type include at least one of: a transaction-level type, a pattern-level type, a risk-score type, or a compliance mapping-type. The data simulation platform 602 can receive, from a first device, a user prompt including a query relating to the simulated dataset. The query can be associated with characterization of the simulated dataset. The characterization can relate to the first and second data types. The data simulation platform 602 can input the user prompt and the aggregate characterization dataset to a language model to generate a natural language output. The natural language output can include one or more characterization values that characterize the simulated dataset according to the first data type and the second data type.

At 1518, the data simulation platform 602 can receive, from a user device, a data authorization indicator. For example, the data simulation platform 602 receives, from the user device, a data authorization indicator for the simulated dataset. The data authorization indicator can specify that a user of the user device authorizes deployment of the simulated dataset.

At 1520, the data simulation platform 602 can deploy the simulated dataset to one or more nodes associated with a data processing pipeline. For example, in response to receiving the data authorization indicator, the data simulation platform 602 deploys the simulated dataset to at least a first node of a set of nodes to enable validation of a data processing pipeline using the simulated dataset.

Process for Updating Simulated Datasets Based on Privacy Modifications

The disclosed technology further enables post-generation control of synthetic datasets by receiving modification requests from entities to update privacy parameter. For example, the disclosed data simulation platform 602 (e.g., a data generation platform) determines which data records are affected using an associated inferred entity-relationship network and selectively regenerates only the affected portions while maintaining cryptographic audit trails on a distributed ledger of associated changes. The approach enables entities to maintain control over data contributions to synthetic datasets even after generation and distribution of the datasets, enabling retroactive consent management and targeted database updates without requiring complete regeneration of the synthetic datasets or analysis of updated statistical, structural, or semantic properties of the underlying real-world data (e.g., as affected by the modified privacy parameters).

The data generation platform described herein can update simulated datasets (e.g., for purposes of testing or validation of a complex distributed system) based on modifications to privacy parameters associated with entities of the system. For example, the complex distributed system includes a data transformation pipeline, distributed microservices architecture, cloud infrastructure, model deployment pipelines, or other suitable systems (e.g., as described above). For example, the disclosed technology enables validation, using the updated simulated datasets, of complex deployment pipelines that are dependent on data flows or processes between related entities or nodes, as described in relation to FIGS. 8A-B.

Figure 16:
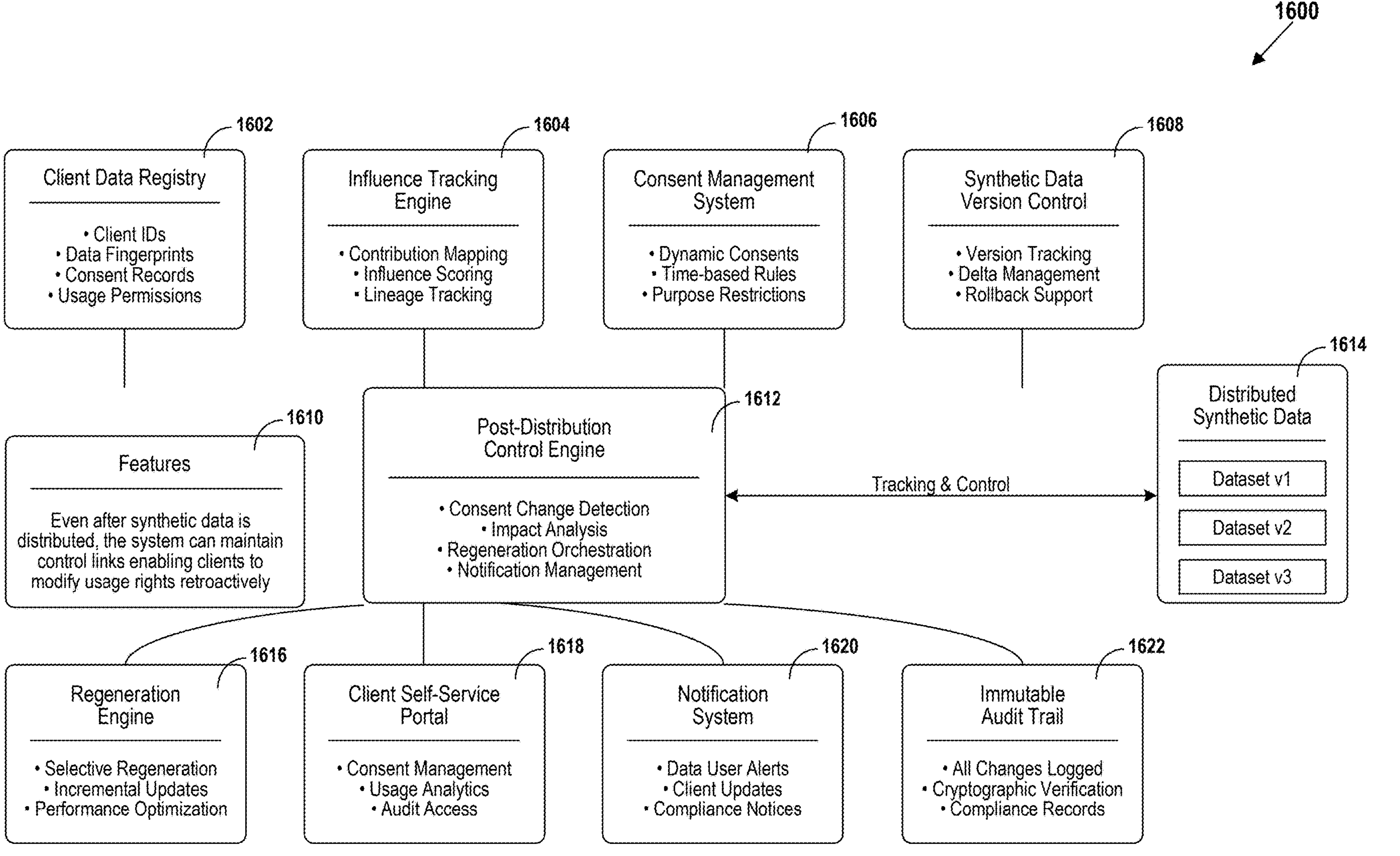
FIG. 16 illustrates an example system architecture for post-generation control of inferred entity-relationship network-based synthetic data generation, in accordance with one or more implementations of the disclosed technology.

FIG. 16 illustrates an example system architecture 1600 for post-generation control of inferred entity-relationship network-based synthetic data generation, in accordance with one or more implementations of the disclosed technology. In some implementations, the system architecture 1600 is associated with, equivalent to, or corresponding to one or more components of the example environment 600 of FIG. 6 or components of the computer system 500 of FIG. 5.

For example, the system architecture 1600 includes a client data registry 1602, an influence tracking engine 1604, a consent management system 1606, a synthetic data version control engine 1608, a post-distribution control engine 1612, a regeneration engine 1616, a client self-service portal 1618, a notification system 1620, and/or an immutable audit trail 1622. As such, the system architecture 1600 includes features 1610 that enable generation, tracking, and/or control of distributed synthetic data 1614 (e.g., according to client- or entity-controlled consent records or usage permissions).

For example, the system architecture 1600 (e.g., and/or the other components, processes, and/or devices associated with FIGS. 1-21) can include a containerized microservices architecture, a high-availability configuration, a scalable processing engine (e.g., according to varying computational loads), secure internal communication (e.g., encrypted service-to-service communication) and/or a resource management system.

The post-distribution control engine 1612 can include a hierarchical control structure (e.g., from enterprise-wide policies to department-specific configurations), a custom control interface (e.g., enabling enterprises to define their own control parameters, a policy engine (e.g., enforcing enterprise-defined rules and constraints), integration APIs (e.g., connecting with existing enterprise systems to enable identity management, data governance, and compliance, and a real-time monitoring dashboard.

The system architecture 1600 can include a data ingestion and management layer, enabling multi-source connectivity, a data classification engine (e.g., based on sensitivity and regulatory requirements), a metadata enrichment engine (e.g., to capture and maintain comprehensive metadata about data sources and relationships), version control integration (e.g., enabling tracked changes in source data and impact on synthetic outputs), and a data lineage tracking system (e.g., to maintain complete provenance from source to synthetic data).

The post-distribution control engine 1612 can include a dynamic consent management system (e.g., enabling retroactive consent modification, consent propagation, granular consent options, time-bounded consent, and/or purpose-specific consent), as described below. The post-distribution control engine 1612 enables influence mapping, contribution scoring, influence visualization, influence isolation, and/or cross-dataset tracking. Additionally or alternatively, the post-distribution control engine 1612 enables automated synthetic data regeneration (e.g., selectively), including version management, downstream impact analysis, regeneration scheduling, and notification system features.

The notification system 1620 and the client self-service portal 1618 enable control by clients or entities over shared data, including usage analytics, opt-out mechanisms, compensation tracking (e.g., associated with data usage), and/or audit access (e.g., relating to data usage by clients).

As an illustrative example, the platform receives a modification request relating to an entity that is associated with a data transformation pipeline (e.g., a model deployment pipeline, a financial transaction network, or another suitable system, as described above with respect to FIG. 6). An entity (e.g., a client, a financial institution, an administrator system, or another suitable node) of the data transformation pipeline can be associated with privacy parameters (e.g., an associated privacy parameter set), protocols, or descriptors associated with data transfers, data security, or data sharing permissions. As discussed below, the data simulation platform 602 described herein can conform to entity-specified or entity-controlled privacy or consent parameters by constraining generation and maintenance of simulated data according to the determined or received parameters. By doing so, the data simulation platform 602 enables granular control over generated simulated data such that the data satisfies entity-based privacy parameters or constraints.

For example, an entity can be associated with a client data registry 1602. The client data registry 1602 can include information characterizing, controlling, or defining entity properties, such as client identifiers, data fingerprints, consent records, and/or usage permissions associated with data relating to the particular entity.

As an illustrative example, the entity is associated with a privacy parameter set (e.g., as stored within the client data registry 1602 of FIG. 16). A privacy parameter set can include a structured data configuration that defines constraint, regulation, or privacy characteristics, consent levels, data usage restrictions, or any suitable data for simulated data records (and/or associated real-world data) that limits data associated with a particular entity within a synthetic data generation system. For example, the privacy parameter set specifies which types of data fields can be shared, processed, or included with real-world or synthetic datasets, geographic restrictions, along with temporal restrictions and/or purpose-based limitations for data usage.

Figure 17:
FIG. 17 illustrates an illustrative data structure for a privacy parameter set, in accordance with one or more implementations of the disclosed technology.

FIG. 17 illustrates an illustrative data structure 1700 for a privacy parameter set 1702, in accordance with one or more implementations of the disclosed technology. For example, the privacy parameter set 1702 includes a set of privacy parameters 1704 and associated privacy parameter values 1706. The privacy parameter set can include an entity identifier (e.g., identifying or relating the set of privacy parameters or associated consent/privacy characteristics to a particular entity). The privacy parameter set can include parameters and/or values of a variety of formats. For example, the privacy parameter set 1702 includes a personal identifiable information sharing tag indicating whether personal data (e.g., associated with particular user accounts of a distributed microservices network or bank accounts of a financial transactions network) can be incorporated within the generated simulated datasets (and/or whether such data can be shared between entities within the real-world transactions network). In some implementations, the privacy parameter set includes an account balance sharing tag that includes whether account balance information (or other information relating to values that are assigned to user- or bank accounts) can be integrated within the simulated dataset (and/or shared with the data generation platform or other entities represented within the inferred entity network). In some implementations, the privacy parameter set includes an indication of mandatory explanation fields, as described below.

In some implementations, the privacy parameter set includes an indication of particular datasets that are forbidden from inclusion within the simulated data generation process. Additionally or alternatively, the privacy parameter set includes an indication of particular portions of the simulated dataset that can be shared externally or with particular entities within the network (e.g., the data transformation pipeline). In some implementations, the privacy parameter set includes department-level boundaries or privacy settings (e.g., defining which departments can access specific synthetic datasets). In some implementations, the privacy parameter set includes temporal boundaries associated with real-world data that can be used to generate the simulated dataset and/or data records associated with the generated simulated dataset (e.g., in the form of an expiration date). In some implementations, the privacy parameter set includes an indication of allowed uses (e.g., Purposes A, B, or D as shown in FIG. 17) or forbidden uses. Additionally or alternatively, the privacy parameter set can specify rules (e.g., conditional rules) associated with one or more parameters or values of the privacy parameter set. For example, the privacy parameter set can forbid particular uses or generated simulated data or input real-world data depending on the datasets or data records to be shared.

By receiving, defining, and/or storing (e.g., within the client data registry 1602) information relating to privacy parameters associated with particular entities, and associated real-world or synthetic data, the disclosed data simulation platform enables granular control of influences of particular entities' data on the associated simulated dataset, as well as distribution of the simulated dataset to other components of the network or data transformation pipeline.

Figure 18:
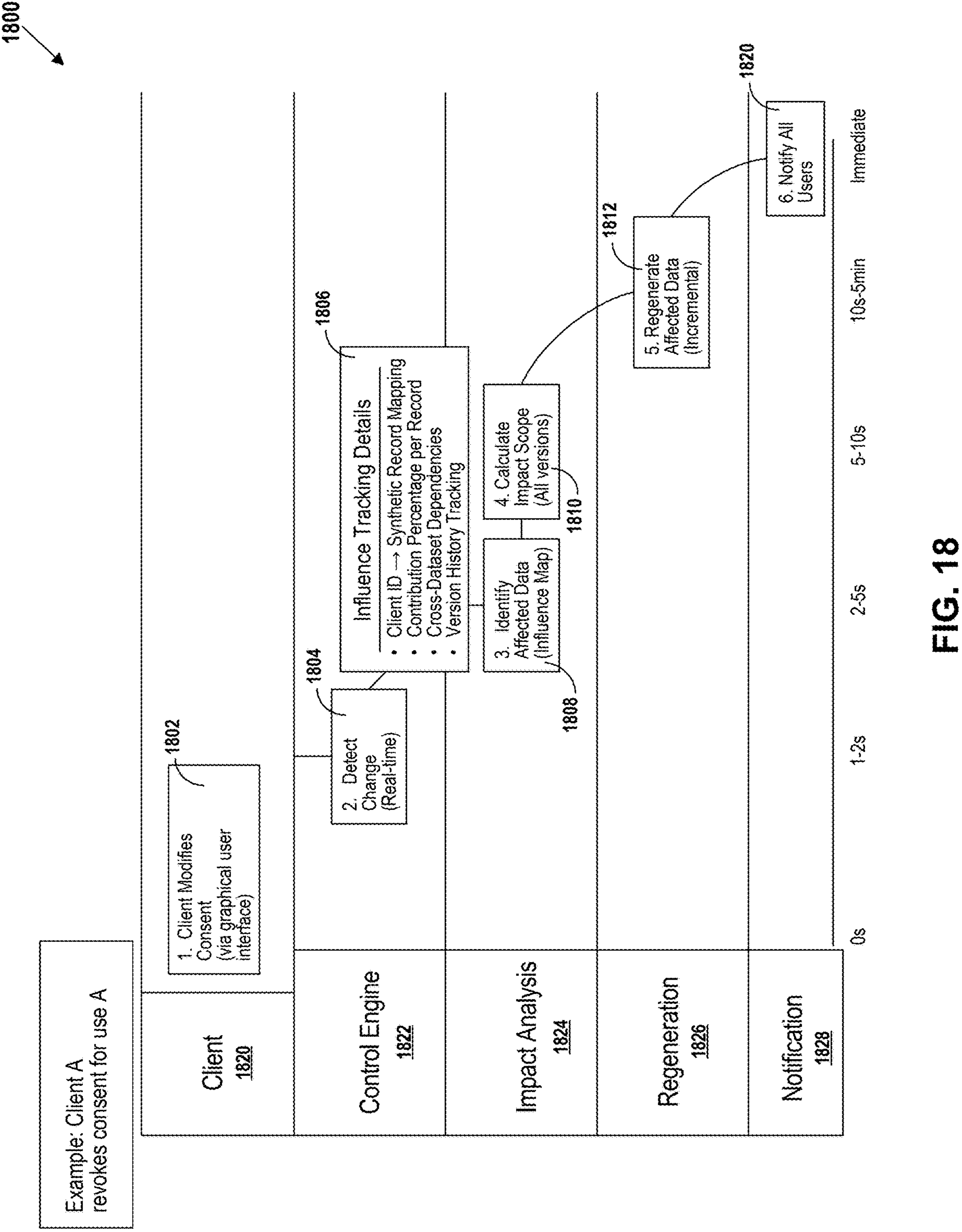
FIG. 18 demonstrates a flow for processing consent revocation requests by an entity, in accordance with one or more implementations of the disclosed technology.

FIG. 18 demonstrates a flow 1800 for processing consent revocation requests by an entity, in accordance with one or more implementations of the disclosed technology. For example, the flow 1800 describes an example process for updating generated simulated data (e.g., synthetic data) based on an entity's revocation of consent for a particular use (e.g., a use A). The flow 1800 include client-related operations 1820, control engine-related operations 1822, impact analysis-related operations 1824, regeneration-related operations 1826, and notification-related operations 1828, as shown in FIG. 18.

In some aspects, the data simulation platform 602 receives, at a first device, a modification request for a simulated dataset (e.g., from a containerized application) that includes an updated privacy parameter set. For example, at step 1802 of the flow 1800, an entity (e.g., via a client device) can modify one or more privacy parameters associated with the entity's data sharing or privacy characteristics within a graphical user interface. At step 1804 of the flow 1800, the data simulation platform can detect a client device's modification of consent (e.g., one or more privacy parameters of an associated privacy parameter set for a particular entity, as stored within the client data registry 1602 of FIG. 16). In some implementations, the detection can occur via a smart contract logic (e.g., as described with respect to FIG. 19 below). As such, the data simulation platform can obtain an updated privacy parameter set corresponding to the particular entity making the change (e.g., by receiving the updated privacy parameter set directly from the client device or via detection of a change within the associated privacy parameter set).

Figure 19:
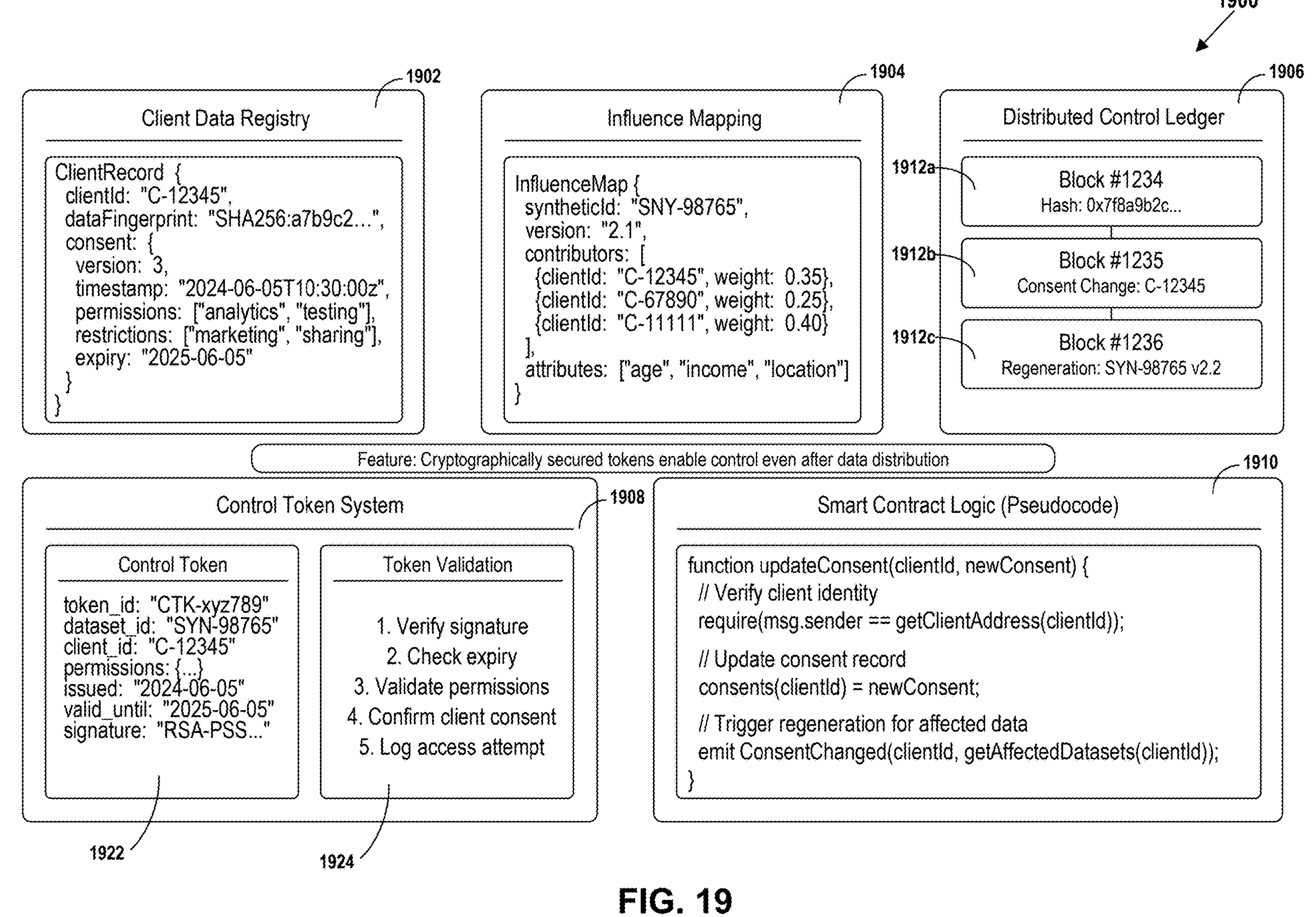
FIG. 19 is an illustrative example of stored data structures enabling post-deployment control of generated synthetic data, in accordance with one or more implementations of the disclosed technology.

FIG. 19 is an illustrative example 1900 of stored data structures enabling post-deployment control of generated synthetic data, in accordance with one or more implementations of the disclosed technology. For example, the data simulation platform 602 (and/or the associated example architecture 1600) includes a client data registry 1902 (e.g., the client data registry 1602), an influence mapping module 1904, a distributed control ledger 1906, a control token system 1908, and/or smart control logic 1910.

The modification request can be associated with a first entity, and the associated updated privacy parameter set (e.g., as stored on or retrieved from the client data registry 1602 of FIG. 16 or the client data registry 1902 of FIG. 19) can include one or more characteristics for simulated data records associated with the first entity. The simulated dataset relating to the modification request can include a data structure with a set of data records, where each data record of the set of data records includes a particular set of fields and a particular set of corresponding values; some of the data records can be associated directly or indirectly with the first entity. To illustrate, the simulated dataset (e.g., synthetic data) is associated with real-world data described by an inferred entity-relationship network characterizing statistical, semantic, and/or structural properties of the real-world data, as described above.

The simulated dataset can include one or more simulated data records. Each data record can include one or more fields and one or more corresponding value. To illustrate, a data record can include information associated with, generated by, and/or characterizing a data transformation pipeline, such as a financial transactions network or a distributed microservice network. For example, a data record includes structured information representing synthetic entities, relationships, or transactions within the simulated system while preserving statistical, semantic, and/or structural properties of the original real-world data. In some implementations. In some implementations, each data record contains field-value pairs that capture specific attributes of the synthetic entities or relationships thereof, such as identifiers, timestamps, transaction amounts, activity log records, or system performance metrics. The data records can be organized in tabular formats, hierarchical structures, or graph-based representations depending on the complexity of the relationships being modeled.

For example, in a distributed financial transaction network, a data record includes fields such as a transaction identifier, a sender account, a receiver account, a transaction amount, a timestamp, and/or a transaction type, with corresponding synthetic values that maintain realistic financial patterns while protecting the privacy of actual account holders (e.g., as required by associated privacy parameter values). The data record can include additional fields, such as risk score, compliance status, and/or processing bank that capture the regulatory and/or operational aspects of the financial transactions within the transactions network. In some implementations, the data records include nested structures that represent complex financial instruments or multi-party transactions, with each field including synthetic values that preserve the statistical distributions and correlation patterns observed in real-world financial data.

In some implementations, a data record of the simulated dataset can include information relating to system performance characteristics of the financial transactions network or distributed microservices network. For example, the data record can include fields such as a service identifier (e.g., associated with a particular containerized application of the network), a computational processing unit utilization value, a memory consumption value, an API call count, and/or a response latency associated with synthetic values that reflect realistic system performance characteristics.

In some implementations, the data simulation platform can verify the identity of the client device (e.g., the containerized application and/or client device) associated with the modification request. For example, the data simulation platform leverages control tokens to verify a cryptographic digital signature associated with the client device and/or associated entity (e.g., using a public key associated with the entity's private key).

In some implementations, the data simulation platform determines (e.g., receives, retrieves, and/or obtains) a control token that is associated with the entity relating to the modification request. For example, the data simulation platform determines, using the modification request, a control token 1922 associated with the first entity, where the control token includes a cryptographic digital signature including a first hash value generated using a private key associated with the first entity.

In some implementations, the control token corresponds to the modification request and/or the associated updated privacy parameter set. The control token system 1908 can retrieve the control token 1922 and/or validate the token 1924, as demonstrated in FIG. 19. To illustrate, the data simulation platform 602 determines, using the modification request, a control token associated with the first entity that includes a cryptographic digital signature associated with the entity. For example, the data simulation platform receives an identifier of and/or the contents of the control token within the modification request.

A control token can include a cryptographic digital signature and/or other suitable authentication mechanism for one or more users or entities associated with the simulated dataset, the data simulation platform, or the real-world data. For example, a control token includes an authentication data structure to enable entities to maintain verifiable control over data contributions even after synthetic datasets have been generated and distributed. For example, the control token includes a unique token identifier, a dataset identifier (e.g., associated with data to be controlled by the user via the privacy characteristics or protocols), a client identifier (e.g., an entity identifier for a bank or other financial institution contributing data to the simulated data generation platform), a permissions specification (e.g., the updated privacy parameter set), an issue date, a validity period, and/or a cryptographic signature generated using the entity's private key. In some implementations, the control token serves as a tamper-evident authorization credential that proves an entity's right to modify privacy parameters or revoke consent for previously contributed data within the synthetic data generation system.

The cryptographic digital signature of the control token can include a mathematical authentication mechanism that uses asymmetric cryptography to verify the authenticity and integrity of digital messages, control tokens, or other information. For example, the cryptographic digital signature enables an entity to employ a private key (hidden from other users or entities) to generate a unique hash-based signature that can be verified using the corresponding public key (e.g., that is accessible to the device or entity receiving the signed document or data). As such, the cryptographic digital signature protocol of the disclosed technology enables the data simulation platform to ensure that only the legitimate entity possessing the private key could have created the signature. In some implementations, the cryptographic digital signature includes RSA-PSS algorithms, elliptic curve digital signature algorithms (ECDSA), or other public-key cryptographic schemes that generate tamper-evident proof of authorization for modification requests. As an illustrative example, a cryptographic digital signature can include a hash value generated using a banking entity's private RSA key to authenticate privacy parameter modification requests for simulated datasets containing transaction patterns associated with the banking entity.

The signature enables verification that the modification requests originate from an authorized financial institution rather than malicious actors attempting to manipulate synthetic data used for regulatory compliance testing or risk assessment monitoring. In some implementations, the cryptographic digital signature includes additional metadata, including timestamp information, entity identifiers, and/or permission scopes that are cryptographically bound to prevent unauthorized alterations to the modification request.

The data simulation platform 602 can retrieve, from an entity cryptographic database, a public key associated with the first entity to enable verification of the control token and/or associated modification request. As an illustrative example, the entity cryptographic database can include public keys associated with entities that contribute data to the simulated dataset (and/or are otherwise related to the real-world data, simulated dataset, or inferred entity-relationship network). The data simulation platform 602 can apply the public key (e.g., using the associated asymmetric cryptographic algorithm, as described above), to generate a second hash value. The data simulation platform can determine whether the first hash value (e.g., received within the control token and generated via the entity's private key) matches the second hash value (e.g., generated by applying the entity's public key to the modification request or control token (or signed data) in order to determine the authenticity of the control token and associated entity. In some implementations, the data simulation platform verifies that the control token has not expired (e.g., by comparing a current timestamp with a "valid until" timestamp within the control token), validates permissions (e.g., associated with whether the entity is able to access particular data to be modified or other suitable network components), can confirm client consent, and log the client's access attempt (e.g., within a distributed ledger).

For example, in response to determining that the first hash value matches the second hash value, the data simulation platform 602 causes generation, on a distributed ledger, of a cryptographic data structure (e.g., a client access attempt log) that represents validation of the modification request by the first entity. As an illustrative example, the data simulation platform can cause generation of a block (e.g., the block 1912) within the distributed control ledger 1906, where the block representing a change in consent associated with a particular client.

A distributed ledger (e.g., the distributed control ledger 1906 of FIG. 19) can include a decentralized database system enabling maintenance of synchronized records across multiple nodes or computing devices, thereby providing tamper-resistant storage and verification capabilities for data transactions, actions, or operations. As an illustrative example, the distributed ledger can employ cryptographic hashing (e.g., using symmetric or asymmetric cryptographic algorithms), consensus mechanisms (e.g., proof-of-work or proof-of-stake consensus), and/or replication protocols to ensure that participating nodes maintain identical copies of the ledger, while preventing unauthorized modifications to historical records. In some implementations, the distributed ledger includes blockchain-based architectures (e.g., represented by blocks 1912*a*-1912*c*), directed acyclic graph structures, or other distributed consensus systems that enable immutable record-keeping and cryptographic verification of data integrity across networks.

As an illustrative example, the distributed ledger can store cryptographic data structures (e.g., cryptographic records or blocks) representing synthetic data modifications, privacy parameter changes, and/or entity consent updates across multiple entities or nodes. For example, the ledger includes one or more Merkle tree structures that link privacy modification requests (e.g., representing a consent change using the block 1912*b*) to particular synthetic data generation events (e.g., a simulated dataset regeneration event represented by the block 1912*c*, as described below, using the block 1912*c*). In some implementations, the events represented within blocks include data access events, generation parameters, consent changes, user actions, system decisions, and/or system performance metric data.

A cryptographic data structure can include a digitally secured data block or record employing cryptographic techniques (e.g., to ensure data integrity, authenticity, and/or immutability within a distributed ledger). For example, a cryptographic data structure includes a hash value, a digital signature, a timestamp, and/or Merkle tree references, thereby enabling tamper-evident storage of synthetic data modifications and/or privacy parameter changes. In some implementations, the cryptographic data structure includes block headers with previous block hashes, transaction Merkle roots, and/or consensus proof mechanisms that enable linking of individual records of the ledger to a chain of data governance events (e.g., that is immutable by individual entities associated therewith). To illustrate, a block can include hash values of updated synthetic datasets, timestamps of privacy parameter modifications, digital signatures from requesting banking entities, and/or Merkle tree proofs that link modifications (e.g., to simulated datasets) to particular data records of the simulated datasets. In some implementations, the cryptographic data structure includes smart contract execution records documenting automated privacy parameter updates and/or synthetic data regeneration processes that are triggered by entities' consent modifications.

As such, the disclosed technology enables regulatory auditors to cryptographically verify that entities (e.g., financial institutions) properly handle data governance requirements during synthetic data generation and continued deployment. In some implementations, the distributed ledger can include smart contract functionality that automatically executes privacy parameter updates and triggers synthetic data regeneration processes when entities modify consent levels or data sharing permissions (e.g., values or fields within privacy parameter sets).

In some aspects, the disclosed data simulation platform enables retrieval of information relating to influences, relationships, and/or links between different components of real-world data to aid in generation of simulated datasets. For example, the data simulation platform 602 retrieves an inferred entity-relationship network (e.g., the inferred entity-relationship network 850 of FIG. 8B, a set of influence tracking details 1806 of FIG. 18, and/or an influence map 1904 of FIG. 19). The inferred entity-relationship network can include an indication of at least one structural, semantic, and/or statistical property of the simulated dataset, as described in relation to FIG. 8B. For example, the inferred entity-relationship network 850 can include information relating to the influence of particular clients' data on one or more records or portions of the simulated dataset. The inferred entity-relationship network can include a mapping system tracking the influence and/or contribution of individual entities' data on specific portions of generated synthetic datasets, enabling precise identification of which synthetic records require modification when privacy parameters change. As an illustrative example, the inferred entity-relationship network can include influence tracking details that map client or entity identifiers to record identifiers (e.g., corresponding to records within the simulated dataset). The tracking details can include contribution percentage values (e.g., contribution metric values) that describe or quantify the contribution of individual entities (or the real-world data thereof) on specific portions of generated simulated datasets, thereby enabling precise identification of which synthetic records require modification when entity-specific privacy parameters change.

Additionally or alternatively, the inferred entity-relationship network includes cross-dataset dependencies (e.g., identifying relationships between one or more portions real-world data and one or more portions of simulated data or identifying relationships between multiple versions of simulated datasets) and version history tracking that maintains lineage information across dataset modifications. As such, the inferred entity-relationship network (e.g., the inferred entity-relationship network 850 of FIG. 8B) enables target updates to specific portions of deployed synthetic datasets based on statistical, structural, and/or semantic relationships between entities, datasets, and/or other objects associated with the entities, real-world data and/or simulated data.

As an illustrative example, the inferred entity-relationship network can be used to generate simulated data that conforms to stated privacy controls or consent characteristics defined at the entity-level. In some implementations, the data simulation platform 602 can generate the simulated dataset (e.g., the original or a modified dataset) using the inferred entity-relationship network by generating and/or leveraging an inferred statistical dataset associated with the relationship. To illustrate, the data simulation platform 602 receives a node dataset that includes an entity dataset, a relationship dataset, and/or real-world data (e.g., corresponding to the node dataset and/or knowledge network 800 of FIG. 8A). The data simulation platform 602 can provide the node dataset to a statistical inference model to generate an inferred statistical dataset for the node dataset that includes statistical metrics and associated values for the node dataset (e.g., as described in relation to FIGS. 6-15 above).

The data simulation platform 602 can receive the privacy parameter set associated with the simulated dataset (e.g., as stored within the client data registry 1602 of FIG. 16 or the client data registry 1902 of FIG. 19). Based on inputting the inferred statistical dataset, the node dataset, and the privacy parameter set into the graph generation model, the data simulation platform can generate the inferred entity-relationship network using a graph generation model (e.g., where the inferred entity-relationship network includes a set of inferred node identifiers corresponding to a set of inferred nodes and/or a set of inferred node relationships). For example, the inferred entity-relationship network includes a set of inferred node identifiers corresponding to a set of inferred nodes and a set of inferred node relationships. The inferred entity-relationship network can include an indication of structural, semantic, and/or statistical properties of the node dataset, where the indication is consistent with the inferred statistical dataset. Additionally or alternatively, each relationship of the set of inferred node relationships indicates a particular relationship label between at least two particular nodes of the set of inferred nodes. In some implementations, the data simulation platform 602 generates the simulated dataset using the inferred entity-relationship network (e.g., as described with respect to FIGS. 6-11).

Moreover, based on the inferred entity-relationship network, the data simulation platform 602 can determine a subset of data records of the simulated dataset that may be affected by a consent change (e.g., at the step 1808 of FIG. 18). As an illustrative example, the data simulation platform 602 determines, using the inferred entity-relationship network, the updated privacy parameter set, and the set of data records, a subset of the set of data records (e.g., a subset of the data records) with fields associated with (or relating to one or more updated parameters of) the updated privacy parameter set. As an illustrative example, the data simulation platform 602 uses the influence mapping 1904 of FIG. 19 and the associated updated privacy parameter set (e.g., corresponding to the privacy parameter set 1702) to determine which data records of the simulated dataset are to be modified.

As an illustrative example, the data simulation platform 602 can determine contribution metric values that quantify the extent to which a particular entity's data (e.g., real-world data or associated synthetic or simulated data) influences one or more particular fields and associated values of the simulated dataset when privacy parameters change (e.g., in a particular way). For example, the data simulation platform 602 determines, using the inferred entity-relationship network, a first contribution metric value associated with a contribution by the first entity to a first field of a data record of the simulated dataset. The data simulation platform 602 can determine that the first contribution metric value satisfies a contribution metric threshold value; in response to the determination, the data simulation platform 602 can generate and/or determine the subset of the data records that are affected by the change in privacy parameters.

As an illustrative example, the platform calculates contribution metrics by analyzing statistical correlations, data lineage mappings (e.g., as described by the inferred entity-relationship network), and influence weights to generate numerical values (e.g., contribution metric values) that represent each entity's contribution to particular synthetic data fields, as shown in the influence mapping 1904 of FIG. 19.

A contribution metric value can include a quantitative measurement that characterizes a degree of influence or impact that a particular entity's real-world data has on particular fields or attributes (e.g., within simulated datasets). For example, the contribution metric value represents a numerical score, a percentage, or a coefficient that indicates how much statistical, structural, or semantic information from data associated with an entity (e.g., real-world data) contributes to the generation of one or more particular elements (e.g., data records) of the simulated dataset. In some implementations, the contribution metric value ranges from 0 to 1, where higher values indicate stronger influence from the entity's data on the simulated data record, and where lower values indicate relatively minimal contribution from the entity's data sources. For example, a contribution metric value of 0.85 can indicate an 85% probability that a particular synthetic data record of the simulated dataset derives from the associated entity's (e.g., bank's) original real-world data (e.g., the particular bank's transaction data). In some implementations, the contribution metric values are calculated using correlation coefficients, mutual information measures, or statistical dependency analyses that compare synthetic data patterns with the original entity data distributions.

The data simulation platform 602 can compare the determined contribution metric value with a contribution metric threshold value that describes a criterion for a data record of the simulated data record to be considered affected by a given privacy parameter change or update. For example, a contribution metric threshold value can include a configurable numerical boundary or cutoff point that determines whether an entity's influence on a synthetic data record (e.g., a data record of the simulated dataset) is significant enough to warrant an update to the simulated dataset based on a change in privacy parameters associated with the entity. For example, the contribution metric threshold value ranges from 0 to 1, where different values indicate different sensitivity levels for detecting entity influence on synthetic data fields. In some implementations, a particular privacy parameter set (e.g., associated with an entity) sets an entity-specific contribution metric threshold value (e.g., which is received within the control token or the modification request). As such, the data simulation platform confers granular control over sensitivity levels that warrant updating associated records within the simulated dataset in response to a change in privacy or consent-based constraints associated with an entity.

In some implementations, the data simulation platform determines the contribution metric value based on statistical information associated with relationships between data records, data elements, or entities within the data record (e.g., via the data lineage stored within the influence tracking engine 1604). For example, the data simulation platform 602 retrieves and/or analyzes inferred statistical datasets that include statistical metrics and associated values that characterize relationships between entities, simulated data records (e.g., fields and values), and privacy parameters within the inferred entity-relationship network. Based on the statistical metrics and associated values, the data simulation platform can determine contribution metric values that reflect an influence of a particular entity's data or the impact of a corresponding privacy parameter on the resulting generated simulated dataset or records thereof.

For example, the data simulation platform 602 can retrieve an inferred statistical dataset associated with the inferred entity-relationship network, where the inferred statistical dataset includes, for the simulated dataset, a set of statistical metrics and a set of statistical metric values associated with the set of statistical metrics (e.g., as described in relation to FIGS. 6-11). Each statistical metric of the set of statistical metrics can be associated with one or more nodes of the inferred entity-relationship network or one or more relationships of the inferred entity-relationship network. In some implementations, the data simulation platform determines (e.g., using the inferred statistical dataset) a correlation value measuring a correlation between values associated with the first field of the first data record and one or more parameters of the updated privacy parameter set. Based on the first contribution metric value, the data simulation platform can generate the first contribution metric value.

As an illustrative example, the platform can access statistical metrics including correlation coefficients, variance measures, distribution parameters, and dependency scores that quantify how different entities' data influences specific synthetic data attributes. In some implementations, the inferred statistical dataset includes statistical metrics associated with individual nodes representing entities or data sources, as well as metrics associated with relationships between nodes or data records that capture interdependencies and influence patterns across the synthetic data generation process.

For example, the data generation platform 602 can calculate correlation values that measure the statistical relationship between field values of a simulated dataset and specific privacy parameters, thereby enabling quantification of how privacy parameter changes affect particular simulated dataset elements (e.g., data records). For example, the platform determines correlation coefficients between transaction amount patterns in simulated data records and a banking entity's account balance sharing privacy parameter. In some implementations, the platform uses the correlation values to generate contribution metric values, where higher correlation values between synthetic data fields and entity privacy parameters result in higher contribution metrics that indicate stronger entity influence on those specific synthetic data values within the simulated data records.

For example, based on the correlation coefficients, the data simulation platform determines specific privacy parameter values within the updated privacy parameter sets and determine which data records of the simulated data include fields whose values are affected by the modified privacy parameters. To illustrate, the data simulation platform can determine a first updated privacy parameter value, corresponding to a first updated privacy parameter, of the updated privacy parameter set and determine that a first data record of the set of data records includes a field that is associated with (e.g., statistically, structurally, or semantically related to) the first updated privacy parameter. In response to determining that the first data record includes the determined field, the data simulation platform can generate the subset of data records including the first data record. As an illustrative example, the platform can determine that an individual parameter value of the updated parameter set includes a "False" PII sharing tag and, in response, can determine data records that include fields semantically corresponding to PII associated with the entity of the modification request. Based on determining one or more data records associated with the associated PII, the platform can determine to include the given data records within the subset of data records determined to be affected by the update in privacy parameters.

In some implementations, the data simulation platform determines a complete impact scope associated with the change in parameters. For example, at operation 1806, the data simulation platform determines further data records that are affected (e.g., indirectly) by the updated privacy parameter set. As an illustrative example, the data simulation platform can utilize the inferred entity-relationship network to map out indirect impacts (e.g., based on knock-on effects) due to changes in an entity's consent associated with data sharing. By doing so, the data simulation platform 602 enables comprehensive assessment of cascading effects across multiple simulated dataset versions, downstream systems, and dependent data processing pipelines, enabling the protection of data and privacy associated with entities according to selected or required privacy constraints.

In some aspects, the data simulation platform (e.g., at operation 1812 of FIG. 18 and using the regeneration engine 1616) can generate an updated subset of the data records that is consistent with the updated privacy parameter set (e.g., for the identified subset of data records affected by changing consent permissions). For example, the data simulation platform 602 provides the inferred entity-relationship network and the updated privacy parameter set to generate an updated subset of the data records that is consistent with the updated privacy parameter set. As an illustrative example, the data simulation platform 602 (e.g., using one or more methods, processes, or components associated with FIGS. 1-15) enable generation of updated data records (and/or updated portions of the simulated dataset) based on the inferred entity-relationship network and the updated privacy parameter sets. The data simulation platform can leverage structural, semantic, and/or statistical relationships encoded within the inferred entity-relationship network alongside specific privacy constraints (e.g., as defined by an entity within the updated privacy parameter set) to guide the generation of synthetic data that maintains realistic patterns while adhering to the new privacy restrictions. In some implementations, the data simulation platform can generate the updated records to preserve interdependencies between synthetic data elements while applying the updated privacy parameters to mask, aggregate, or eliminate specific data attributes according to the entity's modified consent levels (e.g., as defined within the updated privacy parameter set). By doing so, the data simulation platform provides granular control over consent and privacy permissions associated with real-world data underlying simulated data. Simultaneously, the data simulation platform can confer significant computational efficiency to synthetic data generation systems by enabling selective updates only to records that are affected by the particular privacy updates, thereby improving system performance and minimizing system disruption associated with redeployment of data to associated nodes, entities, or computing systems that are unaffected by the privacy changes.

In some implementations, the data simulation platform can verify that the generated, updated data records satisfy contribution metric threshold criteria consistent with the updated privacy parameter sets. For example, the data simulation platform determines a first set of values corresponding to the first set of fields (e.g., for a first data record of the subset of the data records). The data simulation platform can determine that the modification request includes a threshold contribution metric value associated with the entity associated with the modification request. The data simulation platform can determine, using the inferred entity-relationship network, a first contribution metric value associated with the first set of values for the first data record. In some implementations, the first contribution metric value is greater than the threshold contribution metric value (e.g., thereby triggering regeneration of the associated data record to cure the violation of privacy parameter-based criteria).

In response, the data simulation platform can input the threshold contribution metric value, the inferred entity-relationship network, and the first set of values (e.g., corresponding to the determined set of fields of the record) to generate a corresponding second set of values. The data simulation platform can determine, using the inferred entity-relationship network, a second contribution metric value associated with the second set of values for the first data record and determine (e.g., validate) that the second contribution metric value is less than or equal to the threshold contribution metric value. In response to the determination, the data simulation platform can generate the updated subset of the data records to include an updated data record that includes the second set of values.

To illustrate, the data simulation platform 602 can use a data generation model (e.g., as described in relation to FIGS. 6-11) to leverage the inferred entity-relationship network and information relating to whether the data records are affected by changes to privacy or consent policies of the entity to regenerate associated records such that the regenerated records are sufficiently uninfluenced by the particular entity's data. By doing so, the data simulation platform enables targeted regeneration of synthetic data that maintains statistical and structural integrity, while reducing or changing entity-specific influence to comply with updated privacy parameters, thereby conferring granular control to entities in controlling influence on generated simulated datasets, while providing computational efficiency improvements over dataset regeneration systems that require wholesale updating of simulated data.

In some implementations, the data simulation platform 602 (e.g., at operation 1812 of FIG. 18 and leveraging the regeneration engine 1616 of FIG. 16) can generate values for the data records by substituting a first entity's records for another entity's records. For example, the data simulation platform 602 retrieves, from a node database, a node dataset corresponding to a second entity of the set of entities. The data simulation platform 602 can input the retrieved node dataset into the data generation model to generate the second set of values associated with the first set of fields. The second set of values can be consistent with semantic, structural, and statistical properties of the node dataset.

To illustrate, the data simulation platform 602 leverages real-world data from alternative entities within the network or data transformation pipeline (e.g., with suitable privacy parameters) to generate replacement synthetic values that reduce the influence of entities with updated privacy restrictions, while maintaining realistic data patterns. For example, if a first Bank (e.g., Bank A) restricts data sharing consent, the platform can retrieve node datasets from another bank (e.g., Banks B or C) that contain similar transaction patterns, customer demographics, or risk assessment data. The platform can insert the other bank's node dataset into the data generation model to generate synthetic transaction records that preserve the semantic, structural, or statistical relationships associated with the banking operations, thereby reducing the influence of Bank A's data in compliance with Bank A's privacy parameters or consent status.

In some implementations, the data simulation platform 602 (e.g., at the operation 1812 of FIG. 18 using the regeneration engine 1616 of FIG. 16) generates an updated version of the complete simulated dataset by replacing the affected data records with newly generated records that comply with the updated privacy parameters, while preserving unaffected portions of the original simulated dataset. For example, the data simulation platform 602 generates an updated simulated dataset that includes the updated subset of the data records in lieu of the subset of data records. As an illustrative example, the platform performs selective record replacement operations that substitute privacy-violating synthetic data records with compliant alternatives while maintaining the overall dataset structure, indexing, and metadata relationships. To illustrate, the updated simulated datasets can preserve dataset versioning, maintain referential integrity between related records, and ensure that downstream applications seamlessly transition from the original dataset to the updated version without requiring modifications to data processing pipelines or analytical workflows. By doing so, the data generation platform enables efficient creation of privacy-compliant synthetic datasets through targeted record replacement rather than wholesale regeneration, providing significant computational resource savings and maintaining operational continuity for workflows that depend on unaffected data records.

In some implementations, the data simulation platform 602 transmits the updated simulated dataset (and/or portions thereof) to one or more devices or components associated with the associated system or network. For example, the data simulation platform 602 transmits the updated simulated dataset to a second user device to cause validation or training, using the updated simulated dataset, of an artificial intelligence model associated with a data transformation pipeline. To illustrate, the platform delivers updated simulated datasets to machine learning development environments, financial transaction networks (e.g., including complex models or decision workflows or algorithms) to enable testing, validation, and/or training of the network or system. For example, the platform can format and transmit the updated datasets in formats compatible with the corresponding components of the data transformation pipeline to be tested or validated. For example, the platform delivers the updated dataset to machine learning servers that validate credit score algorithms, stress-test risk management models, and/or algorithmic trading systems using synthetic financial data within the updated simulated dataset that complies with updated banking entity privacy requirements.

In some implementations, the data simulation platform 602 selectively deploys the generated simulated dataset (or portions thereof) to components of the data transformation pipeline that rely on data that is affected by the updated privacy parameters (e.g., while determining not to transmit any updates to unaffected components). For example, the data simulation platform 602 identifies, using the modification request (and/or the inferred entity-relationship network), a component of the data transformation pipeline that is associated with the privacy parameter set of the first entity. In some implementations, the data simulation platform 602 determines, based on the inferred entity-relationship network, a computing device associated with the identified component of the data transformation pipeline that corresponds to the second user device (e.g., to which the update is transmitted). In response to determining the computing device associated with the identified component, the data simulation platform 602 transmits the updated simulated dataset to the second user device.

As an illustrative example, the data simulation platform determines a component of the data transformation pipeline that is affected by the updated privacy parameter set. A component can include a discrete functional module, service, or processing unit within a larger data processing system (e.g., financial transactions network or distributed microservices network). For example, the component can include specialized processing modules such as data validation engines, machine learning model training systems, regulatory compliance checkers, or analytical reporting generators that consume synthetic data including attributes governed by specific privacy parameter sets. A component can include a credit risk assessment calculator, a financial decision algorithm, or another suitable component of a financial transaction network. In some implementations, the component is associated with a computing device (e.g., that includes a physical or virtual or containerized hardware infrastructure, or a software component, that hosts and/or executes one or more components' processing operations, including dedicated servers, containerized applications, cloud computing instances, or distributed processing nodes). As such, the disclosed data simulation platform enables targeted deployment of one or more portions of synthetic data to pipeline components that require or consume the updated data, while reducing or eliminating the need for sending data to nodes that are unaffected by the changes in the privacy settings associated with the simulated data generation, thereby improving the operational integrity of network components.

At operation 1820 of FIG. 18 (e.g., using the immutable audit trail 1622, the notification system 1620, and/or the client self-service portal 1618 of FIG. 16), the data simulation platform 602 can generate an indication, notification, or log of the modification to the simulated data on a distributed ledger (e.g., by generating a block and incorporating the block within a blockchain associated with the distributed ledger). For example, the data simulation platform 602 causes generation, on a distributed ledger, of a cryptographic data structure representing the updated simulated dataset (e.g., as described relating to FIG. 19 above).

In some implementations, the generated audit trail can include blockchain-inspired logging, distributed log storage, timestamp verification, log integrity monitoring, and/or long-term archiving. The audit trail can include features associated with regulatory requirements, including automated compliance reporting, audit trail exporting (e.g., in a format-dependent manner), chain of custody documentation, privacy impact assessments, and/or compliance dashboards. Audit data can be analyzed by the data simulation platform to generate usage pattern analytics, anomaly detection, compliance trend monitoring, performance optimization, and/or predictive analytics.

The platform can integrate with existing identity and access management features (e.g., LDAP/Active Directory Support, Single Sign-On, Role-Based Access Control, Multi-Factor Authentication, and/or Session Management capabilities). The platform can include metadata synchronization features, policy synchronization features, lineage integration, quality metrics sharing, and/or compliance coordination. The platform can include enterprise monitoring and alerting, including performance monitoring, custom alerting (e.g., based on enterprise-specific criteria), incident management, and capacity planning.

In some implementations, the data simulation platform can generate explainable data based on mandatory fields specified within the privacy parameter set. For example, the data simulation platform can determine that the modification request includes an updated privacy parameter set that includes a set of mandatory explanation fields. The set of mandatory explanation fields can include a set of textual descriptions of characterizations of portions of the updated simulated dataset. In response to determining that the modification request includes the updated privacy parameter set including the set of mandatory explanation fields, the data simulation platform can input the updated simulated dataset into the data generation model to generate, for each particular mandatory explanation field of the set of mandatory explanation fields, a corresponding verbal characterization record, of a set of corresponding verbal characterization records, that is consistent with the particular mandatory explanation field. The data simulation platform can transmit the set of corresponding verbal characterization records to the second user device. In some implementations, the explainability requirements associated with the mandatory explanation fields include specifications of audit detail levels, stakeholder-specific explanations, automated documentation, and/or decision-tree visualization.

As an illustrative example, the data simulation platform (e.g., using one or more components, methods, or processes associated with FIGS. 11-15) can detect and process mandatory explanation requirements within privacy parameter modification requests, automatically generating human-readable characterizations that describe how synthetic data has been modified to comply with updated privacy constraints. As an illustrative example, the platform analyzes modification requests (e.g., using a natural language generation model, such as a large language model) to determine mandatory explanation fields that specify requested textual descriptions (e.g., a Privacy Compliance status, a Data Aggregation Summary, or a Statistical Impact Assessment). In some implementations, the platform utilizes natural language generation models to generate verbal (e.g., text-based, audio-based, or multimedia) characterization records that translate technical privacy parameter changes (and associated simulated dataset changes) into comprehensible explanations suitable for regulatory documentation, audit trails, and stakeholder communication.

Figure 20:
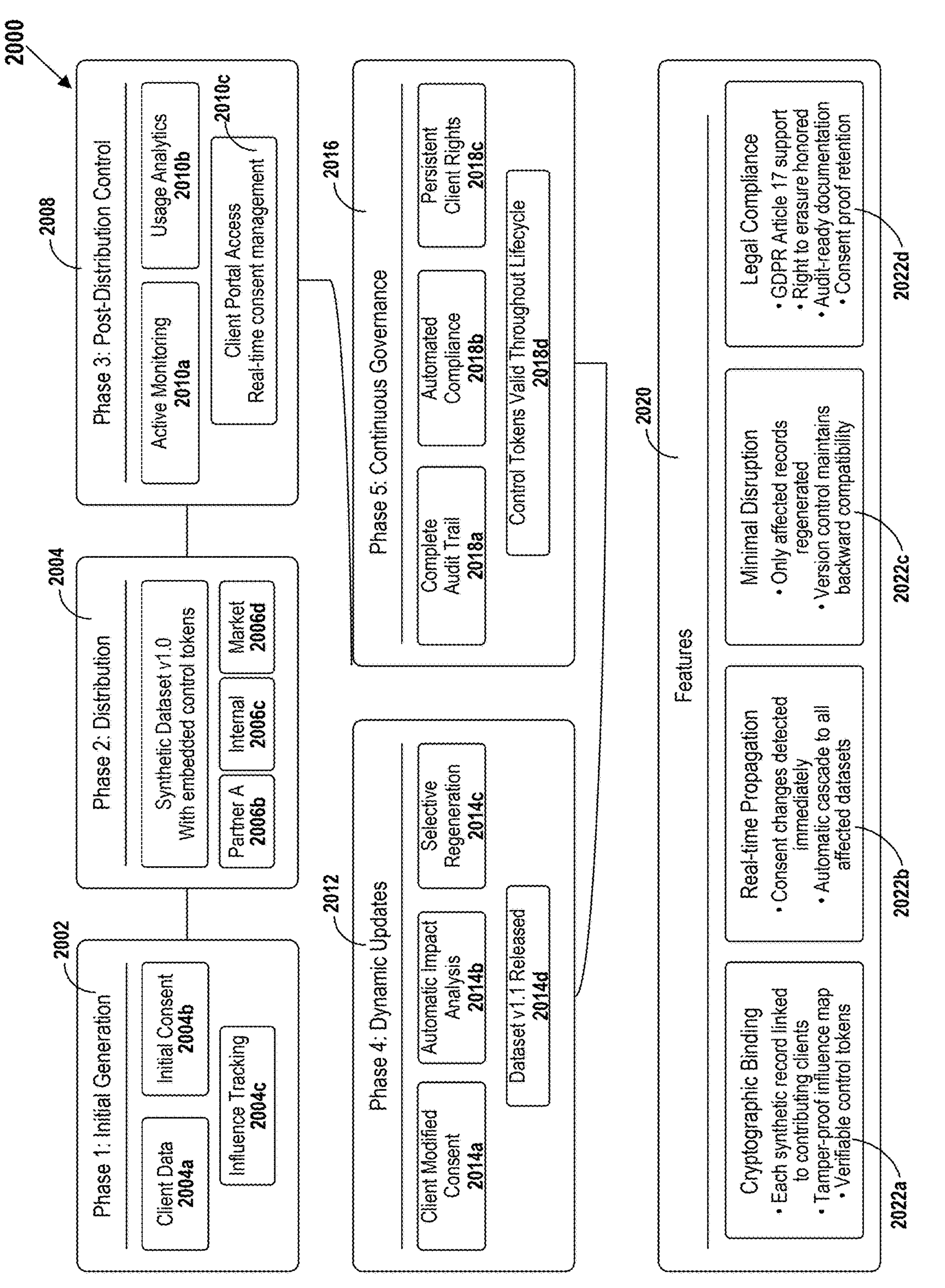
FIG. 20 is a diagram illustrating the phases of a generated synthetic dataset that is updated based on entity modification of consent, in accordance with one or more implementations of the disclosed technology.

FIG. 20 is a diagram illustrating the phases 2000 of a generated synthetic dataset that is updated based on entity modification of consent, in accordance with one or more implementations of the disclosed technology.

At Phase 1 (e.g., operation 2002), the data simulation platform can generate an initial simulated dataset based on client data 2004*a*, initial consent 2004*b*, and/or influence tracking 2004*c*, as described above.

At Phase 2 (e.g., operation 2004), the data simulation platform can distribute the generated simulated dataset (e.g., synthetic dataset), including embedded control tokens, to one or more entities (e.g., a partner 2006*b*, an internal entity 2006*c*, or a market 2006*d*).

At Phase 3 (e.g., operation 2008), the data simulation platform can implement post-distribution control via active monitoring 2010*a*, usage analytics 2010*b*, and/or client portal access for real-time consent management 2010*c*.

At Phase 4 (e.g., operation 2012), the data simulation platform can implement dynamic updates (e.g., based on client-modified consent 2014*a*, automatic impact analysis 2014*b*, selective generation 2014*c*), thereby generating a regenerated dataset 2014*d*.

At Phase 5 (e.g., operation 2016), the data simulation platform can implement continuous governance using a complete audit trail 2018*a*, automated compliance 2018*b*, persistent client rights 2018*c*, and/or control tokens 2018*d*, as described above.

As such, the systems and methods disclosed herein enable cryptographic binding 2022*a*, real-time propagation of updates 2022*b*, minimal disruption to system components 2022*c*, and/or legal compliance with associated regulatory requirements 2022*d*.

In some implementations, the data simulation platform 602 can implement enterprise-grade security through a defense-in-depth approach that includes multiple layers of security protection. For example, the platform can isolate synthetic data generation processes through network segmentation, protect all data throughout its lifecycle with encryption at rest and in transit, verify every transaction regardless of source using zero trust architecture, monitor for potential security breaches through intrusion detection systems, and provide automated response to security events via security orchestration capabilities.

The data simulation platform 602 can employ advanced privacy-preserving computation techniques for enhanced privacy protection. For example, the platform can use hardware-based security for sensitive computations through secure enclaves, perform calculations on encrypted data via homomorphic operations, enable collaboration without data exposure using secure multi-party computation protocols, provide mathematical privacy guarantees through differential privacy mechanisms, and track and limit information disclosure via privacy budget management systems.

In some aspects, the data simulation platform 602 can include intelligent automation capabilities that enhance operational efficiency. The platform can provide AI-driven optimization of generation parameters through automated parameter optimization, predict and prevent system issues via predictive maintenance algorithms, optimize synthetic data generation scheduling through intelligent scheduling systems, continuously verify compliance status using automated compliance checking mechanisms, and dynamically allocate computational resources through smart resource allocation protocols.

The data simulation platform 602 can provide advanced analytics and insights capabilities for comprehensive system monitoring and optimization. For example, the platform can implement a comprehensive quality measurement framework for synthetic data quality metrics, provide detailed analytics on how synthetic data is being used through usage analytics systems, measure the business value of synthetic data generation via ROI calculation mechanisms, identify trends in data requests and usage patterns through trend analysis capabilities, and forecast future synthetic data needs using predictive modeling techniques.

In some implementations, the data simulation platform 602 can include an extensibility framework that enables customization and integration with existing enterprise systems. The platform can allow custom extensions to core functionality through a plugin architecture, provide comprehensive APIs for all platform capabilities via API-first design principles, enable integration of proprietary algorithms through custom algorithm support, create custom workflows for specific use cases via workflow customization features, and include pre-built adapters for common enterprise systems through integration adapter capabilities.

Figure 21:
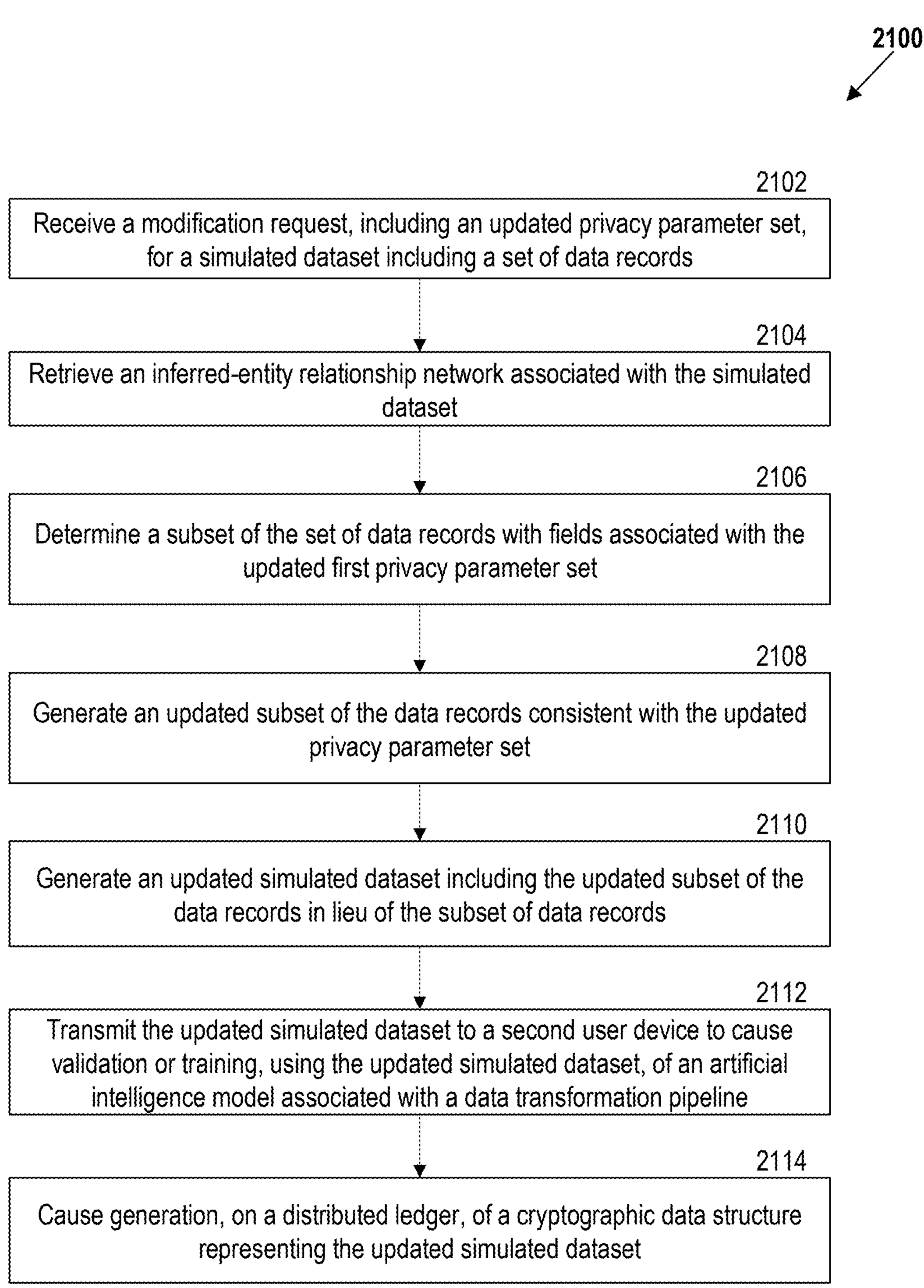
FIG. 21 illustrates a flow for updating a simulated dataset based on a modification request including an updated privacy parameter set, in accordance with one or more implementations of the disclosed technology.

FIG. 21 illustrates a flow 2100 for updating a simulated dataset based on a modification request including an updated privacy parameter set, in accordance with one or more implementations of the disclosed technology.

At 2102, the data simulation platform 602 can receive a modification request, including an updated privacy parameter set, for a simulated dataset including a set of data records. For example, the data simulation platform 602 receives, via a containerized application at a first user device, a modification request for a simulated dataset. The modification request can be associated with a first entity of a set of entities. The first entity can be associated with a privacy parameter set indicating privacy characteristics for simulated data records associated with the first entity. The simulated dataset can include a set of data records, where each data record of the set of data records includes a particular set of fields and a particular set of corresponding values. At least one data record of the set of data records can be associated with the first entity. The modification request can include an indication of an updated privacy parameter set for the first entity.

In some implementations, the data simulation platform 602 can verify control tokens associated with the entity and generate a block representing validation of the entity on the distributed ledger. For example, the data simulation platform 602 determines, using the modification request, a control token associated with the first entity. The control token can include a cryptographic digital signature including a first hash value generated using a private key associated with the first entity. The data simulation platform 602 can retrieve, from an entity cryptographic database, a public key associated with the first entity. The entity cryptographic database can include public keys associated with the set of entities associated with the inferred entity-relationship network. The data simulation platform 602 can apply the public key to the modification request to generate a second hash value. The data simulation platform 602 can determine that the first hash value matches the second hash value. In response to determining that the first hash value matches the second hash value, the data simulation platform 602 can cause generation, on the distributed ledger, of a second cryptographic data structure representing validation of the modification request by the first entity. The distributed ledger can include a Merkle tree representing (1) the validation of the modification request by the first entity and (2) the updated simulated dataset.

At 2104, the data simulation platform 602 can retrieve an inferred-entity relationship network associated with the simulated dataset. For example, the data simulation platform 602 retrieves an inferred entity-relationship network associated with the simulated dataset. The inferred entity-relationship network can include an indication of at least one of structural, semantic, or statistical properties of the simulated dataset.

In some implementations, the data simulation platform 602 generates the simulated dataset using the inferred entity-relationship network. For example, the data simulation platform 602 receives a node dataset comprising (1) an entity dataset and (2) a relationship dataset. The entity dataset can include a representation of a set of nodes and associated node values. The relationship dataset can include a representation of relationships between at least two nodes of the set of nodes. The data simulation platform 602 can input the node dataset into a statistical inference model to generate an inferred statistical dataset for the node dataset comprising a set of statistical metrics and associated values for the node dataset. The data simulation platform 602 can receive, from a device associated with the first entity, the privacy parameter set associated with the simulated dataset. The data simulation platform 602 can input the inferred statistical dataset, the node dataset, and the privacy parameter set into a graph generation model to generate the inferred entity-relationship network including (1) a set of inferred node identifiers corresponding to a set of inferred nodes and (2) a set of inferred node relationships. The inferred entity-relationship network can include an indication of structural, semantic, and statistical properties of the node dataset. The indication of the structural, semantic, and statistical properties can be consistent with the inferred statistical dataset. Each relationship of the set of inferred node relationships can indicate a particular relationship label between at least two particular nodes of the set of inferred nodes. The data simulation platform 602 can generate the simulated dataset using the inferred entity-relationship network.

At 2106, the data simulation platform 602 can determine a subset of the set of data records with fields associated with the updated first privacy parameter set. For example, the data simulation platform 602 determines, using the inferred entity-relationship network, the updated privacy parameter set, and the set of data records, a subset of the set of data records with fields relating to one or more updated parameters of the updated privacy parameter set.

In some implementations, the data simulation platform 602 can determine a subset of the data records based on a contribution metric associated with the entity's data's influence on a particular data record of the simulated dataset. For example, the data simulation platform 602 determines, using the inferred entity-relationship network, a first contribution metric value for (1) the first entity and (2) a first field of a first data record of the set of data records. The data simulation platform 602 can determine that the first contribution metric value satisfies a contribution metric threshold value. In response to determining that the first contribution metric value satisfies the contribution metric threshold value, the data simulation platform 602 can generate the subset of the set of data records including the first data record.

In some implementations, the data simulation platform 602 can use statistical information to deduce whether a particular client's data is affected by the updated parameter set. For example, the data simulation platform 602 retrieves an inferred statistical dataset associated with the inferred entity-relationship network. The inferred statistical dataset can include, for the simulated dataset, (1) a set of statistical metrics and (2) a set of statistical metric values associated with the set of statistical metrics. Each statistical metric of the set of statistical metrics can be associated with one or more nodes of the inferred entity-relationship network or one or more relationships of the inferred entity-relationship network. The data simulation platform 602 can determine, using the inferred statistical dataset, a correlation value measuring a correlation between (1) values associated with the first field of the first data record and (2) one or more parameters of the updated privacy parameter set. The data simulation platform 602 can generate the first contribution metric value based on the correlation value.

In some implementations, the data simulation platform 602 can determine fields that are related to the particular privacy parameters of the first entity's specification to determine records that are affected by the updated privacy parameters. For example, the data simulation platform 602 determines a first updated privacy parameter value, corresponding to a first updated privacy parameter, of the updated privacy parameter set. The data simulation platform 602 can determine that a first data record of the set of data records includes a first field that is associated with the first updated privacy parameter. In response to determining that the first data record includes the first field, the data simulation platform 602 can generate the subset of the set of data records to include the first data record.

At 2108, the data simulation platform 602 can generate an updated subset of the data records consistent with the updated privacy parameter set. For example, the data simulation platform 602 provides the inferred entity-relationship network and the updated privacy parameter set to a data generation model to generate an updated subset of the data records consistent with the updated privacy parameter set.

In some implementations, the data simulation platform 602 generates an updated data record that reduces the contribution of the entity's data to the record as compared to the original data record. For example, the data simulation platform 602 determines, for a first data record of the subset of the data records, a first set of values corresponding to a first set of fields. The data simulation platform 602 can determine that the modification request includes a threshold contribution metric value associated with the first entity. The data simulation platform 602 can determine, using the inferred entity-relationship network, a first contribution metric value associated with the first set of values for the first data record. The first contribution metric value can be greater than the threshold contribution metric value. The data simulation platform 602 can input (1) the threshold contribution metric value, (2) the inferred entity-relationship network, and (3) the first set of values corresponding to the first set of fields into a data generation model to generate a second set of values associated with the first set of fields. The data simulation platform 602 can determine, using the inferred entity-relationship network, a second contribution metric value associated with the second set of values for the first data record. The data simulation platform 602 can determine that the second contribution metric value is less than or equal to the threshold contribution metric value. In response to determining that the second contribution metric value is less than or equal to the threshold contribution metric value, the data simulation platform 602 can generate the updated subset of the data records including an updated first data record comprising the second set of values.

In some implementations, the data simulation platform 602 generates the updated values for the data records by using another entity's data to replace the first entity's data. For example, the data simulation platform 602 retrieves, from a node database, a node dataset corresponding to a second entity of the set of entities. The data simulation platform can input the retrieved node dataset into the data generation model to generate the second set of values associated with the first set of fields. The second set of values can be consistent with semantic, structural, and statistical properties of the node dataset.

At 2110, the data simulation platform 602 can generate an updated simulated dataset including the updated subset of the data records in lieu of the subset of data records. For example, the data simulation platform 602 generates an updated simulated dataset comprising the updated subset of the data records in lieu of the subset of data records.

At 2112, the data simulation platform 602 can transmit the updated simulated dataset to a second user device to cause validation or training, using the updated simulated dataset, of an artificial intelligence model associated with a data transformation pipeline.

In some implementations, the data simulation platform 602 can deploy the generated data selectively to targeted portions of the data transformation pipeline based on the inferred entity-relationship network. For example, the data simulation platform 602 identifies, using the modification request, a component of the data transformation pipeline. The component can be associated with the privacy parameter set of the first entity. The data simulation platform 602 can determine, based on the inferred entity-relationship network, a computing device associated with the identified component of the data transformation pipeline. The computing device can correspond to the second user device. In response to determining the computing device associated with the identified component, the data simulation platform 602 can transmit the updated simulated dataset to the second user device.

At 2114, the data simulation platform 602 can cause generation, on a distributed ledger, of a cryptographic data structure representing the updated simulated dataset.

In some implementations, the data simulation platform 602 can generate explanations of the generated data or modifications based on specified mandatory fields (e.g., within the privacy parameter set). For example, the data simulation platform 602 determines that the modification request includes the updated privacy parameter set including a set of mandatory explanation fields. The set of mandatory explanation fields can include a set of textual descriptions of characterizations of portions of the updated simulated dataset. In response to determining that the modification request includes the updated privacy parameter set including the set of mandatory explanation fields, the data simulation platform 602 can input the updated simulated dataset into the data generation model to generate, for each particular mandatory explanation field of the set of mandatory explanation fields, a corresponding verbal characterization record, of a set of corresponding verbal characterization records, consistent with the particular mandatory explanation field. The data simulation platform 602 can transmit the set of corresponding verbal characterization records to the second user device.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

The invention claimed is:

1. A computing system comprising:

one or more processors; and one or more non-transitory, computer-readable media storing instructions that, when executed by the one or more processors, cause the computing system to:

receive, via a containerized application at a first user device, a modification request for a simulated dataset, wherein the modification request is associated with a first entity of a set of entities, wherein the first entity is associated with a privacy parameter set indicating privacy characteristics for simulated data records associated with the first entity, wherein the simulated dataset includes a set of data records, wherein each data record of the set of data records includes a particular set of fields and a particular set of corresponding values, wherein at least one data record of the set of data records is associated with the first entity, and wherein the modification request includes an indication of an updated privacy parameter set for the first entity;

retrieve an inferred entity-relationship network associated with the simulated dataset, wherein the inferred entity-relationship network includes an indication of at least one of structural, semantic, or statistical properties of the simulated dataset;

determine, using the inferred entity-relationship network, the updated privacy parameter set, and the set of data records, a subset of the set of data records with fields relating to one or more updated parameters of the updated privacy parameter set;

provide the inferred entity-relationship network and the updated privacy parameter set to a data generation model to generate an updated subset of the data records consistent with the updated privacy parameter set;

generate an updated simulated dataset comprising the updated subset of the data records in lieu of the subset of data records;

transmit the updated simulated dataset to a second user device to cause validation or training, using the updated simulated dataset, of an artificial intelligence model associated with a data transformation pipeline; and cause generation, on a distributed ledger, of a cryptographic data structure representing the updated simulated dataset.

2. The computing system of claim 1, wherein the instructions further cause the computing system to:

receive a node dataset comprising (1) an entity dataset and (2) a relationship dataset, wherein the entity dataset comprises a representation of a set of nodes and associated node values, and wherein the relationship dataset includes a representation of relationships between at least two nodes of the set of nodes;

input the node dataset into a statistical inference model to generate an inferred statistical dataset for the node dataset comprising a set of statistical metrics and associated values for the node dataset;

receive, from a device associated with the first entity, the privacy parameter set associated with the simulated dataset; and input the inferred statistical dataset, the node dataset, and the privacy parameter set into a graph generation model to generate the inferred entity-relationship network including (1) a set of inferred node identifiers corresponding to a set of inferred nodes and (2) a set of inferred node relationships, wherein the inferred entity-relationship network includes an indication of structural, semantic, and statistical properties of the node dataset, wherein the indication of the structural, semantic, and statistical properties is consistent with the inferred statistical dataset, and wherein each relationship of the set of inferred node relationships indicates a particular relationship label between at least two particular nodes of the set of inferred nodes; and generate the simulated dataset using the inferred entity-relationship network.

3. The computing system of claim 1, wherein the instructions for determining the subset of the set of data records cause the computing system to:

determine, using the inferred entity-relationship network, a first contribution metric value for (1) the first entity and (2) a first field of a first data record of the set of data records;

determine that the first contribution metric value satisfies a contribution metric threshold value; and in response to determining that the first contribution metric value satisfies the contribution metric threshold value, generate the subset of the set of data records including the first data record.

4. The computing system of claim 3, wherein the instructions for determining the first contribution metric value cause the computing system to:

retrieve an inferred statistical dataset associated with the inferred entity-relationship network, wherein the inferred statistical dataset includes, for the simulated dataset, (1) a set of statistical metrics and (2) a set of statistical metric values associated with the set of statistical metrics, and wherein each statistical metric of the set of statistical metrics is associated with one or more nodes of the inferred entity-relationship network or one or more relationships of the inferred entity-relationship network;

determine, using the inferred statistical dataset, a correlation value measuring a correlation between (1) values associated with the first field of the first data record and (2) one or more parameters of the updated privacy parameter set; and generate the first contribution metric value based on the correlation value.

5. The computing system of claim 1, wherein the instructions for determining the subset of the set of data records cause the computing system to:

determine a first updated privacy parameter value, corresponding to a first updated privacy parameter, of the updated privacy parameter set;

determine that a first data record of the set of data records includes a first field that is associated with the first updated privacy parameter; and in response to determining that the first data record includes the first field, generate the subset of the set of data records to include the first data record.

6. The computing system of claim 1, wherein the instructions for generating the updated subset of the data records cause the computing system to:

determine, for a first data record of the subset of the data records, a first set of values corresponding to a first set of fields;

determine that the modification request includes a threshold contribution metric value associated with the first entity;

determine, using the inferred entity-relationship network, a first contribution metric value associated with the first set of values for the first data record, wherein the first contribution metric value is greater than the threshold contribution metric value;

input (1) the threshold contribution metric value, (2) the inferred entity-relationship network, and (3) the first set of values corresponding to the first set of fields into a data generation model to generate a second set of values associated with the first set of fields;

determine, using the inferred entity-relationship network, a second contribution metric value associated with the second set of values for the first data record;

determine that the second contribution metric value is less than or equal to the threshold contribution metric value; and in response to determining that the second contribution metric value is less than or equal to the threshold contribution metric value, generate the updated subset of the data records including an updated first data record comprising the second set of values.

7. The computing system of claim 6, wherein the instructions for generating the second set of values for the first set of fields cause the computing system to:

retrieve, from a node database, a node dataset corresponding to a second entity of the set of entities; and input the retrieved node dataset into the data generation model to generate the second set of values associated with the first set of fields, wherein the second set of values is consistent with semantic, structural, and statistical properties of the node dataset.

8. The computing system of claim 1, wherein the instructions further cause the computing system to:

determine, using the modification request, a control token associated with the first entity, wherein the control token includes a cryptographic digital signature including a first hash value generated using a private key associated with the first entity;

retrieve, from an entity cryptographic database, a public key associated with the first entity, wherein the entity cryptographic database includes public keys associated with the set of entities associated with the inferred entity-relationship network;

apply the public key to the modification request to generate a second hash value;

determine that the first hash value matches the second hash value; and in response to determining that the first hash value matches the second hash value, cause generation, on the distributed ledger, of a second cryptographic data structure representing validation of the modification request by the first entity, wherein the distributed ledger includes a Merkle tree representing (1) the validation of the modification request by the first entity and (2) the updated simulated dataset.

9. The computing system of claim 1, wherein the instructions for transmitting the updated simulated dataset to the second user device cause the computing system to:

identify, using the modification request, a component of the data transformation pipeline, wherein the component is associated with the privacy parameter set of the first entity;

determine, based on the inferred entity-relationship network, a computing device associated with the identified component of the data transformation pipeline, wherein the computing device corresponds to the second user device;

in response to determining the computing device associated with the identified component, transmit the updated simulated dataset to the second user device.

10. The computing system of claim 1, wherein the instructions further cause the computing system to:

determine that the modification request includes the updated privacy parameter set including a set of mandatory explanation fields, wherein the set of mandatory explanation fields includes a set of textual descriptions of characterizations of portions of the updated simulated dataset;

in response to determining that the modification request includes the updated privacy parameter set including the set of mandatory explanation fields, input the updated simulated dataset into the data generation model to generate, for each particular mandatory explanation field of the set of mandatory explanation fields, a corresponding verbal characterization record, of a set of corresponding verbal characterization records, consistent with the particular mandatory explanation field; and transmit the set of corresponding verbal characterization records to the second user device.

11. One or more non-transitory, computer-readable storage media storing instructions that, when executed by one or more processors of a computing system, cause the computing system to:

receive a modification request for a simulated dataset, wherein the modification request is associated with a first entity of a set of entities, wherein the first entity is associated with a privacy parameter set indicating privacy characteristics for simulated data records associated with the first entity, wherein the simulated dataset includes a set of data records, wherein each data record of the set of data records includes a particular set of fields and a particular set of corresponding values, wherein at least one data record of the set of data records is associated with the first entity, and wherein the modification request includes an indication of an updated privacy parameter set for the first entity;

retrieve an inferred entity-relationship network associated with the simulated dataset, wherein the inferred entity-relationship network includes an indication of at least one of: structural properties, semantic properties, or statistical properties, of the simulated dataset;

determine, using the inferred entity-relationship network, the updated privacy parameter set, and the set of data records, a subset of the set of data records with fields relating to one or more updated parameters of the updated privacy parameter set;

generate, using the updated privacy parameter set, an updated subset of the data records consistent with the updated privacy parameter set;

generate an updated simulated dataset comprising the updated subset of the data records in lieu of the subset of data records;

transmit the updated simulated dataset to a second user device to cause validation or training, using the updated simulated dataset, of an artificial intelligence model associated with a data transformation pipeline; and cause generation, on a distributed ledger, of a cryptographic data structure representing at least one of the modification request or the updated simulated dataset.

12. The one or more non-transitory, computer-readable storage media of claim 11, wherein the instructions further cause the computing system to:

receive a node dataset comprising (1) an entity dataset and (2) a relationship dataset, wherein the entity dataset comprises a representation of a set of nodes and associated node values, and wherein the relationship dataset includes a representation of relationships between at least two nodes of the set of nodes;

input the node dataset into a statistical inference model to generate an inferred statistical dataset for the node dataset comprising a set of statistical metrics and associated values for the node dataset;

receive, from a device associated with the first entity, the privacy parameter set associated with the simulated dataset; and input the inferred statistical dataset, the node dataset, and the privacy parameter set into a graph generation model to generate the inferred entity-relationship network including (1) a set of inferred node identifiers corresponding to a set of inferred nodes and (2) a set of inferred node relationships, wherein the inferred entity-relationship network includes an indication of structural, semantic, and statistical properties of the node dataset, wherein the indication of the structural, semantic, and statistical properties is consistent with the inferred statistical dataset, and wherein each relationship of the set of inferred node relationships indicates a particular relationship label between at least two particular nodes of the set of inferred nodes; and generate the simulated dataset using the inferred entity-relationship network.

13. The one or more non-transitory, computer-readable storage media of claim 11, wherein the instructions for determining the subset of the set of data records cause the computing system to:

determine, using the inferred entity-relationship network, a first contribution metric value for (1) the first entity and (2) a first field of a first data record of the set of data records;

determine that the first contribution metric value satisfies a contribution metric threshold value; and in response to determining that the first contribution metric value satisfies the contribution metric threshold value, generate the subset of the set of data records including the first data record.

14. The one or more non-transitory, computer-readable storage media of claim 13, wherein the instructions for determining the first contribution metric value cause the computing system to:

retrieve an inferred statistical dataset associated with the inferred entity-relationship network, wherein the inferred statistical dataset includes, for the simulated dataset, (1) a set of statistical metrics and (2) a set of statistical metric values associated with the set of statistical metrics, and wherein each statistical metric of the set of statistical metrics is associated with one or more nodes of the inferred entity-relationship network or one or more relationships of the inferred entity-relationship network;

determine, using the inferred statistical dataset, a correlation value measuring a correlation between (1) values associated with the first field of the first data record and (2) one or more parameters of the updated privacy parameter set; and generate the first contribution metric value based on the correlation value.

15. The one or more non-transitory, computer-readable storage media of claim 11, wherein the instructions for determining the subset of the set of data records cause the computing system to:

determine a first updated privacy parameter value, corresponding to a first updated privacy parameter, of the updated privacy parameter set;

determine that a first data record of the set of data records includes a first field that is associated with the first updated privacy parameter; and in response to determining that the first data record includes the first field, generate the subset of the set of data records to include the first data record.

16. The one or more non-transitory, computer-readable storage media of claim 11, wherein the instructions for generating the updated subset of the data records cause the computing system to:

determine, for a first data record of the subset of the data records, a first set of values corresponding to a first set of fields;

determine that the modification request includes a threshold contribution metric value associated with the first entity;

determine, using the inferred entity-relationship network, a first contribution metric value associated with the first set of values for the first data record, wherein the first contribution metric value is greater than the threshold contribution metric value;

input (1) the threshold contribution metric value, (2) the inferred entity-relationship network, and (3) the first set of values corresponding to the first set of fields into a data generation model to generate a second set of values associated with the first set of fields;

determine, using the inferred entity-relationship network, a second contribution metric value associated with the second set of values for the first data record;

determine that the second contribution metric value is less than or equal to the threshold contribution metric value; and in response to determining that the second contribution metric value is less than or equal to the threshold contribution metric value, generate the updated subset of the data records including an updated first data record comprising the second set of values.

17. The one or more non-transitory, computer-readable storage media of claim 16, wherein the instructions for generating the second set of values for the first set of fields cause the computing system to:

retrieve, from a node database, a node dataset corresponding to a second entity of the set of entities; and input the retrieved node dataset into the data generation model to generate the second set of values associated with the first set of fields, wherein the second set of values is consistent with semantic, structural, and statistical properties of the node dataset.

18. A method comprising:

receiving a modification request for a simulated dataset, wherein the modification request is associated with a first entity of a set of entities, wherein the first entity is associated with a privacy parameter set indicating compliance characteristics for simulated data records associated with the first entity, wherein the simulated dataset includes a set of data records, and wherein the modification request includes an indication of an updated privacy parameter set for the first entity;

retrieving an inferred entity-relationship network associated with the simulated dataset, wherein the inferred entity-relationship network includes an indication of at least two of structural, semantic, or statistical properties of the simulated dataset;

determining, using the inferred entity-relationship network, the updated privacy parameter set, and the set of data records, a subset of the set of data records with fields relating to one or more updated parameters of the updated privacy parameter set;

providing the inferred entity-relationship network and the updated privacy parameter set to a data generation model to generate an updated subset of the data records consistent with the updated privacy parameter set;

generating an updated simulated dataset comprising the updated subset of the data records in lieu of the subset of data records; and transmitting the updated simulated dataset to a second user device to cause validation or training, using the updated simulated dataset, of a model associated with a data processing system.

19. The method of claim 18, further comprising:

receiving a node dataset comprising (1) an entity dataset and (2) a relationship dataset, wherein the entity dataset comprises a representation of a set of nodes and associated node values, and wherein the relationship dataset includes a representation of relationships between at least two nodes of the set of nodes;

inputting the node dataset into a statistical inference model to generate an inferred statistical dataset for the node dataset comprising a set of statistical metrics and associated values for the node dataset;

receiving, from a device associated with the first entity, the privacy parameter set associated with the simulated dataset; and inputting the inferred statistical dataset, the node dataset, and the privacy parameter set into a graph generation model to generate the inferred entity-relationship network including (1) a set of inferred node identifiers corresponding to a set of inferred nodes and (2) a set of inferred node relationships, wherein the inferred entity-relationship network includes an indication of at least one of structural, semantic, or statistical properties of the node dataset, wherein the indication of the structural, semantic, and statistical properties is consistent with the inferred statistical dataset, and wherein each relationship of the set of inferred node relationships indicates a particular relationship label between at least two particular nodes of the set of inferred nodes; and generating the simulated dataset using the inferred entity-relationship network.

20. The method of claim 18, wherein determining the subset of the set of data records comprises:

determining, using the inferred entity-relationship network, a first contribution metric value for (1) the first entity and (2) a first field of a first data record of the set of data records;

determining that the first contribution metric value satisfies a contribution metric threshold value; and in response to determining that the first contribution metric value satisfies the contribution metric threshold value, generating the subset of the set of data records including the first data record.

* * * * *